US012764848B2

(12) United States Patent
Altonen et al.

(10) Patent No.: US 12,764,848 B2
(45) Date of Patent: Oct. 13, 2026

(54) LOAD CONTROL DEVICE HAVING A MECHANICALLY-CONTROLLABLE ACTUATOR

(71) Applicant: Lutron Technology Company LLC, Coopersburg, PA (US)

(72) Inventors: Gregory S. Altonen, Easton, PA (US); Edward J. Blair, Telford, PA (US); Chris Dimberg, Easton, PA (US); Jason C. Killo, Emmaus, PA (US); Matthew P. McDonald, Phoenixville, PA (US); Daniel L. Twaddell, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 84 days.

(21) Appl. No.: 18/431,310

(22) Filed: Feb. 2, 2024

(65) Prior Publication Data

US 2024/0268011 A1 Aug. 8, 2024

Related U.S. Application Data

(60) Provisional application No. 63/443,192, filed on Feb. 3, 2023.

(51) Int. Cl.
*H05B 47/175* (2020.01)

(52) U.S. Cl.
CPC .................................. *H05B 47/196* (2024.01)

(58) Field of Classification Search
CPC .... H05B 47/196; H05B 45/19; H01H 23/025; H01H 23/145
See application file for complete search history.

(56) References Cited

U.S. PATENT DOCUMENTS 6,270,239 B1 8/2001 Sund et al.
8,350,648 B2 1/2013 Cueto
(Continued)

FOREIGN PATENT DOCUMENTS

EP 3599603 A1 1/2020
GB 1286291 A 8/1972
GB 2412245 A 9/2005

OTHER PUBLICATIONS

XP002811454, "Motorized Slide Potentiometer—10KOhm Linear with 5V DC Motor,", https://blog.adafruit.com/2022/07/19/newproduct-motorized-slide-potentiometer-10k°/OCF/O89-linear-with-5vdc-motor/, Jul. 19, 2022, 9 pages.

*Primary Examiner* — Raymond R Chai
(74) *Attorney, Agent, or Firm* — Flaster Greenberg PC

(57) ABSTRACT

A control device may include an analog intensity adjustment actuator that is configured to be manually operated to adjust an intensity level of a lighting load. The control device may include a communication circuit configured to receive a message from a remote device. The message may include a commanded intensity level. The control device may include an actuator adjustment system configured to adjust a position of the analog intensity adjustment actuator and a control circuit configured to control the amount of power delivered to the electrical load in response to manual operation of the analog intensity adjustment actuator. The control circuit may be further configured to control the actuator adjustment system to adjust the position of the analog intensity adjustment actuator in response to the message received from the remote device. The position of the analog intensity adjustment actuator may be adjusted to indicate the commanded intensity level.

29 Claims, 41 Drawing Sheets

(56) References Cited

U.S. PATENT DOCUMENTS

| | | | | |
|---|---|---|---|---|
| 8,988,020 | B1 | 3/2015 | Rometo | |
| 2005/0194243 | A1 * | 9/2005 | Prineppi .................. | H01H 3/26<br>200/556 |
| 2023/0036482 | A1 * | 2/2023 | Altonen ............... | H05B 47/105 |

* cited by examiner

LOAD CONTROL DEVICE HAVING A MECHANICALLY-CONTROLLABLE ACTUATOR

CROSS-REFERENCE TO RELATED APPLICATIONS

This application claims the benefit of Provisional U.S. Patent Application No. 63/443,192, filed Feb. 3, 2023, the entire disclosure of which is hereby incorporated by reference herein in its entirety.

BACKGROUND

A load control system may include one or more electrical loads that a user may wish to control via a single load control device. These electrical loads may include, for example, lighting loads, HVAC units, motorized window treatment or projection screens, humidity control units, audio systems or amplifiers, Internet of Things (IoT) devices, and/or the like. The electrical loads may have advanced features. For example, a lighting load may be controlled to emit light of varying intensities and/or colors in response to a user command. The amount of power delivered to the electrical loads may be adjusted to an absolute level or by a relative amount.

Traditional wall-based control devices (e.g., wallbox dimmers) may allow a user to adjust an intensity level of one or more lighting loads through the movement of an analog intensity actuator (e.g., slider control or rotary knob) or the actuation of a digital intensity actuator (e.g., an intensity-increase and intensity-decrease actuators). These traditional wall-based control devices may also provide feedback to the user on the intensity level of the load. For the control devices with digital intensity actuators, the control devices may include feedback that indicates the intensity level of the lighting load. For control devices with analog intensity actuators, the feedback traditionally indicates both the intensity level of the lighting load and the position of the analog intensity actuator.

SUMMARY

A control device may be provided for controlling an electrical load (e.g., a lighting load). The control device may include an analog intensity adjustment actuator that is configured to be manually operated to adjust an intensity level of light emitted by the lighting load. The control device may include a communication circuit configured to receive a message from a remote device. The message may include a commanded intensity level for controlling the lighting load. The control device may include an actuator adjustment system configured to adjust a position of the analog intensity adjustment actuator. The control device may include a control circuit configured to control the amount of power delivered to the electrical load in response to manual operation of the analog intensity adjustment actuator. The control circuit may be further configured to control the actuator adjustment system to adjust the position of the analog intensity adjustment actuator in response to the message received from the remote device via the communication circuit. The position of the analog intensity adjustment actuator may be adjusted to indicate the commanded intensity level.

The analog intensity adjustment actuator may include a slider knob configured to move within an elongated slot. The position of the slider knob within the elongated slot may indicate the commanded intensity level. The slider knob may be configured to move linearly within the elongated slot between a low-end position associated with a low-end intensity level and a high-end position associated with a high-end intensity level. The actuator adjustment system may include a motor and gear assembly coupled to the motor. The gear assembly may be operatively coupled to the slider knob such that rotation of the motor is transferred to linear movement of the slider knob. The gear assembly may include a circular gear that engages a linear gear such that rotation of the circular gear is transferred to linear movement of the linear gear. The control device may include a linear potentiometer having a shaft coupled to the slider knob. The gear assembly may be operatively coupled to the slider knob via the shaft of the linear potentiometer. The linear gear may include a coupling portion configured to receive the shaft of the potentiometer such that the linear potentiometer moves linearly with the linear gear. The coupling portion may define an opening configured to surround the shaft of the linear potentiometer. The potentiometer may be configured to generate a direct-current (DC) voltage representative of the commanded intensity level.

The slider knob may move in an upward direction when the motor rotates in a first angular direction and the slider knob may move in a downward direction when the motor rotates in a second angular direction. The linear gear may include a plurality of teeth arranged in a linear array on a rack plate. The rack plate may include a fin configured to maintain alignment between the circular gear and the linear gear. The fin may be configured to move along a channel in a cradle of the control device. The cradle may be configured to secure a printed circuit board of the control device to a yoke of the control device.

The analog intensity adjustment actuator may include a rotary knob configured to be rotatable with respect to a collar of the control device. The rotary knob may include an indicator configured to indicate the commanded intensity level of the lighting load. The rotary knob may be characterized by non-continuous rotation having a high-end stopping point and a low-end stopping point. The indicator of the rotary knob may be at a first position when the rotary knob is at the low-end stopping point and the indicator of the rotary knob may be at a second position when the rotary knob is at the high-end stopping point. The first position may be spaced from the second position by approximately 360 degrees of rotation of the rotary knob. The first position indicates a minimum intensity level and the second position indicates a maximum intensity level. The gear assembly may be operatively coupled to the rotary knob such that rotation of the motor is transferred to rotational movement of the rotary knob. The control device may include a rotary potentiometer having a shaft coupled to the rotary knob. The gear assembly may be operatively coupled to the rotary knob via the rotary potentiometer. The rotary knob may rotate clockwise when the motor rotates in a first angular direction and the rotary knob may rotates counter-clockwise when the motor rotates in a second angular direction.

The control circuit may be further configured to illuminate the elongated slot of the analog intensity adjustment actuator. The analog intensity adjustment actuator may be configured to control the potentiometer. The control device may include a controllably conductive device adapted to be coupled in series electrical connection between an alternating current (AC) power source and the lighting load. The message may include a command for controlling the lighting load. The control circuit may be configured to control the controllably conductive device to control the amount of power delivered to the lighting load in response to the manual operation of the ana-log intensity adjustment actuator. The control circuit may be configured to control the amount of power delivered to the electrical load in response to receipt of the message from the remote device. The control circuit may be configured to transmit a message including a command for controlling the lighting load in response to manual operation of the analog intensity adjustment actuator. The control device may include an actuation member configured to pivot in response to an actuation of an upper portion of the actuation member or a lower position of the actuation member. The control circuit may be configured to turn the electrical load on in response to an actuation of the upper portion of the actuation member. The control circuit may be configured to turn the electrical load off in response to an actuation of the lower portion of the actuation member. The actuation member may be configured to return to an idle position when the upper portion or lower portion of the actuation member is released. The actuation member may include one or more biasing arms configured to hold the actuation member in the idle position.

DETAILED DESCRIPTION

Figure 1:
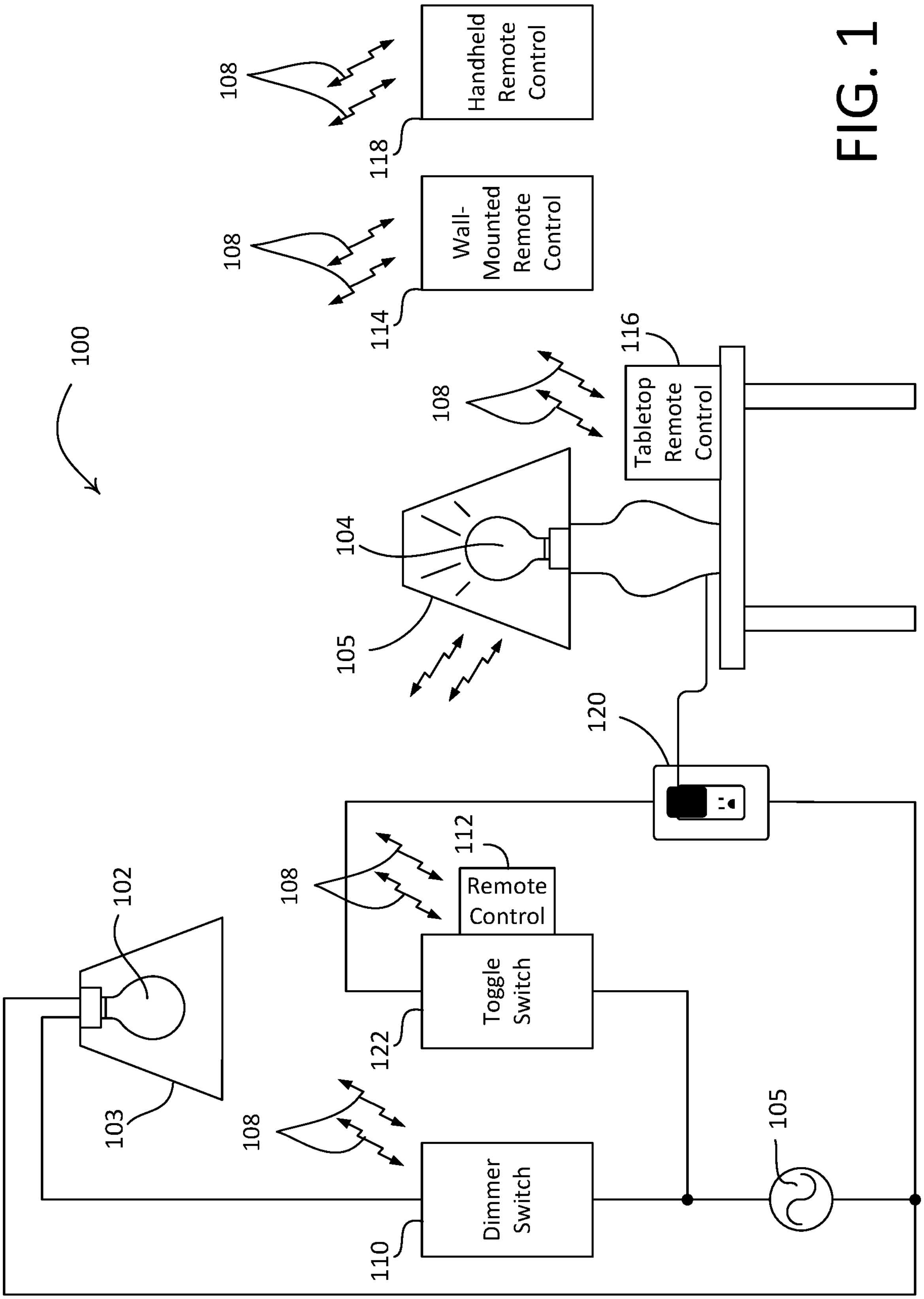
FIG. 1 depicts an example load control system that includes one or more example control devices.

FIG. 1 is a simplified block diagram of an example load control system. As shown, the load control system is configured as a lighting control system 100 for control of one or more lighting loads, such as a lighting load 102 that is installed in a ceiling-mounted downlight fixture 103 and a controllable lighting load 104 that is installed in a table lamp 105. The lighting loads 102, 104 shown in FIG. 1 may include light sources of different types (e.g., incandescent lamps, fluorescent lamps, and/or LED light sources). The lighting loads may have advanced features. For example, the lighting loads may be controlled to emit light of varying intensities and/or colors in response to a user command. The amount of power delivered to the lighting loads may be adjusted to an absolute level or by a relative amount. The lighting control system 100 may be configured to control one or more of the lighting loads (e.g., and/or other electrical loads) according to one or more configurable presets or scenes. These presets or scenes may correspond to, for example, predefined light intensities and/or colors, predefined entertainment settings such as music selection and/or volume settings, predefined window treatment settings such as positions of shades, predefined environmental settings such as HVAC settings, or any combination thereof. The presets or scenes may correspond to one or more specific electrical loads (e.g., bedside lamps, ceiling lights, etc.) and/or one or more specific locations (e.g., a room, an entire house, etc.).

The lighting load 102 may be an example of a lighting load that is wired into a power control and/or delivery path of the lighting control system 100. As such, the lighting load 102 may be controllable by a wall-mounted control device such as a dimmer switch. The lighting load 104 may be an example of a lighting load that is equipped with integral load control circuitry and/or wireless communication capabilities such that the lighting load may be controlled via a wireless control mechanism (e.g., by a remote control device).

The lighting control system 100 may include one or more control devices for controlling the lighting loads 102, 104 (e.g., controlling an amount of power delivered to the lighting loads). The lighting loads 102, 104 may be controlled substantially in unison, or be controlled individually. For example, the lighting loads may be zoned so that the lighting load 102 may be controlled by a first control device, while the lighting load 104 may be controlled by a second control device. The control devices may be configured to turn the lighting loads 102, 104 on and off. The control devices may be configured to control the magnitude of a load current conducted through the lighting loads (e.g., so as to control an intensity level of the lighting loads 102, 104 between a low-end intensity level $L_{LE}$ and a high-end intensity level $L_{HE}$). The control devices may be configured to control an amount of power delivered to the lighting loads to an absolute level (e.g., to a maximum allowable amount), or by a relative amount (e.g., an increase of 10% from a current level). The control devices may be configured to control a color of the lighting load 102, 104 (e.g., by controlling a color temperature of the lighting loads or by applying full color control over the lighting loads).

The control devices may be configured to activate a preset associated with the lighting load 102, 104. A preset may be associated with one or more predetermined settings of the lighting loads, such as an intensity level of the lighting loads and/or a color of the lighting loads. The presets may be configured via the control device and/or via an external device (e.g., a mobile device) by way of a wireless communication circuit of the control device. The control devices may be configured to activate control of a zone. A zone may correspond to one or more electrical loads that are configured to be controlled by the control devices. A zone may be associated with a specific location (e.g., a living room) or multiple locations (e.g., an entire house with multiple rooms and hallways). The control devices may be configured to switch between different operational modes. An operational mode may be associated with controlling different types of electrical loads or different operational aspects of one or more electrical loads. Examples of operational modes may include a lighting control mode for controlling one or more lighting loads (e.g., which in turn may include a color control mode and an intensity control mode), an entertainment system control mode (e.g., for controlling music selection and/or the volume of an audio system), an HVAC system control mode, a winter treatment device control mode (e.g., for controlling one or more shades), and/or the like.

One or more characteristics of the control device and/or the lighting load 102, 104 described herein may be customized via an advanced programming mode (APM). Such characteristics may include, for example, an intensity level associated with a preset, a fade-on/fade-off time, enablement/disablement of visible indicators, a low-end trim (e.g., a minimum intensity level to which the lighting load 102, 104 may be set by the control device), a high-end trim (e.g., a maximum intensity level to which the lighting load 102, 104 may be set by the control device), and/or the like. Examples of an advanced programming mode for a wall-mounted load control device can be found in U.S. Pat. No. 7,190,125, issued Mar. 13, 2007, entitled PROGRAMMABLE WALLBOX DIMMER, the entire disclosure of which is hereby incorporated by reference. The control device may be manipulated to enter the advanced programming mode in various ways. For instance, the control device may be moved into the advanced programming mode via a press-and-hold or a double-tap applied to a front area of the control device. Ways to activate the advanced programming mode for a control device will be described in greater detail below.

The control device described herein may be, for example, a wall-mounted load control device 110 (e.g., a dimmer switch and/or an electronic switch), a retrofit remote control device 112, a wall-mounted remote control device 114, a tabletop remote control device 116, and/or a handheld remote control device 118, as shown in FIG. 1. The wall-mounted load control device 110 may be configured to be mounted to a standard electrical wallbox (e.g., via a yoke) and be coupled in series electrical connection between an alternating-current (AC) power source 105 and a lighting load that is wired into the control path of the wall-mounted load control device 110 (e.g., such as the lighting load 102). The wall-mounted load control device 110 may receive an AC mains line voltage $V_{AC}$ from the AC power source 105, and the wall-mounted load control device 110 may generate a control signal for controlling the lighting load 102. The control signal may be generated via various phase-control techniques (e.g., a forward phase-control dimming technique or a reverse phase-control dimming technique). The wall-mounted load control device 110 may be configured to receive wireless signals (e.g., from a remote control device) representative of commands to control the lighting load 102, and generate respective control signals for executing the commands. Examples of wall-mounted dimmer switches are described in greater detail in commonly-assigned U.S. Pat. No. 8,664,881, issued Mar. 4, 2014, entitled TWO-WIRE DIMMER SWITCH FOR LOW-POWER LOADS, and U.S. Patent Application Publication 2020/0382120, published Dec. 3, 2020, entitled LOAD CONTROL DEVICE HAVING A CAPACITIVE TOUCH SURFACE, the entire disclosures of which are hereby incorporated by reference.

The retrofit remote control device 112 may be configured to be mounted to a mechanical switch (e.g., a toggle switch 122) that may be pre-existing in the lighting control system 100. Such a retrofit solution may provide energy savings and/or advanced control features, for example without requiring significant electrical re-wiring and/or without requiring the replacement of existing mechanical switches. As an example, a consumer may replace an existing lamp with the controllable lighting load 104, switch a toggle switch 122 that is coupled to the lighting load 104 to the on position, install (e.g., mount) the remote control device 112 onto the toggle switch 122, and associate the remote control device 112 with the lighting source 104. The retrofit remoted control 112 may then be used to perform advanced functions that the toggle switch 122 may be incapable of performing (e.g., such as dimming the intensity level of the light output, changing the color of the light output, providing feedback to a user, etc.). As shown, the toggle switch 122 is coupled (e.g., via a series electrical connection) between the AC power source 105 and an electrical receptacle 120 into which the lighting load 104 may be plugged (e.g., as shown in FIG. 1). Alternatively, the toggle switch 122 may be coupled between the AC power source 105 and one or more of the lighting loads 102, 104, without the electrical receptacle 120.

The wall-mounted remote control device 114 may be configured to be mounted to a standard electrical wallbox and be electrically connected to the AC power source 105 for receiving power. The wall-mounted remote control device 114 may be configured to receive a user input and may generate and transmit a control signal (e.g., control data such as a digital message) for controlling the lighting loads 102, 104 in response to the user input. The tabletop remote control device 116 may be configured to be placed on a surface (e.g., an end table or nightstand), and may be powered by a direct-current (DC) power source (e.g., a battery or an external DC power supply plugged into an electrical outlet). The tabletop remote control device 116 may be configured to receive a user input, and may generate and transmit a signal (e.g., a digital message) for controlling the lighting loads 102, 104 in response to the user input. The handheld remote control device 118 may be sized to fit into a user's hand, and may be powered by a direct-current (DC) power source (e.g., a battery or an external DC power supply plugged into an electrical outlet). The handheld remote control device 118 may be configured to receive a user input, and may generate and transmit a signal (e.g., a digital message) for controlling the lighting loads 102, 104 in response to the user input. Examples of battery-powered remote controls are described in greater detail in commonly assigned U.S. Pat. No. 8,330,638, issued Dec. 11, 2012, entitled WIRELESS BATTERY POWERED REMOTE CONTROL HAVING MULTIPLE MOUNTING MEANS, the entire disclosure of which is hereby incorporated by reference.

It should be appreciated that, although a lighting control system with one or more lighting loads are provided examples herein, a load control system as described herein may include more or fewer lighting loads, other types of lighting loads, and/or other types of electrical loads that may be configured to be controlled by the one or more control devices described herein. That is, the control devices are not limited to the control of just lighting loads. For example, the load control system may include one or more of and the control devices may be configured to control one or more of: a dimming ballast for driving a gas-discharge lamp; an LED driver for driving an LED light source; a dimming circuit for controlling the intensity level of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; one or more motorized interior and/or exterior shutters; a thermostat for a heating and/or cooling system; a temperature control device for controlling a setpoint temperature of a heating, ventilation, and air-conditioning (HVAC) system; an air conditioner; a compressor; an electric baseboard heater controller; a controllable damper; a variable air volume controller; a fresh air intake controller; a ventilation controller; one or more hydraulic valves for use in radiators and radiant heating system; a humidity control unit; a humidifier; a dehumidifier; a water heater; a boiler controller; a pool pump; a refrigerator; a freezer; a television and/or computer monitor; a video camera; an audio system or amplifier; an elevator; a power supply; a generator; an electric charger, such as an electric vehicle charger; an alternative energy controller; and/or the like.

Figure 2:
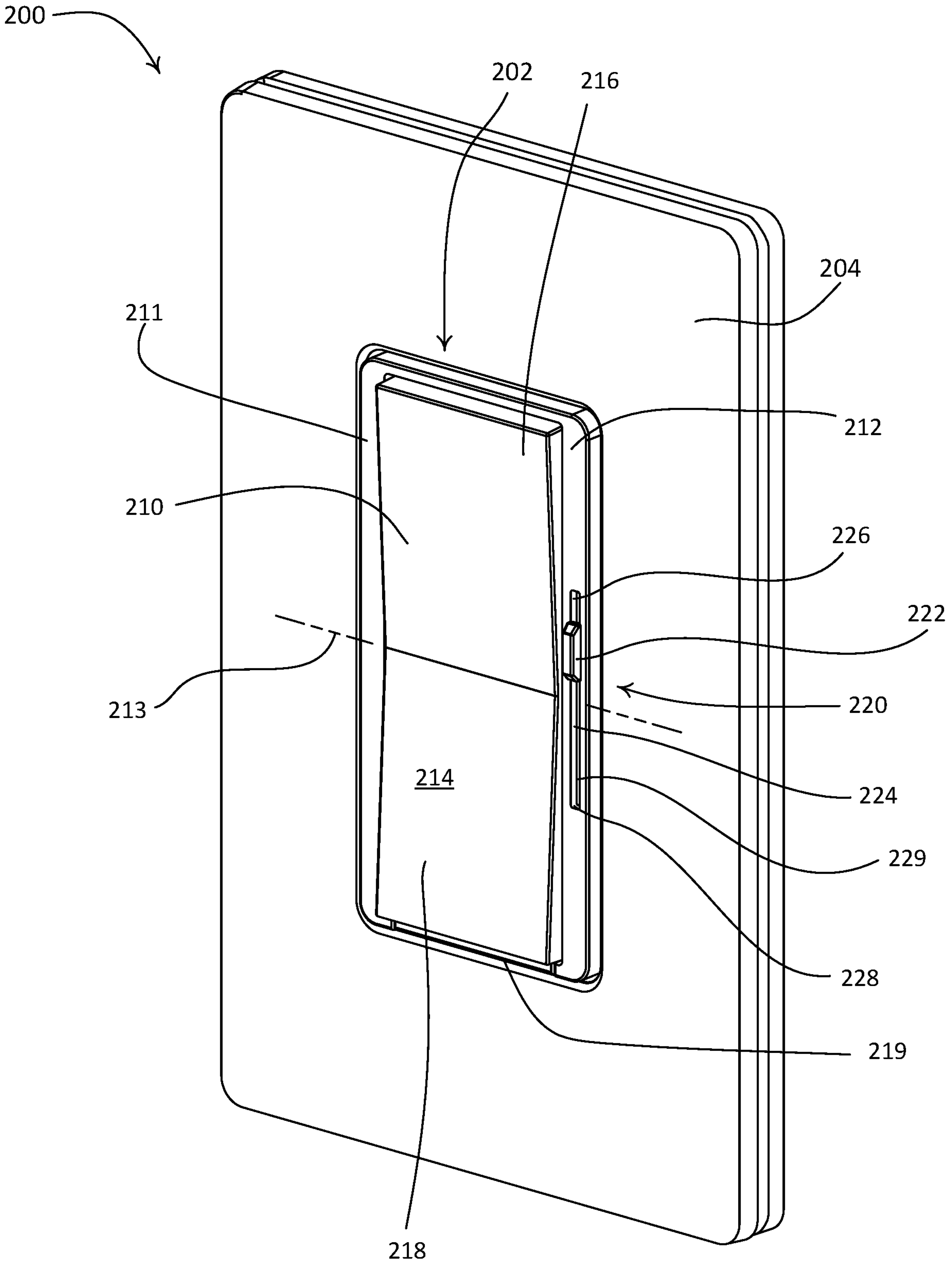
FIG. 2 is a perspective view of an example control device that may be deployed as a wall-mounted load control device, a retrofit remote control device, and/or a wall-mounted remote control device of the load control system illustrated in FIG. 1.

FIG. 2 is a front perspective view of an example control device 200 that may be deployed as the wall-mounted load control device 110, the retrofit remote control device 112, and/or the wall-mounted remote control device 114 in the lighting control system 100. The control device 200 may comprise a user interface 202 and a faceplate 204. The control device 200 may be configured to control the amount of power delivered to an electrical load. For example, the electrical load may comprise a lighting load, and the control device 200 may be configured to control the amount of power delivered to the lighting load to control a present intensity level $L_{PRES}$ of the lighting load. The control device 200 may be configured to turn the lighting load on or off or adjust the intensity level of the lighting load by controlling an internal load control circuit (e.g., a controllably conductive device of the control device 200) and/or by transmitting a message for controlling the lighting load via a communication circuit, e.g., via one or more wireless signals, such as radio-frequency (RF) signals.

The control device 200 may comprise an air-gap actuator 219 configured to open and close an air-gap switch (not shown) that is adapted to be electrically coupled (e.g., substantially directly electrically coupled) in series between a power source (e.g., an AC power source) and the lighting load. The air-gap switch may be opened in response to pulling the air-gap switch actuator 219 out from the control device 200 to provide an actual air-gap barrier between the power source and the lighting load to facilitate servicing of the lighting load.

The user interface 202 of the control device 200 may include an actuation member 210 that is configured to be received in an opening in a front surface 211 of a bezel 212 (e.g., a base portion) of the control device 200. The actuation member 210 may comprise a front surface 214 including an upper portion 216 and a lower portion 218. The actuation member 210 may be configured to rest in an idle position (e.g., a centered position) when not being actuated (e.g., as shown in FIG. 2). The actuation member 210 may be configured to pivot about a pivot axis 213 (e.g., a central axis) in response to an actuation of the upper portion 216 or the lower portion 218. The actuation member 210 may be a return-to-idle (e.g., a return-to-center) actuator. For example, the upper portion 216 of the actuation member 210 may be configured to be depressed towards the control device 200 during an actuation of the upper portion 216 (e.g., for actuating a first internal momentary tactile switch inside the control device 200) and may be configured to return to the idle position when the upper portion 216 of the actuation member 210 is released. In addition, the lower portion 218 of the actuation member 210 may be configured to be depressed towards the control device 200 during an actuation of the lower portion 218 (e.g., for actuating a second internal momentary tactile switch inside the control device 200) and may be configured to return to the idle position when the lower portion 218 of the actuation member 210 is released.

The control device 200 may be configured to control a lighting load of the lighting control system 100 to turn the lighting load on in response to an actuation of the upper portion 216, and to turn the lighting load off in response to an actuation of the lower portion 218 (or vice versa). For example, the control device 200 may include a controllably conductive device adapted to be coupled in series electrical connection between an alternating current (AC) power source and the lighting load. The control device 200 may be configured to control the amount of power delivered to the lighting load (e.g., turn the lighting load on and off) in response to actuations of the actuation member 210. For example, the control device 200 may control the controllable conductive device to turn on (e.g., connect the AC power source to) the lighting load in response to an actuation of the upper portion 216 of the actuation member 210, and control the controllable conducive device to turn off (e.g., disconnect the AC power source from) the lighting load in response to an actuation of the lower portion 218 of the actuation member 210.

The control device 200 may include an analog adjustment actuator that is configured to provide a local control command of the lighting load to control a characteristic of the lighting load (e.g., intensity level and/or color of a lighting load, speed of a motor, etc.), and the position of a movable component of the analog adjustment actuator may indicate a value of the characteristic of the lighting load via local control. The control device 200 is described primarily with reference to intensity control of a lighting load but is not so limited. For example, the control device 200 may include an analog intensity adjustment actuator to provide a local control command of the lighting load. The analog intensity adjustment actuator may include a movable component, such as a slider knob or rotatory knob, and the position of the movable component (e.g., the position of the slider knob along the length of the slider slot or the rotational position of the rotary knob) may indicate the commanded intensity level $L_{CMD}$ of the lighting load (e.g., via local control). For example, the analog intensity adjustment actuator may be configured to adjust a variable characteristic, like resistance, that is variable based on the position of the movable component. Stated another way, the analog intensity adjustment actuator may include a movable component that is moveable about the bezel 212 of the control device 200, and the position of the movable component (e.g., relative to the bezel 212) may indicate the commanded intensity level $L_{CMD}$ of the lighting load via local control. In some examples, the analog intensity adjustment actuator may include a potentiometer (e.g., a potentiometer that is an analog circuit and/or or a digital potentiometer circuit). For instance, the analog intensity adjustment actuator may include an intensity adjustment actuator that is commonly used in an analog dimmer switch (e.g., a dimmer switch that does not include a microprocessor but allows for intensity adjustment), for example, even though the control device 200 may comprises a control circuit (e.g., as described herein).

As shown in FIG. 2, the analog intensity adjustment actuator may comprise a slider actuator 220 having a slider knob 222 configured to move along (e.g., within) an elongated slot, such as a slider slot 224. The slider slot 224 may be an elongated opening in the bezel 212 of the control device 200. For example, the slider slot 224 may be located adjacent to the actuation member 210. The control device 200 may be configured to control the magnitude of a load current conducted through the lighting load (e.g., and thus the present intensity level $L_{PRES}$ of the lighting load) in response to movement of the slider knob 222 along the slider slot 224. Accordingly, the control device 200 may be configured to adjust the present intensity level $L_{PRES}$ of the lighting load from an initial intensity level $L_{INIT}$ to a commanded intensity level $L_{CMD}$ in response to actuations of the analog intensity adjustment actuator (e.g., movement of the slider knob 222 along the slider slot 224). The initial intensity level $L_{INIT}$ may be the intensity level of the lighting load before actuation, while the commanded intensity level $L_{CMD}$ may be determined based on the relative position of the slider knob 222 along the slider slot 224 in response to user actuation. As such, the control device 200 may receive a local control command of the lighting load in response to actuations of the analog intensity adjustment actuator by the user. The position of the slider knob 222 along the length of the slider slot 224 may indicate a relative intensity (e.g., the commanded intensity level $L_{CMD}$) of the lighting load (e.g., via local control).

When, for example, the lighting load is on, the control device 200 may control the present intensity level $L_{PRES}$ of the lighting load in response to movement of the slider knob 222 along the slider slot 224. When the lighting load is off, the control device 200 may not adjust the present intensity level $L_{PRES}$ of the lighting load in response to movement of the slider knob 222. But, when the lighting load is off and the upper portion 216 of the actuation member 210 is actuated, the control device 200 may turn on the lighting load to an intensity level determined based on the position of the slider knob 222 along the slider slot 224.

The control device 200 may include a potentiometer, which may be adjusted in response to a user input provided to the slider knob 222 in order to adjust the present intensity level $L_{PRES}$ of the lighting load. For example, the potentiometer may generate a direct-current (DC) voltage representative of a desired intensity level of the lighting load (e.g., the commanded intensity level $L_{CMD}$). In some examples, the potentiometer may provide a variable resistance based on the position of the slider knob 222 along the slider slot 224. For example, the potentiometer may be coupled to intensity adjustment actuator (e.g., the slider knob 222), for example, as described in more detail herein. The slider knob 222 may allow a user to adjust the present intensity level $L_{PRES}$ of the lighting load from a low-end intensity level $L_{LE}$ to a high-end intensity level $L_{HE}$. Alternatively, in some examples, the control device 200 may include a linear encoder, a combination of a wiper and a resistive trace on a printed circuit board of the control device 200, a mechanical or magnetic encoder, etc. instead of a potentiometer.

The slider knob 222 may be configured to move in a linear direction, such as a vertical direction along the slider slot 224 between a low-end position 226 (e.g., where the slider knob 222 is located at the bottom of the slider slot 224) and a high-end position 228 (e.g., where the slider knob 222 is located at the top of the slider slot 224). The slider knob 222 may allow for adjustment of the present intensity level $L_{PRES}$ of the lighting load from the low-end intensity level $L_{LE}$ (e.g., when the slider knob 222 is located in the low-end position 226) to the high-end intensity level $L_{HE}$ (e.g., when the slider knob 222 is located in the high-end position 228). Accordingly, the slider knob 222 may be configured to move in a vertical direction along the length of the slider slot 224 of the bezel 212, and the bezel 212 may be configured to be received in an opening of the faceplate 204. Although primarily described in context of a slider actuator 220 that moves or slides along the slider slot 224 (e.g., moves continuously along the slider slot 224), in other examples the control device 200 may include a slider actuator that moves in discrete increments (e.g., steps) along the slider slot 224.

The user interface 202 of the control device 200 may include a visible display, such as an illumination surface 229. For example, the illumination surface 229 of the user interface 202 may extend for the length of the slider slot 224. The illumination surface 229 of the user interface 202 may be illuminated to provide a nightlight feature, for example, when the lighting load is off. In addition, the control device 200 may comprise an internal actuator adjustment system for allowing the control circuit of the control device 200 to adjust the position of the slider knob 222 along the length of the slider slot 224 (e.g., as will be described in greater detail below).

Although illustrated and described as being configured to move in the vertical direction, in some examples the slider knob 222 may be configured to move in the horizontal direction. In such instances, the slider slot 224 may be located in the bezel 212 above or below the actuation member 210 (e.g., or within the actuation member 210) along the horizontal direction. Further, in such instances, the low-end position may be towards the leftmost side of the slider slot 224, while the high-end position may be towards the rightmost side of the slider slot 224. Further, in some examples, the analog intensity adjustment actuator may include a rotary knob (e.g., a non-continuously rotatable rotary knob) that is configured to be rotatable with respect to the bezel 212 to provide a local control command of the lighting load. For instance, the rotary knob may be characterized by non-continuous rotation between a high-end stopping point (e.g., associated with the high-end intensity level $L_{HE}$ of the lighting load) and a low-end stopping point (e.g., associated with the low-end intensity level $L_{LE}$ of the lighting load).

The control device 200 may comprise a wireless communication circuit. The wireless communication circuit may include for example, a radio-frequency (RF) transceiver coupled to an antenna for transmitting and/or receiving RF signals. The wireless communication circuit may also include an RF transmitter for transmitting RF signals, an RF receiver for receiving RF signals, and/or an infrared (IR) transmitter and/or receiver for transmitting and/or receiving IR signals. The wireless communication circuit may be configured to transmit messages (e.g., digital messages) via one or more wireless signals (e.g., RF signals). The message may include the control data (e.g., one or more commands) generated by the control circuit for controlling the lighting load. The wireless communication circuit may be configured to receive a message (e.g., digital message) from one or more remote control devices of the load control system (e.g., the retrofit remote control device 112, the wall-mounted remote control device 114, the tabletop remote control device 116, the handheld remote control device 118, a smart phone, a tablet, a computer, and/or the like) via the wireless communication circuit. The message may include a command to turn on or a command to turn off the lighting load controlled by the control device 200. In addition, the message may include a command to adjust the present intensity level $L_{PRES}$ of the lighting load controlled by the control device 200 from an initial intensity level $L_{INIT}$ of the lighting load to a commanded intensity level $L_{CMD}$ indicated by the message (e.g., the message may include the commanded intensity level $L_{CMD}$). The wireless communication circuit may enable the control device 200 to receive commands for remote control of the lighting load (e.g., in addition to the local control provided via the actuation member 210 and the slider actuator 220). For example, the control device 200 may be configured to be associated with one or more of the remote control devices of the load control system during an association procedure.

In response to receiving a message from a remote device, the control device 200 may control the lighting load to the commanded intensity level $L_{CMD}$ indicated by the command in the message (e.g., a remote control command). The remote device may, for example, include any combination of the retrofit remote control device 112, the wall-mounted remote control device 114, the tabletop remote control device 116, the handheld remote control device 118, a smart phone, tablet, and/or the like. The control device 200 may be configured to update the position of the slider knob 222 when the lighting load is controlled remotely. For example, in response to receiving a message from a remote device, the control device 200 may adjust the position of the slider knob 222 to a position that corresponds to the commanded intensity level $L_{CMD}$ indicated by the command in the message. In addition, the control circuit of the control device 200 may be configured to cause the position of the slider knob 222 to be adjusted along the length of the slider slot 224 (e.g., using the internal actuator adjustment system) in response to the commanded intensity level $L_{CMD}$ indicated by the command in the message. The position of the slider knob 222 along the length of the slider slot 224 may indicate the commanded intensity level $L_{CMD}$ of the lighting load (e.g., via local and remote control). The present intensity level $L_{PRES}$ of the lighting load may be synchronized with the position of the slider knob 222 along the slider slot 224 (e.g., the position of the slider knob 222 along the length of the slider slot 224 may indicate the present intensity level $L_{PRES}$ of the lighting load) in response to both local and remote control.

Figure 3:
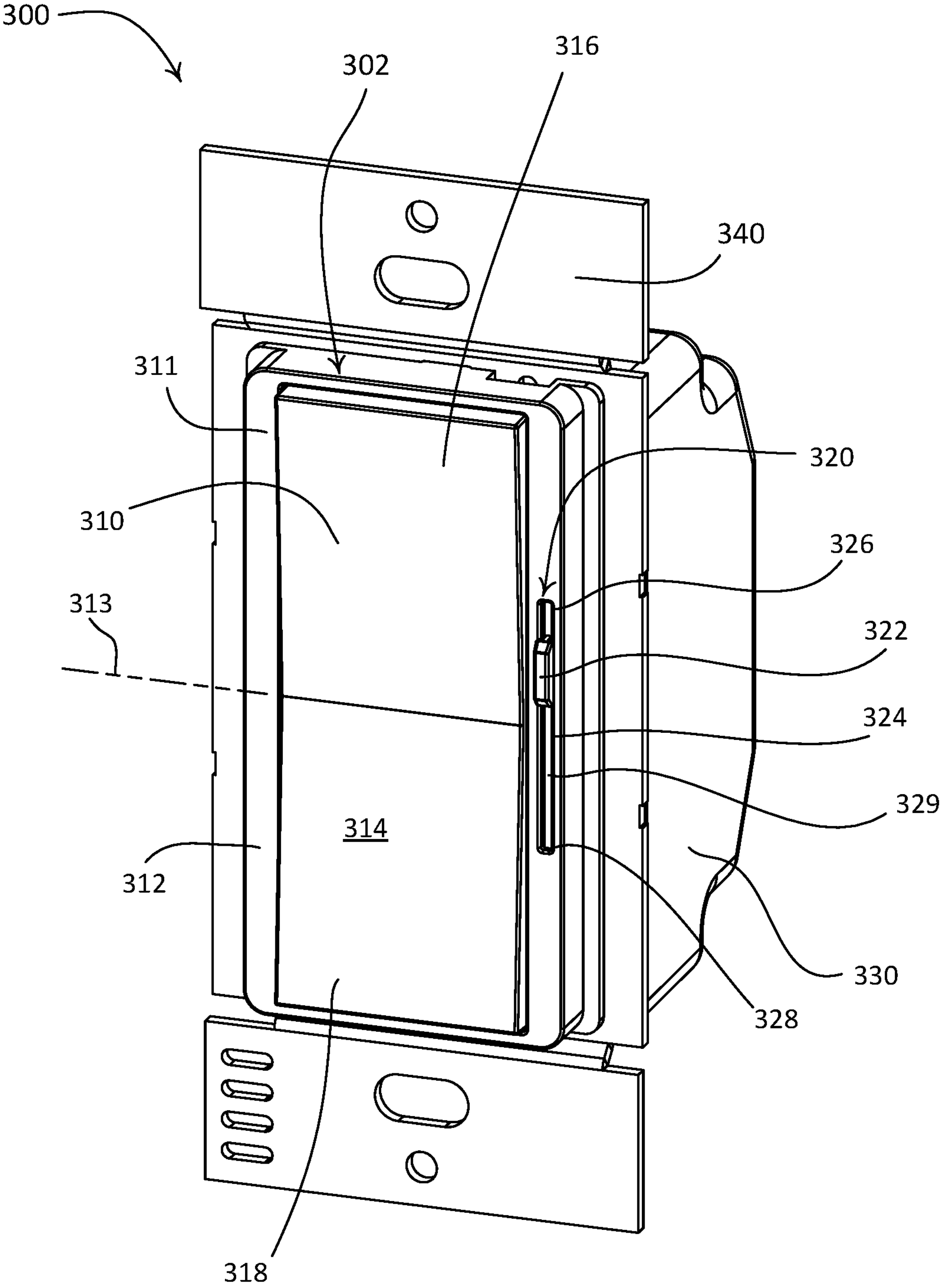
FIG. 3 is a perspective view of an example control device without a faceplate that may be deployed as a wall-mounted load control device of the load control system illustrated in FIG. 1.
Figure 4:
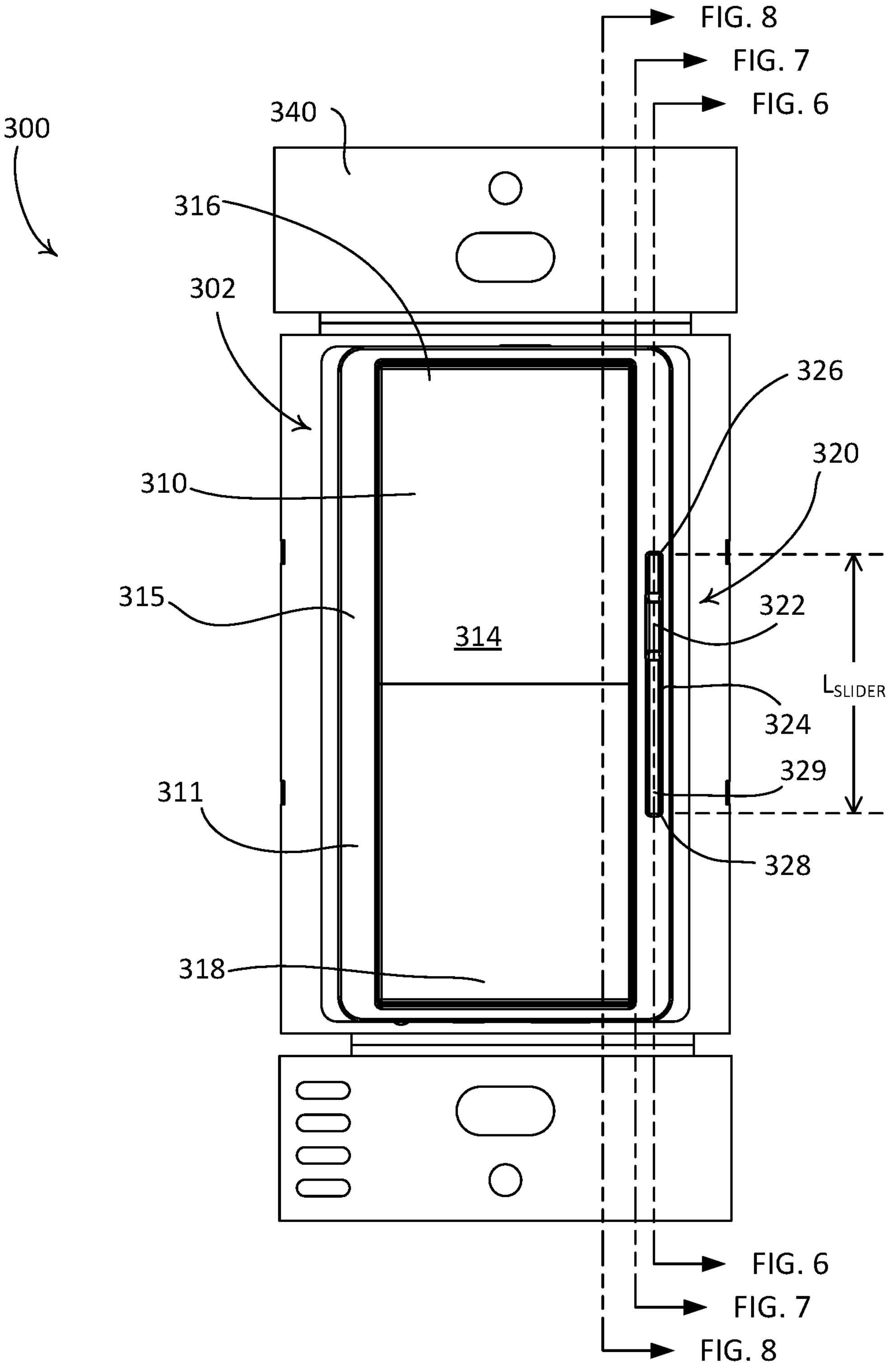
FIG. 4 is a front view of the control device of FIG. 3.

FIGS. 3-14 depict an example control device 300 that may be deployed as the wall-mounted load control device 110, the retrofit remote control device 112, and/or the wall-mounted remote control device 114 in the lighting control system 100 shown in FIG. 1. FIG. 3 is a perspective view of the control device 300 and FIG. 4 is a front view of the control device 300. The control device 300 may be an example of the control device 200. The control device 300 may be configured to be installed in an electrical wallbox with a faceplate (e.g., the faceplate 204). The control device 300 may comprise a user interface 302 (e.g., the user interface 202) that may be configured to be received in an opening of the faceplate. The control device 300 may be configured to control the amount of power delivered to an electrical load, such as a lighting load. The control device 300 may be configured to control the lighting load, for example, to turn the lighting load on or off (e.g., in response to actuations of an actuation member) and/or adjust a present intensity level $L_{PRES}$ of the lighting load. For example, the control device 300 may control the lighting load by controlling an internal load control circuit and/or by transmitting a message for controlling the lighting load via a communication circuit (e.g., a wireless signal via a wireless communication circuit). When the control device 300 is a wall-mounted load control device, such as a wall-mounted dimmer switch, the control device 300 may comprise an enclosure 330 for housing load control circuitry of the dimmer switch. The control device 300 may be configured to indicate the present intensity level $L_{PRES}$ of the lighting load, for example, when the lighting load is controlled remotely and/or locally.

The user interface 302 of the control device 300 may include an actuation member 310 that is configured to be operably attached (e.g., mounted) to a base portion (e.g., bezel 312) of the control device 300. The actuation member 310 may be received in an opening in a front surface 311 of the bezel 312. The actuation member 310 may comprise a front surface 314 including an upper portion 316 and a lower portion 318. The actuation member 310 may be configured to rest in an idle position when not being actuated (e.g., as shown in FIG. 3). The actuation member 310 may be configured to pivot about a pivot axis 313 (e.g., a central axis) in response to an actuation of the upper portion 316 or the lower portion 318. The actuation member 310 may be a return-to-idle (e.g., a return-to-center) actuator. For example, the upper portion 316 of the actuation member 310 may be configured to be depressed towards the control device 300 during an actuation of the upper portion 316 and may be configured to return to the idle position when the upper portion 316 of the actuation member 310 is released. In addition, the lower portion 318 of the actuation member 310 may be configured to be depressed towards the control device 300 during an actuation of the lower portion 318 and may be configured to return to the idle position when the lower portion 318 of the actuation member 310 is released.

The control device 300 may be configured to turn the lighting load on in response to an actuation of the upper portion 316, and to turn the lighting load off in response to an actuation of the lower portion 318 (or vice versa). For example, the control device 300 may include a controllably conductive device adapted to be coupled in series electrical connection between an alternating current (AC) power source and the lighting load. The control device 300 may be configured to control the amount of power delivered from the AC power source to the lighting load (e.g., to turn the lighting load on and off) in response to actuations of the actuation member 310. For example, the control device 300 may control the controllable conductive device to turn on (e.g., connect the AC power source to) the lighting load in response to an actuation of the upper portion 316 of the actuation member 310, and control the controllable conducive device to turn off (e.g., disconnect the AC power source from) the lighting load in response to an actuation of the lower portion 318 of the actuation member 310.

The control device 300 may include an analog intensity adjustment actuator, such as a slider actuator 320 having a slider knob 322 configured to move along (e.g., within) an elongated slot, such a slider slot 324. The slider slot 324 may be an elongated opening in the bezel 312 of the control device 300 and may extend for a length $L_{SLIDER}$. For example, the slider slot 324 may be located adjacent to the actuation member 310. The control device 300 may control the magnitude of a load current conducted through the lighting load (e.g., to adjust a present intensity level $L_{PRES}$ of the lighting load) in response to movement of the slider knob 322 along the slider slot 324. Accordingly, the control device 300 may be configured to adjust a present intensity level $L_{PRES}$ of the lighting load from an initial intensity level $L_{INIT}$ to a commanded intensity level $L_{CMD}$ in response to actuations of the analog intensity adjustment actuator (e.g., movement of the slider knob 322 along the slider slot 324). The position of the slider knob 322 along the length of the slider slot 324 may indicate the commanded intensity level $L_{CMD}$ of the lighting load (e.g., via local control). For example, when the lighting load is on, the control device 300 may control the present intensity level $L_{PRES}$ of the lighting load in response to movement of the slider knob 322 along the slider slot 324. When the lighting load is off, the control device 300 may not adjust the present intensity level $L_{PRES}$ of the lighting load in response to movement of the slider knob 322. But, when the lighting load is off and the upper portion 316 of the actuation member 310 is actuated, the control device 300 may turn on the lighting load to an intensity level determined based on the position of the slider knob 322 within the slider slot 324.

The slider knob 322 may be configured to move in a vertical direction along the slider slot 324 between a low-end position 326 and a high-end position 328. The slider knob 322 of the slider actuator 320 may allow for adjustment of the present intensity level $L_{PRES}$ of the lighting load between the low-end intensity level $L_{LE}$ (e.g., when the slider knob 322 is located in the low-end position 326) to the high-end intensity level $L_{HE}$ (e.g., when the slider knob 322 is located in the high-end position 328). Accordingly, the slider knob 322 may be operable to move in a vertical direction along the length of the slider slot 324 of the bezel 312, and the bezel 312 may be configured to be received in an opening of the faceplate. Although primarily described in context of a slider actuator 320 that moves or slides along the slider slot 324 (e.g., moves continuously along the slider slot 324), in other examples the control device 300 may include a slider actuator that moves in discrete increments (e.g., steps) along the slider slot 324. Further, although illustrated as moving in a linear, vertical direction, the slider knob 322 may be configured to move behind a similarly configured slider slot 324 in a linear, horizontal direction or a linear, diagonal direction across the bezel 312 and/or the actuation member 310.

Figure 5:
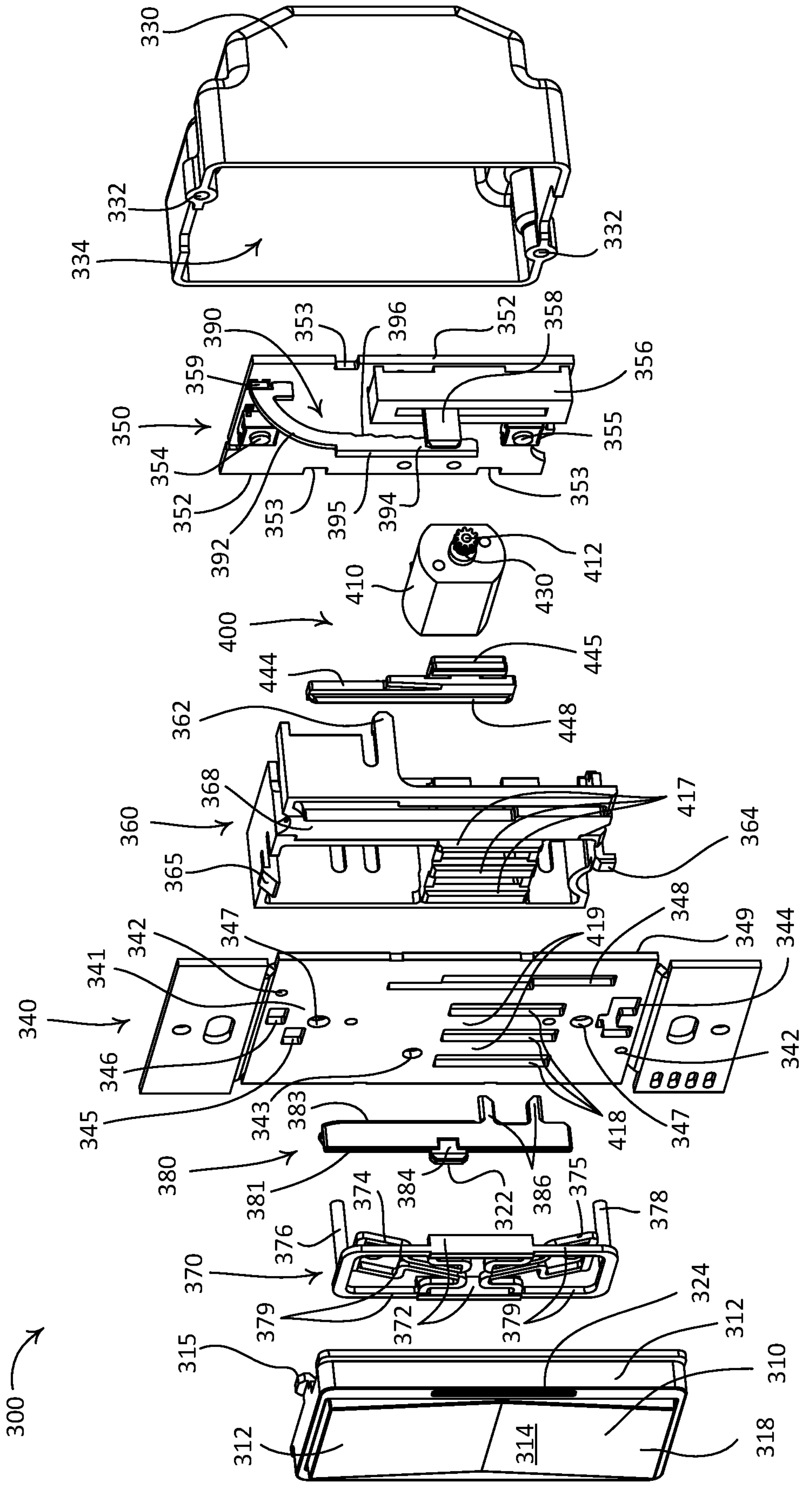
FIGS. 5 and 6 are exploded views of the control device of FIG. 3.
Figure 6:
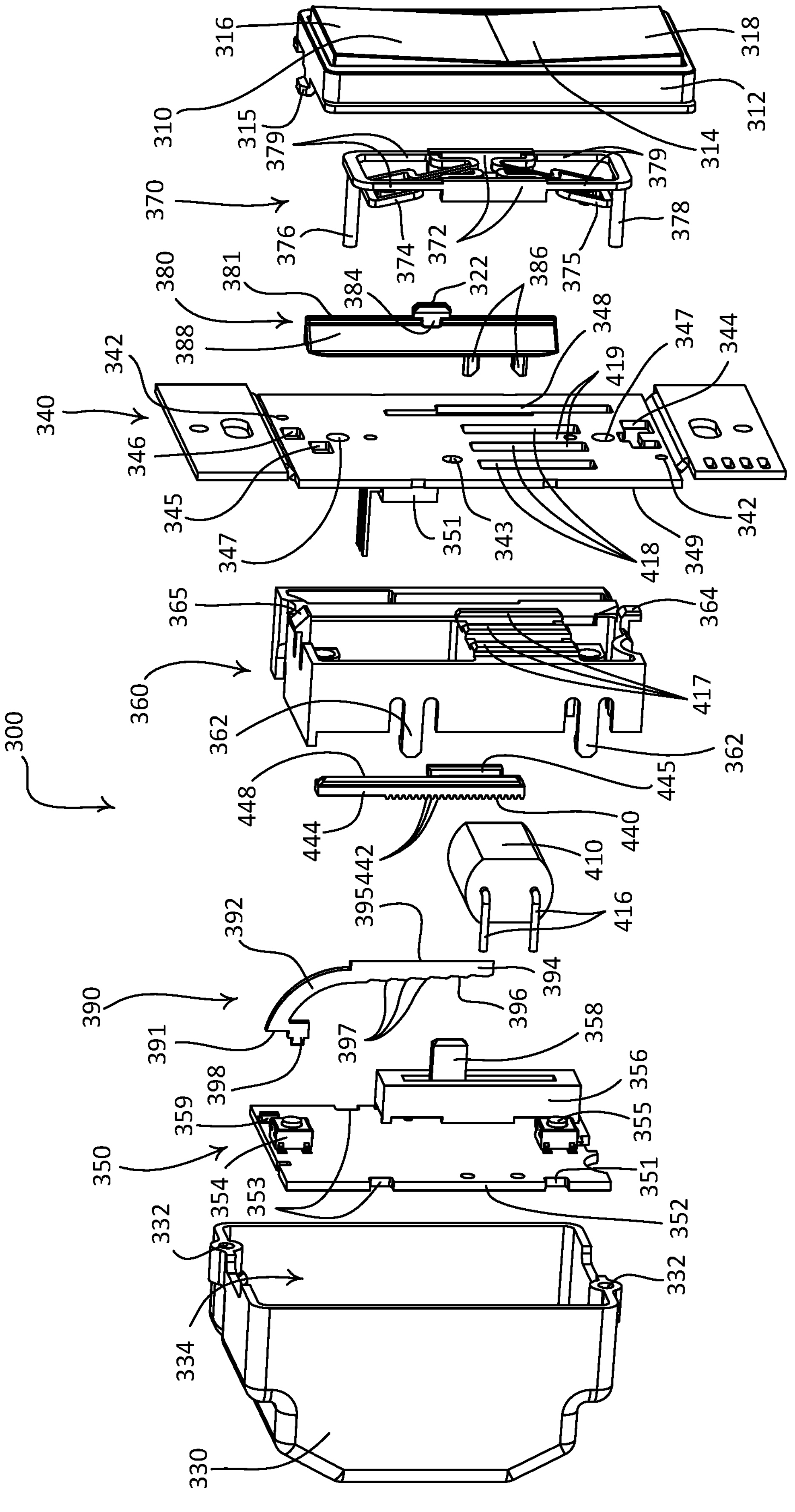

FIGS. 5 and 6 are exploded views of the control device 300. FIGS. 7-11 are cross-section views of the control device 300. The control device 300 may comprise a yoke 340 that may be connected to the enclosure 330 and may be configured to mount the control device 300 to an electrical wallbox. For example, the enclosure 330 may be connected to the yoke 340 via fasteners (e.g., screws—not shown) received through openings 342 in the yoke 340 and respective openings 332 in the enclosure 330. Although illustrated with the enclosure 330, in some examples, such as when the control device 300 is a wireless remote control device, the enclosure 330 may be omitted. In such examples, the control device 300 may connect to a base that is affixed to the toggle or paddle actuator of a standard light switch.

Figure 37:
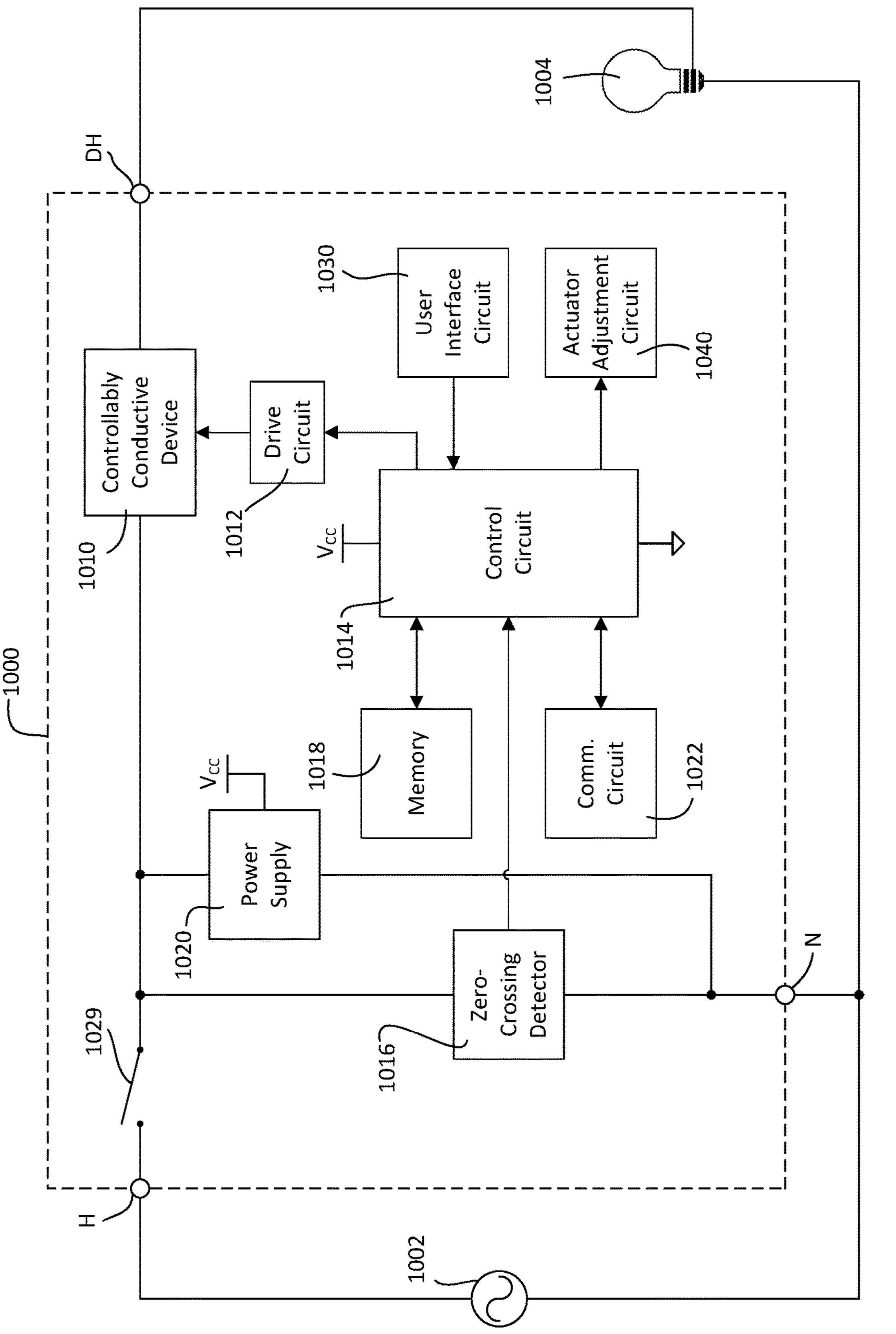
FIG. 37 is a block diagram of an example control device that may be deployed as the control devices of FIGS. 1-36.
Figure 38A:
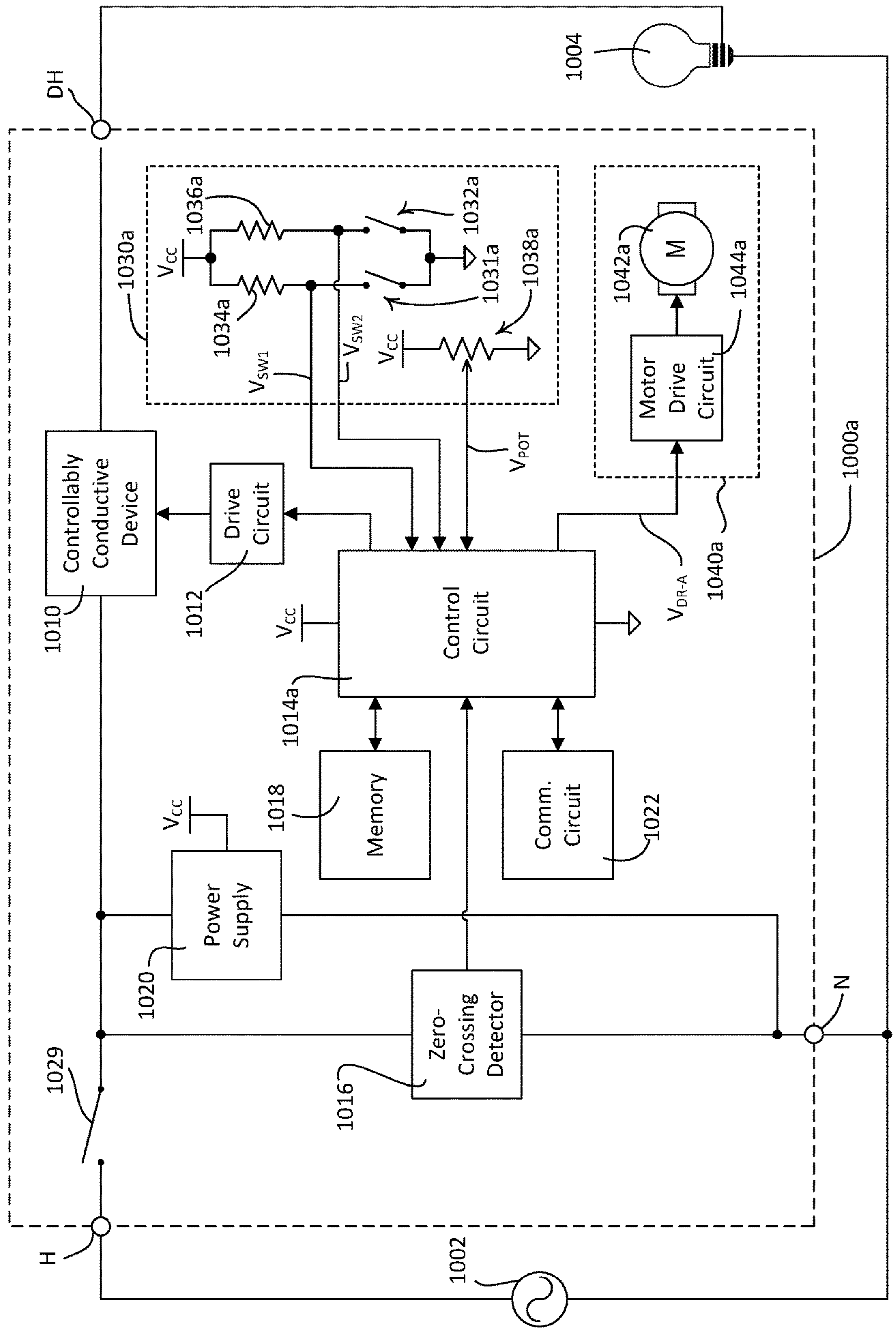
FIG. 38A-38E are block diagrams of example control devices that may be deployed as one or more of the control devices of FIGS. 1-36.

The enclosure 330 may house the load control circuitry of the control device 300, which may be mounted to a printed circuit board (PCB) 350 of the control device 300. For example, the load control circuitry of the control device 300 may comprise a controllably conductive device 351 configured to be electrically coupled to the load control circuitry mounted to the printed circuit board 350. The controllably conductive device 351 (e.g., a heat sink of the controllably conductive device 351) may be thermally coupled to the yoke 330. For example, the heat sink of the controllably conductive device 351 may be mounted to the yoke 300, e.g., via a fastener (e.g., a rivet—not shown) received through an opening (not shown) in the controllably conductive device 351 and an opening 343 in the yoke 340. For example, the printed circuit board 350 may have mounted thereto any combination of a control circuit (e.g., a primary control circuit), memory, a drive circuit, one or more controllably conductive devices, a zero-crossing detector, a low-voltage power supply, etc. (e.g., as shown in FIGS. 37 and 38A). The control circuit mounted to the printed circuit board 350 may be operatively coupled to a control input of the controllably conductive device 351, for example, via the drive circuit. The control circuit may be used for rendering the controllably conductive device conductive or non-conductive, for example, to control the amount of power delivered to the lighting load and thus the present intensity level $L_{PRES}$ of the lighting load.

The printed circuit board 350 may be connected to (e.g., mounted to) a cradle 360. For example, the cradle 360 may be configured to secure the printed circuit board 350 to the yoke 340. The cradle 360 may comprise clips 362 configured to snap around edges 352 of the printed circuit board 350. The clips 362 may extend through notches 353 in the edges 352 of the printed circuit board 350. The cradle 350 may be connected to the yoke 340, such that the printed circuit board 350 and the cradle 350 are received in a recess 334 of the enclosure 330 when the enclosure 330 is connected to the yoke 340. For example, the cradle 360 may comprise a flange member 364 configured to be received with a bottom opening 344 in the yoke 340 and a clip 365 configured to be received within a top opening 345 of the yoke 340. The flange member 364 and the clip 365 may be configured to removably secure the cradle 360 to the yoke 340. The clip 365 may be configured to flex (e.g., bend) as the clip 365 is inserted into the top opening 345 of the yoke 340 and may snap around a front surface 331 of the yoke 340 to hold the cradle 360 against a rear surface 349 of the yoke 340.

The bezel 312 may be configured to be attached to the yoke 340. For example, the bezel 312 may comprise a flange member 315 that is located at the top of the bezel 312 and is configured to be received in a top opening 346 (e.g., a second top opening) in the yoke 340. The bezel 312 may also comprise a clip (not shown) that is located at the bottom of the bezel 312 and is configured to be received in the bottom opening 344 of the yoke 330. The clip at the bottom of the bezel 312 may be configured to flex (e.g., bend) as the clip is inserted into the bottom opening 344 of the yoke 340 and may snap around the rear surface 349 of the yoke 340 to hold the bezel 312 against the front surface 341 of the yoke 340.

The control device 300 may comprise an actuator support member 370 captured between the actuation member 310 and the front surface 331 of the yoke 330. The actuator support member 370 may operate as a return spring for the actuation member 310. For example, the actuator support member 370 may comprise support rails 372 configured to contact a rear surface (not shown) of the actuation member 310. The actuator support member 370 may also comprise an upper biasing arm 374 and a lower biasing arm 375. The upper and lower biasing arms 374, 375 of the actuator support member 370 may be configured to push against the front surface 331 of the yoke 330 to bias the support rails 372 against the rear surface of the actuation member 310 to hold the actuation member 310 in the idle position.

The control device 300 may comprise mechanical switches, such as first and second tactile switches 354, 355 (e.g., momentary tactile switches) mounted to the printed circuit board 350. The control circuit mounted to the printed circuit board 350 may be responsive to actuations of the first and second tactile switches 356, 358. For example, the first and second tactile switches 354, 355 may be configured to be actuated in response to actuations of the upper portion 316 and the lower portion 318 of the actuation member 310, respectively (e.g., to turn the lighting load on and off). The actuator support member 370 may comprise an upper actuation post 376 and a lower actuation post 378 coupled to the support rails 372 via respective pairs of spring arms 379. The upper actuation post 376 and the lower actuation post 378 may extend from the actuator support member 370 towards the first tactile switch 354 and the second tactile switch 355, respectively. The upper actuation post 376 and the lower actuation post 378 may extend through respective holes 347 in the yoke 340. When the upper portion 316 of the actuation member 310 is actuated, the actuation member 310 may configured to pivot about the pivot axis 313 causing the upper pair of spring arms 379 to flex, such that the upper actuation post 376 may contact and actuate the first tactile switch 354 on the printed circuit board 350. When the lower portion 318 of the actuation member 310 is actuated, the actuation member 310 may configured to pivot about the pivot axis 313 causing the lower pair of spring arms 379 to flex, such that the lower actuation post 378 may contact and actuate the second tactile switch 355 on the printed circuit board 350. In some examples, the control device 300 may be configured to control a lighting load of the lighting control system to turn the lighting load on in response to an actuation of the first tactile switch 354, and to turn the lighting load off in response to an actuation of the second tactile switch 355 (or vice versa).

The control device 300 may include a potentiometer 356 having a shaft 358 mechanically coupled to the slider knob 322. The potentiometer 356 may be mounted to the printed circuit board 350 and electrically coupled to the control circuit on the printed circuit board 350. The potentiometer 356 may be characterized by a variable impedance (e.g., resistance) and may be configured to generate a direct-current (DC) voltage, which may be received by the control circuit and may have a magnitude representative of the desired amount of power to be delivered to the lighting load and thus the present intensity level $L_{PRES}$ of the lighting load. The resistance of the potentiometer 356 and thus the magnitude of the DC voltage generated by the potentiometer 356 may be adjusted in response to a user input provided from the slider knob 322 to the shaft 358 of the potentiometer in order to control the amount of power delivered to the lighting load. The shaft 358 of the potentiometer 356 may allow a user to adjust the present intensity level $L_{PRES}$ of the lighting load from a low-end intensity level $L_{LE}$ to a high-end intensity level $L_{HE}$. Alternatively, in some examples, the control device 300 may include a linear encoder, a combination of a wiper and a resistive trace on the main PCB 334 of the control device 300, a mechanical or magnetic encoder, etc. instead of a potentiometer.

Figure 7:
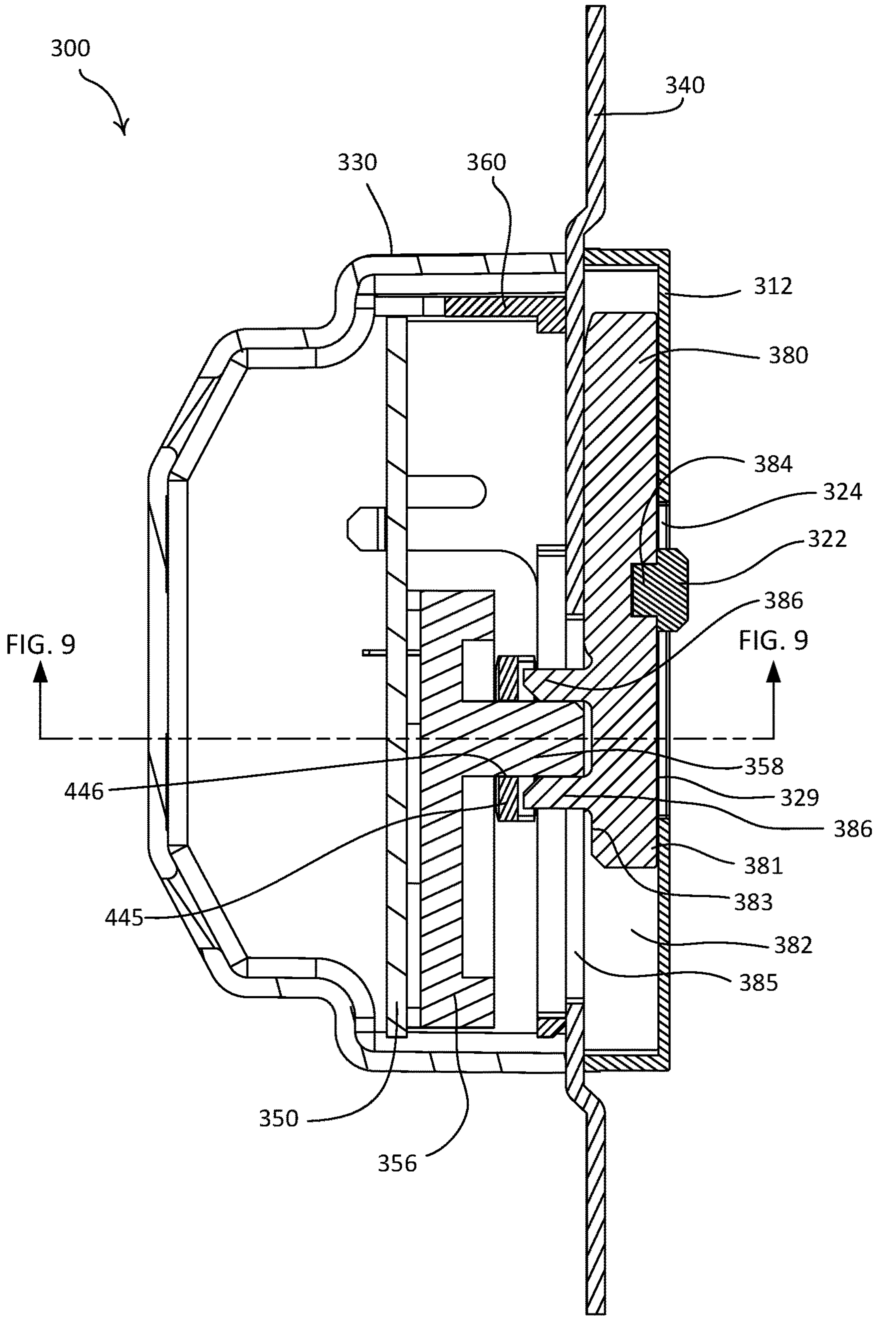
FIG. 7 is a right-side cross-section view of the control device of FIG. 3 taken through the center of a slider slot in a bezel of the control device (e.g., through the line shown in FIG. 4).
Figure 10:
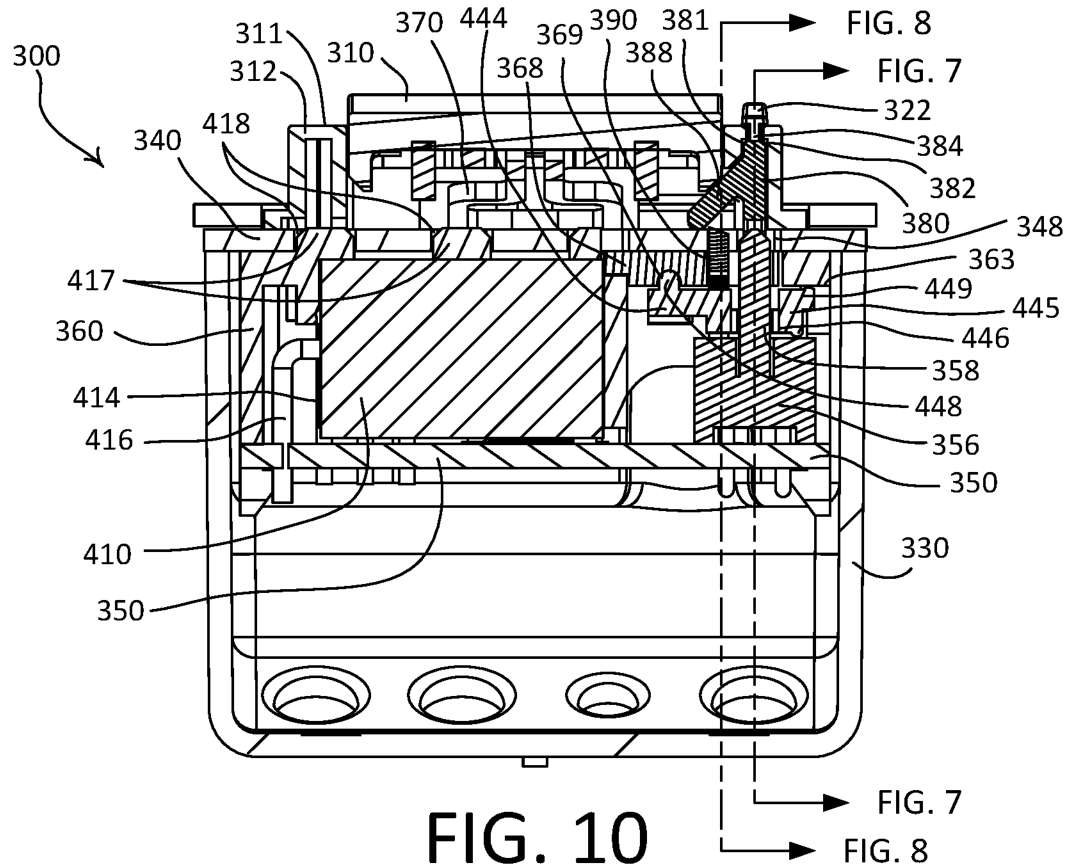
FIG. 10 is a bottom cross-section view of the control device of FIG. 3 taken through the center of a shaft of a potentiometer of the control device (e.g., through the line shown in FIG. 7).

FIG. 7 is a right-side cross-section view of the control device 300 taken through the center of the slider slot 324 in the bezel 312 (e.g., through the line shown in FIG. 4). FIG. 10 is a bottom cross-section view of the control device 300 taken through the center of the shaft 358 of the potentiometer 356 (e.g., through the line shown in FIG. 7). The control device 300 may comprise a slider body 380 may be coupled between the slider knob 322 and the shaft 358 of the potentiometer 356. For example, the slider body 380 may be located between the yoke 340 and the bezel 312. The slider body 380 may comprise a front portion 381 that may be located in a channel 382 in the bezel 312 (e.g., as shown in FIGS. 7 and 10). The slider body 380 may comprise a shaft 384 configured to extend through the slider slot 324 in the bezel 312 and to connect to the slider body 380.

The shaft 358 of the potentiometer 356 may be configured to extend through a slot 348 in the yoke 340 (e.g., a lower portion of the slot 348). The slider body 380 may comprise projections 386 configured to extend from a rear portion 383 of the slider body 380 through the slot 348. The projections 386 may be configured to surround the shaft 358 of the potentiometer 356 within the slot 348 in the yoke 340 for capturing the shaft 358 and thus coupling the slider knob 322 to the shaft 358 of the potentiometer 356 (e.g., as shown in FIG. 7). The slider body 380 may also comprise diagonal portion 388 that extends from the slider body 380 adjacent to the front portion 381 towards the yoke 340. For example, the diagonal portion 388 may contact the yoke 340 for holding the front portion 381 of the slider body 380 in the channel 382 of the bezel 312.

As shown in FIG. 3, the user interface 302 of the control device 300 may include a visible display, such as an illumination surface 329. For example, the illumination surface 329 of the user interface 302 may extend for the length of the slider slot 224. The illumination surface 229 of the user interface 202 may be illuminated to provide a nightlight feature, for example, when the lighting load is off. The front portion 381 of the slider body 380 may define the illumination surface 329 of the user interface 302 within the slider slot 324. For example, the slider body 380 may be made of translucent material and may operate as a diffuser for the illumination surface 329 of the user interface 302. The control device 300 may comprise a light source, such as a light-emitting diode (LED) 359 mounted to the printed circuit board 350, that may be configured to illuminate the slider body 380 to backlight the illumination surface 329.

Figure 8:
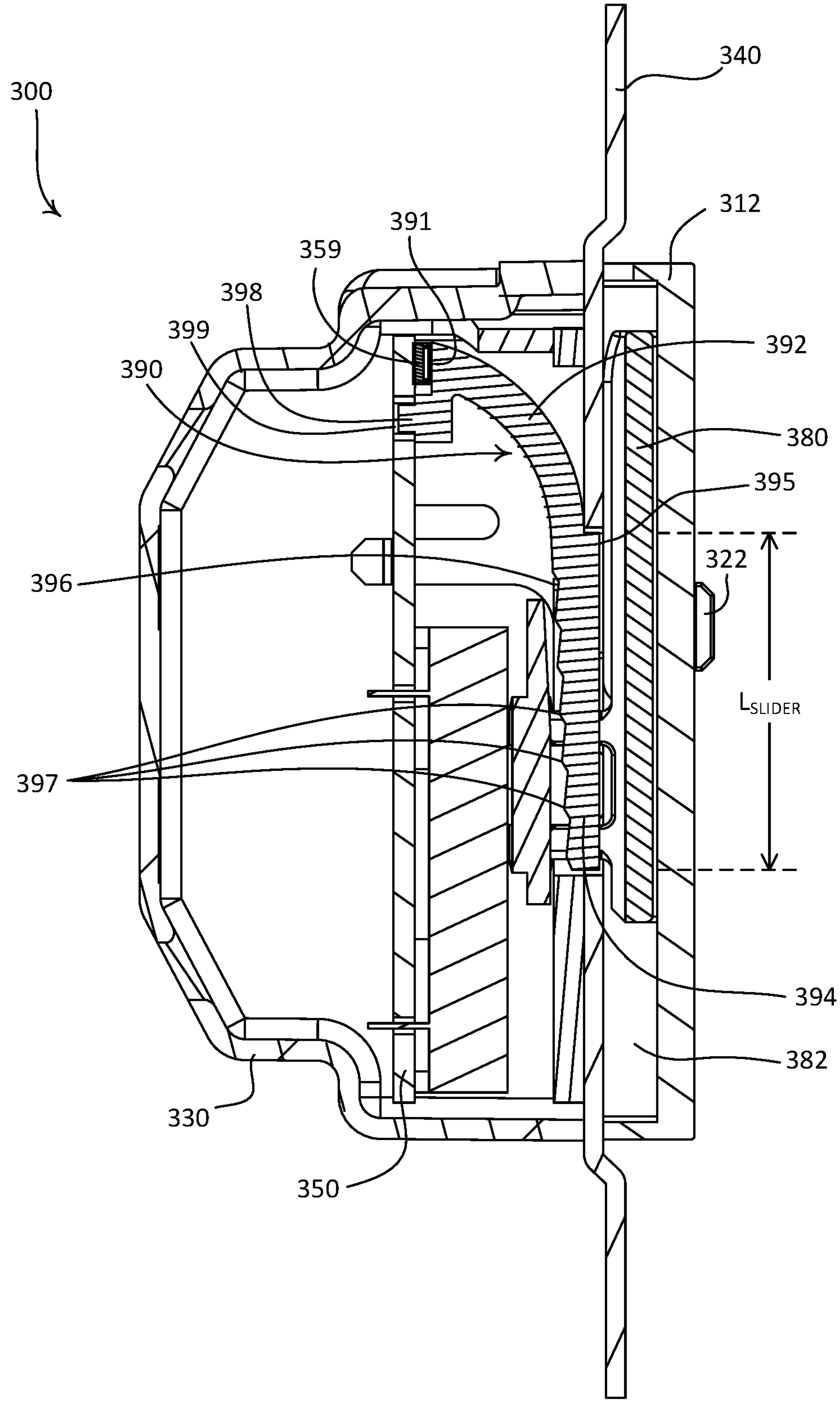
FIG. 8 is a right-side cross-section view of the control device of FIG. 3 taken through a center of a light pipe of the control device (e.g., through the line shown in FIG. 10).

The control device 300 may comprise a light pipe 390 configured to conduct light from the light-emitting diode 359 to the slider body 380 to thus illuminate the illumination surface 329. FIG. 8 is a right-side cross-section view of the control device 300 taken through the center of the light pipe 390 (e.g., through the line shown in FIG. 10). While the slider slot 324 is not shown in FIG. 8, the position of the slider slot is indicated by the length $L_{SLIDER}$ in FIG. 8. The light pipe 390 may comprise a light-receiving surface 391 configured to receive the light emitted by the light-emitting diode 359. The light pipe 390 may comprise a curved portion 392 that extends from the light-receiving surface 391 to an elongated portion 394 that may be located behind the slider body 380 adjacent to the slider slot 324 (e.g., as shown in FIG. 8). The elongated portion 394 may extend into the slot 348 in the yoke 340 is which the shaft 358 of the potentiometer 356 also extends. For example, the elongated portion 394 of the light pipe 390 may be located in an upper portion of the slot 348, such that the shaft 358 of the potentiometer 356 may move through the lower portion of the slot 348 in which the elongated portion 394 of the light pipe 390 is not located. The elongated portion 394 of the light pipe 390 may comprise a front surface 395 positioned towards the front of the control device 300 (e.g., towards the slider body 380). The elongated portion 394 may also comprise a rear surface 396 having lens features 397 configured to reflect light towards the front surface 395 of the elongated portion 394. The light pipe 390 may further comprise a mounting post 398 configured to be received in an oping 399 in the printed circuit board 350, such that the light pipe 390 is captured between the yoke 340 and the printed circuit board 350 (e.g., as shown in FIG. 8).

The light emitted by the light-emitting diode 359 and received by the light-receiving surface 391 of the light pipe 390 may be conducted through the curved portion 392 to the elongated portion 394. The light may then be conducted through the front surface 395 of the elongated portion 394 and/or be reflected towards the front surface 395 by the lens features 397 on the rear surface 396. The light emitted by the front surface 395 of the elongated portion 394 of the light pipe 390 may be received by the diagonal portion 388 of the slider body 380, and may be conducted through the diagonal portion towards the front portion 381 of the slider body 380 to thus illuminate the illumination surface 329 of the user interface 302.

The control device 300 may comprise a wireless communication circuit. The wireless communication circuit may include for example, a radio-frequency (RF) transceiver coupled to an antenna for transmitting and/or receiving RF signals. The wireless communication circuit may also include an RF transmitter for transmitting RF signals, an RF receiver for receiving RF signals, and/or an infrared (IR) transmitter and/or receiver for transmitting and/or receiving IR signals. The wireless communication circuit may be configured to transmit a control signal that includes the control data (e.g., a digital message) generated by the control circuit to the lighting load. The wireless communication circuit may be configured to receive a message (e.g., digital message) from one or more remote control devices of the load control system (e.g., the retrofit remote control device 112, the wall-mounted remote control device 114, the table-top remote control device 116, the handheld remote control device 118, a smart phone, a tablet, a computer, and/or the like). The message may include a command to adjust the present intensity level $L_{PRES}$ of the lighting load controlled by the control device 300 from an initial intensity level $L_{INIT}$ of the lighting load to a commanded intensity level $L_{CMD}$ indicated by the message. For example, the antenna may be located on the printed circuit board 350, located on an additional printed circuit board that is mounted perpendicularly to and electrically coupled to the printed circuit board 350, and/or located on an additional printed circuit board that is magnetically and/or capacitively coupled to the printed circuit board 350. Examples of an antenna for a wall-mounted control device is described in greater detail in commonly-assigned U.S. Pat. No. 7,362,285, issued Apr. 22, 2008, entitled COMPACT RADIO FREQUENCY TRANSMITTING AND RECEIVING ANTENNA AND CON- TROL DEVICE EMPLOYING SAME, and U.S. Patent Application Publication No. 20220131540, published Apr. 28, 2022, entitled LOAD CONTROL DEVICE HAVING A CAPACITIVE TOUCH SURFACE, the entire disclosures of which are hereby incorporated by reference.

The control device 300 may be configured to update the position of the slider knob 322 when the lighting load is controlled remotely. For example, the control device 300 may be configured to adjust the position of the slider knob 322 upon receipt of a remote control command to control the lighting load. In response to receiving a message from a remote device, the control device 300 may control the lighting load to the commanded intensity level $L_{CMD}$ indicated by the command in the message (e.g., a remote control command). In addition, the control circuit of the control device 300 may be configured to adjust the position of the slider knob 322 along the length of the slider slot 324 in response to the commanded intensity level $L_{CMD}$ indicated by the command in the message. The position of the slider knob 322 along the length of the slider slot 324 may indicate the commanded intensity level $L_{CMD}$ of the lighting load (e.g., via local and remote control). The present intensity level $L_{PRES}$ of the lighting load may be synchronized with the position of the slider knob 322 along the slider slot 324 in response to both local and remote control.

In response to receiving a message from a remote control device, the control device 300 may control the intensity level of the lighting load (e.g., the magnitude of the load current conducted through the lighting load) independently from adjusting the position of the slider knob 322. For example, the control device 300 may first adjust the intensity level of the lighting load and then adjust the position of the slider knob 322 after a predetermined delay (e.g., a timeout period). The predetermined delay may be configured such that the intensity level of the lighting load is stable (e.g., not changing with respect to time) before adjusting the position of the slider knob 322. For example, the predetermined delay may allow for the avoidance of unnecessary intermediate adjustments of the position of the slider knob 322.

Figure 13:
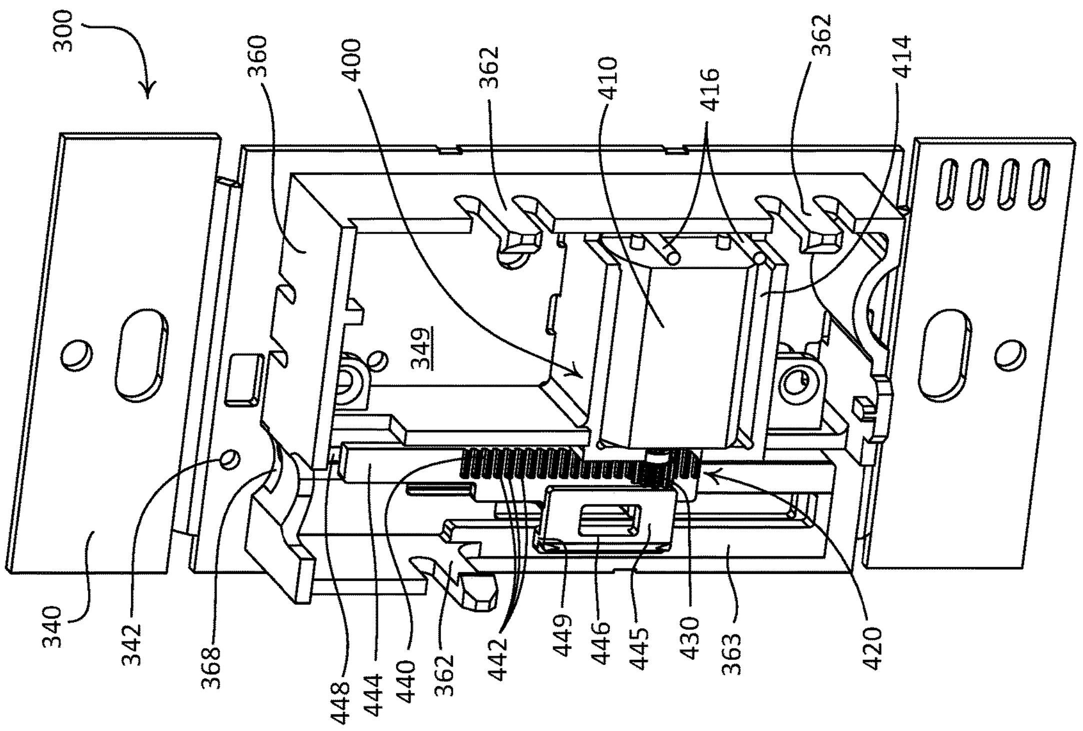
FIGS. 12 and 13 are rear perspective views of the control device of FIG. 3 with an enclosure, a printed circuit board, and the potentiometer removed to illustrate an actuator adjustment system in greater detail.
Figure 12:
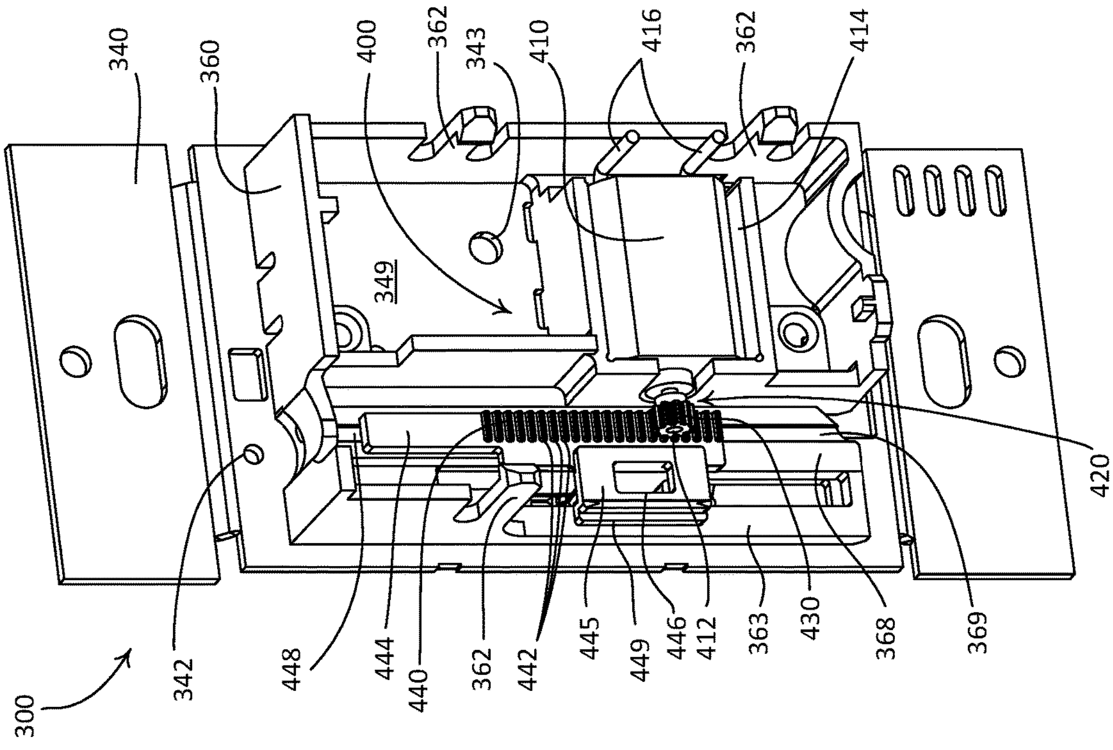
Figure 14:
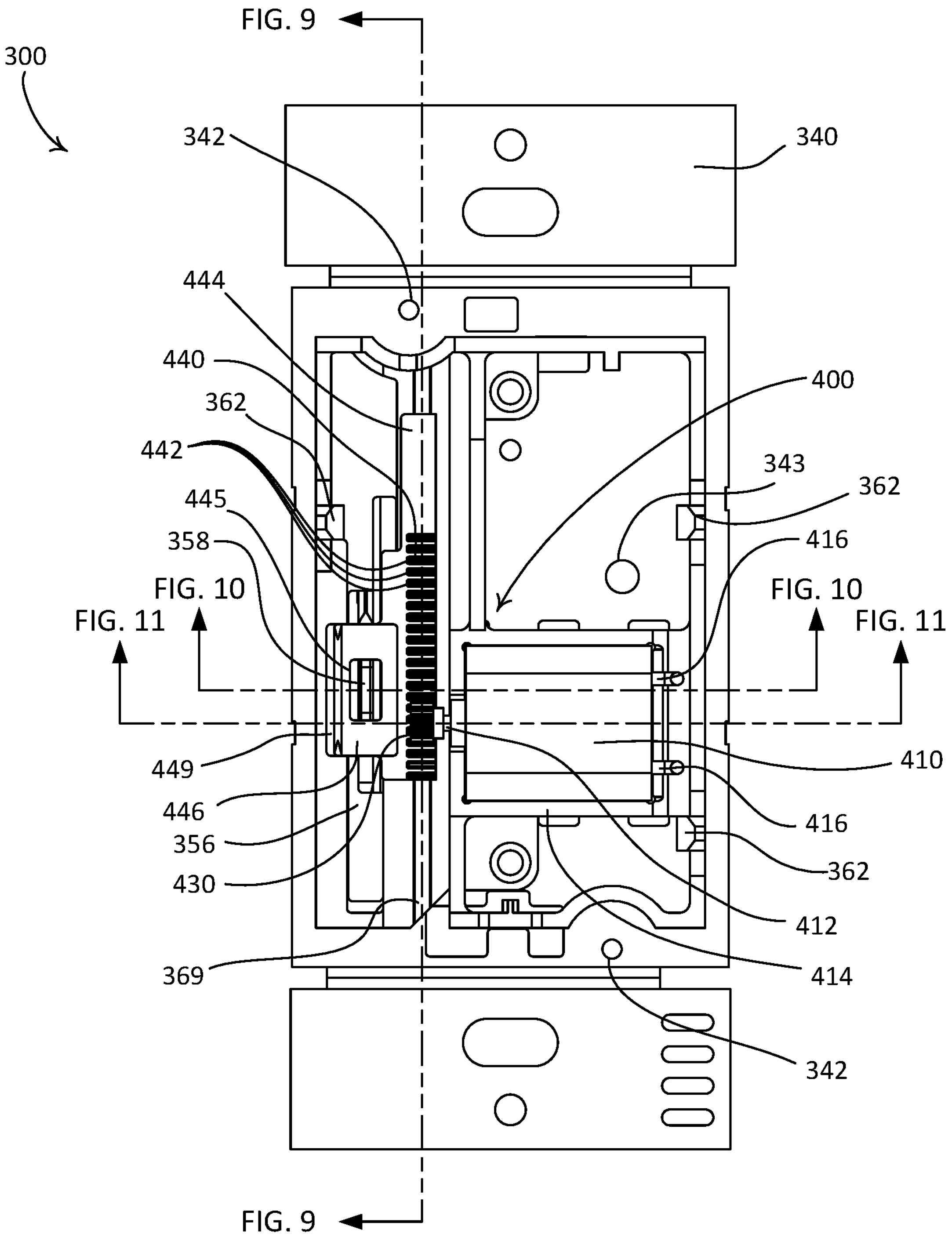
FIG. 14 is a rear view of the control device of FIG. 3 with the enclosure, the printed circuit board, and the potentiometer removed.

The control device 300 may comprise an actuator adjustment system 400 for allowing the control circuit of the control device 300 to adjust the position of the slider knob 322 along the length of the slider slot 324. For example, in response to receiving a wireless message, the control device 300 may be configured to use the actuator adjustment system 400 to adjust the position of the slider knob 322. FIGS. 12 and 13 are rear perspective views and FIG. 14 is a rear view of the control device 300 with the enclosure 330, the printed circuit board 350, and the potentiometer 356 removed to illustrate the actuator adjustment system 400 in greater detail. The actuator adjustment system 400 may comprise a motor 410 (e.g., a DC motor) and a gear assembly 420. The gear assembly 420 may comprise a rack and pinion gear assembly, including a circular gear 430 (e.g., a pinion) and a linear gear 440 (e.g., a rack). The motor 410 may comprise a drive shaft 412, which the motor 410 may be configured to rotate. The gear assembly 420 may be configured to couple (e.g., mechanically couple) the drive shaft 412 of the motor 410 to the shaft 358 of the potentiometer 356. The drive shaft 412 of the motor 410 may be coupled to the gear assembly 420 (e.g., the circular gear 430) for rotating the circular gear 430. The circular gear 430 may comprise a plurality of teeth 432 arranged around the circumference of the circular gear 430. Rotation of the circular gear 430 may be transferred to linear movement of the linear gear 440. For example, the linear gear 440 may move linearly in response to rotation of the circular gear 430.

Figure 11:
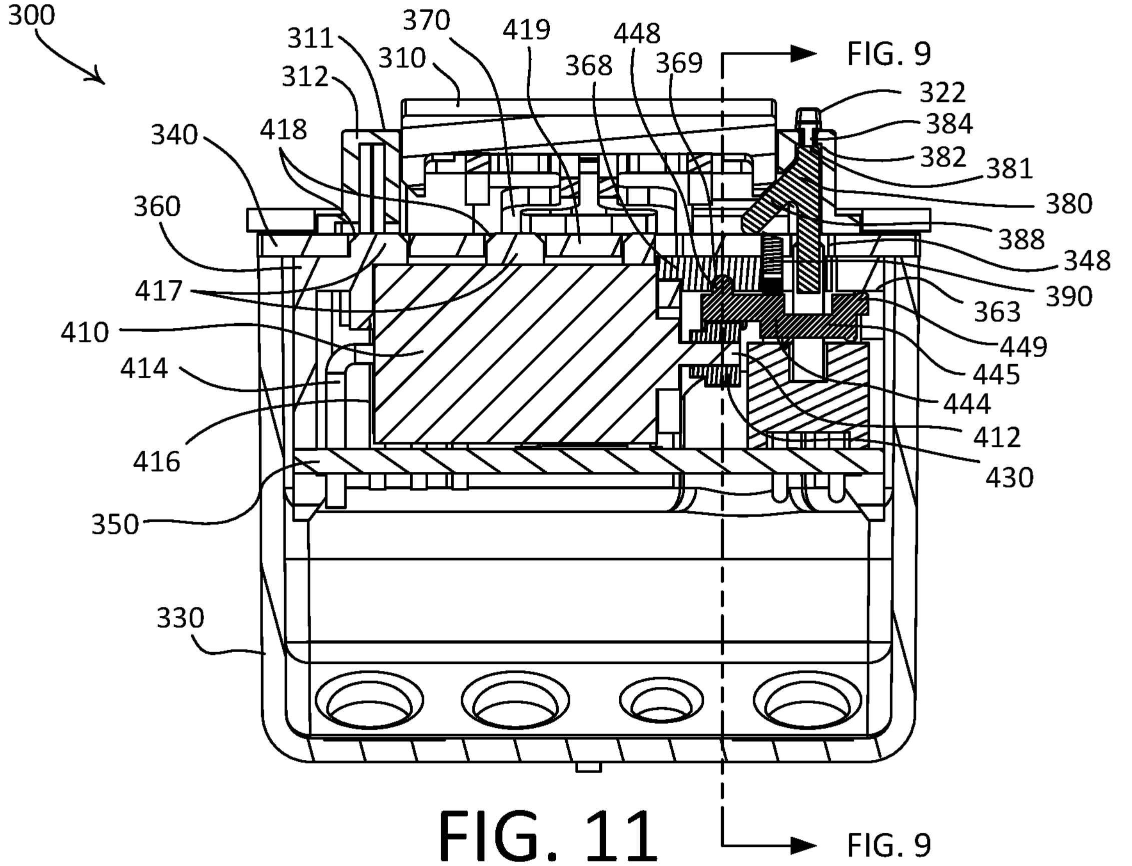
FIG. 11 is a bottom cross-section view of the control device of FIG. 3 taken through a center of a drive shaft of a motor of the control device (e.g., through the line shown in FIG. 14).

The motor 410 may be located in a motor recess 414 in the carrier 360 and the drive shaft 412 of the motor 410 may be configured to extend through a slot 415 in the carrier 360. FIG. 11 is a bottom cross-section view of the control device 300 taken through the center of the drive shaft 412 of the motor 410 (e.g., through the line shown in FIG. 14). The motor 410 may be located (e.g., captured) between the printed circuit board 350 and the carrier 360 when the control device 300 is fully assembled (e.g., as shown in FIG. 11). The motor 410 may comprise motor leads 416 that may be electrically coupled to the printed circuit board 350. The motor leads 416 may be configured to receive a motor drive voltage (e.g., a motor drive signal) for controlling (e.g., driving) the motor 410 to rotate the drive shaft 412. The carrier 360 may comprise ribs 417 located on a front surface 361 of the carrier 360 that is adjacent to the motor recess 414 in which the motor 410 is located (e.g., as shown in FIGS. 5 and 6). The ribs 417 may be received in respective slots 418 in the yoke 340 when the control device 300 is fully assembled. The ribs 417 and slots 418 may be configured to strengthen the cradle 360 adjacent to the location of the motor 410. In addition, extensions 419 of the yoke 330 between the slots 418 may allow for heat transfer from the controllably conductive device 351 above the slots 418 to lower portions of the yoke 340.

Figure 9:
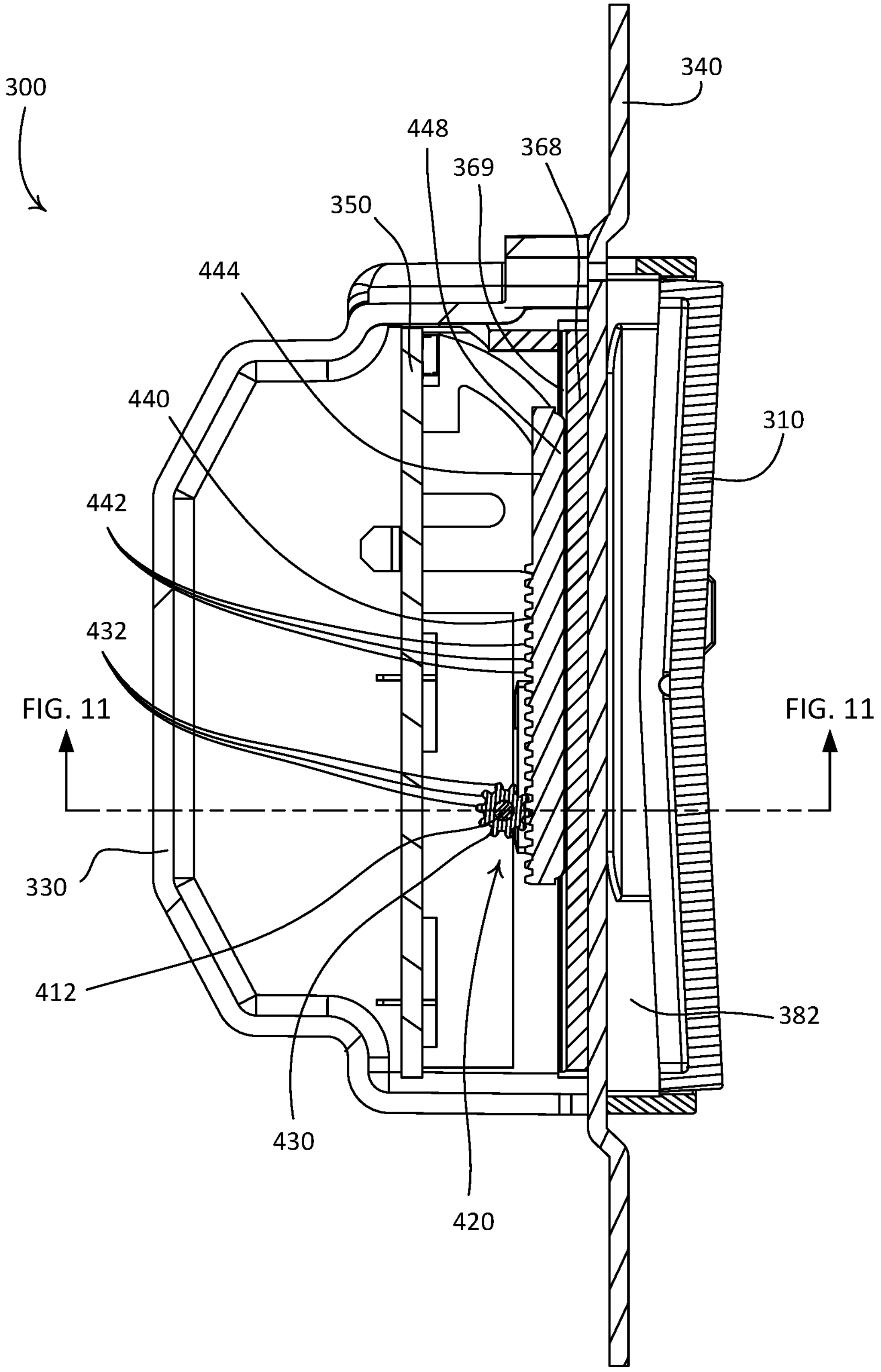
FIG. 9 is a right-side cross-section view of the control device of FIG. 3 taken through the center of a gear assembly of the control device (e.g., through the line shown in FIG. 14).

The gear assembly 420 may be operatively coupled to the slider knob 322, for example, via the potentiometer 356, such that rotation of the motor 410 is transferred to linear (e.g., vertical) movement of the slider knob 322. The rack gear 440 may comprise a plurality of teeth 442 arranged in a linear array along a rack plate 444. The rack gear 440 may be operatively coupled to the shaft 538 of the potentiometer 356. For example, the rack plate 444 may comprise a coupling portion 445 having an opening 446 configured to receive (e.g., surround) the shaft 358 of the potentiometer 356 such that the potentiometer moves linearly with the rack gear 440. The rack plate 444 may be located within the carrier 360 such that the teeth 432 of the circular gear 430 and the teeth 442 of the linear gear 440 engage with each other. FIG. 9 is a right-side cross-section view of the control device 300 taken through the center of the gear assembly 420 with the circular gear 430 engaged with the linear gear 440 (e.g., taken through the line shown in FIG. 14). As the motor 210 rotates the circular gear 430 in a first angular direction (e.g., clockwise as shown in FIGS. 12 and 13), the rack plate 444 may move in an upward direction thus moving the shaft 358 of the potentiometer 356 and the slider knob 322 through the slider slot 324 in an upward direction. As the motor 210 rotates the circular gear 430 in a second angular direction (e.g., opposite the first angular direction, such as counterclockwise as shown in FIGS. 12 and 13), the rack plate 444 may move in a downward direction thus moving the shaft 358 of the potentiometer 356 and the slider knob 322 through the slider slot 324 in a downward direction.

The cradle 360 may comprise a rack support portion 368 that defines a channel 369 that is configured to receive a fin 448 of the rack plate 444 (e.g., as shown in FIGS. 12 and 13). The fin 448 may be configured to move along the channel 369 as the slider knob 322 is moved along the slider slot 324. In addition, the coupling portion 445 of the rack plate 444 may comprise a flange portion 449 configured to contact and slide along a rear surface 363 of the cradle 360 as the motor 410 moves the rack plate 444 up and down inside the cradle 360. The engagement between the fin 448 and the channel 369 may help to maintain alignment between (e.g., engagement of) the linear gear 440 of the rack plate 444 and the circular gear 430. The rack support portion 368 may be a separate part from the cradle 360. For example, the rack support portion 368 may be captured between the yoke 340 and the cradle 360. For example, the rack support portion 368 may be made of a different material than the cradle 360. For example, the rack support portion 368 may be made from a material (e.g., Teflon) that may minimize binding and/or friction between the fin 448 of the rack plate 444 and the channel 369 in the rack support portion 368. The rack support portion 368 may be configured to reduce static friction between the rack plate 444 (e.g., the fin 448) and the rack support portion 368 (e.g., the channel 369) as the slider knob 322 moves (e.g., begins moving from rest) within the slider slot 324. Alternatively, the rack support portion 368 may be formed as a part of the cradle 360 (e.g., over-molded with the cradle 360). Further, the rack support portion 368 may be integral with the cradle 360 (e.g., made of the same material as the cradle 360 and molded as a single part).

The control circuit of the control device 300 may be configured to control the actuator adjustment system 400 to adjust the position of the slider knob 322 to indicate the present intensity level $L_{PRES}$ of the lighting load. In addition, the control circuit of the control device 300 may also be configured to control the position of the slider knob 322 to indicate other status information of the control device 300 and/or the lighting load (e.g., other than the present intensity level $L_{PRES}$ of the lighting load). For example, the control circuit may be configured to control the position of the slider knob 322 through a controlled movement (e.g., an animated movement) to indicate an operating mode of the control device 300. The control circuit may be configured to, for example, periodically control (e.g., cycle) the position of the slider knob 322 up and down across the length of the slider slot 324 to indicate when the control device 300 is in an association mode for associating the control device 300 with one or more remote control devices (e.g., during the association procedure). In addition, the control circuit may be configured to control the position of the slider knob 322 to a plurality of discrete positions (e.g., four position) in a stepwise (e.g., staccato) manner to indicate that the control device 300 is changing to a different control mode, such as a fan-speed control mode. For example, the control circuit may be configured to control the position of the slider knob 322 to the plurality of discrete positions in the stepwise manner by controlling the position of the slider knob 322 to a first position (e.g., approximately 20% along the length of the slider slot 324) and then waiting for a wait period (e.g., approximately one second), controlling the position of the slider knob 322 to a second position (e.g., approximately 40% along the length of the slider slot 324) and then waiting for the wait period, controlling the position of the slider knob 322 to a third position (e.g., approximately 60% along the length of the slider slot 324) and then waiting for the wait period, and controlling the position of the slider knob 322 to a fourth position (e.g., approximately 80% along the length of the slider slot 324).

When adjusting the position of the slider knob 322 along the slider slot 324, the control circuit of the control device 300 may be configured to stop driving the motor 410 of the actuator adjustment system 400 to cease adjusting the position of the slider knob 322 in response to determining that the user is presently actuating the slider knob 322 to move the slider knob 322 along the slider slot 324. For example, the control circuit may determine that a user is actuating the slider knob 322 while the control circuit is driving the motor 410 when the shaft 358 of the potentiometer 356 is not at an expected position, and/or when the motor drive voltage for driving the motor 410 indicates unexpected conditions.

In addition, the control circuit of the control device 300 may be configured to control the actuator adjustment system 400 to provide feedback to a user when the user is manually adjusting the position of the slider knob 322 along the slider slot 324. For example, the control circuit may be configured to control the actuator adjustment system 400 to provide detents (e.g., points of higher resistance) in the movement of the slider knob 322 along the slider slot 324. When a user is sliding the slider knob 322 along the slider slot 324, the control circuit may be configured to provide one of the detents by controlling the motor 410 to cause the drive shaft 412 to rotate in a direction that causes the rack plate 444 to move in direction that is opposite to which the user is moving the slider knob 322 for a predetermined (e.g., short) period of time. Control of the actuator adjustment system 400 to provide the detent may not hinder movement of the slider knob 322 by the user, but may provide a slight bump in the movement of the slider knob 322 to signal the detent to the user. For example, the control circuit may be configured to control the motor 410 to provide the detents at one or more positions along the length of the slider slot 324 (e.g., to indicate intensity levels, such as 25%, 50%, and/or 75%). In addition, the control circuit may be configured to control the actuator adjustment system 400 to generate a vibration of the slider knob 322 at one or more positions along the slider slot 324. When a user is sliding the slider knob 322 along the slider slot 324, the control circuit may be configured to generate the vibration of the slider knob 322 by increasing a frequency of the motor drive voltage that drives the motor 410. For example, the control circuit may be configured to control the motor 410 to generate the vibration at one or more positions along the length of the slider slot 324 to indicate a preset intensity level (e.g., a favorite or stored present intensity level).

Figure 15:
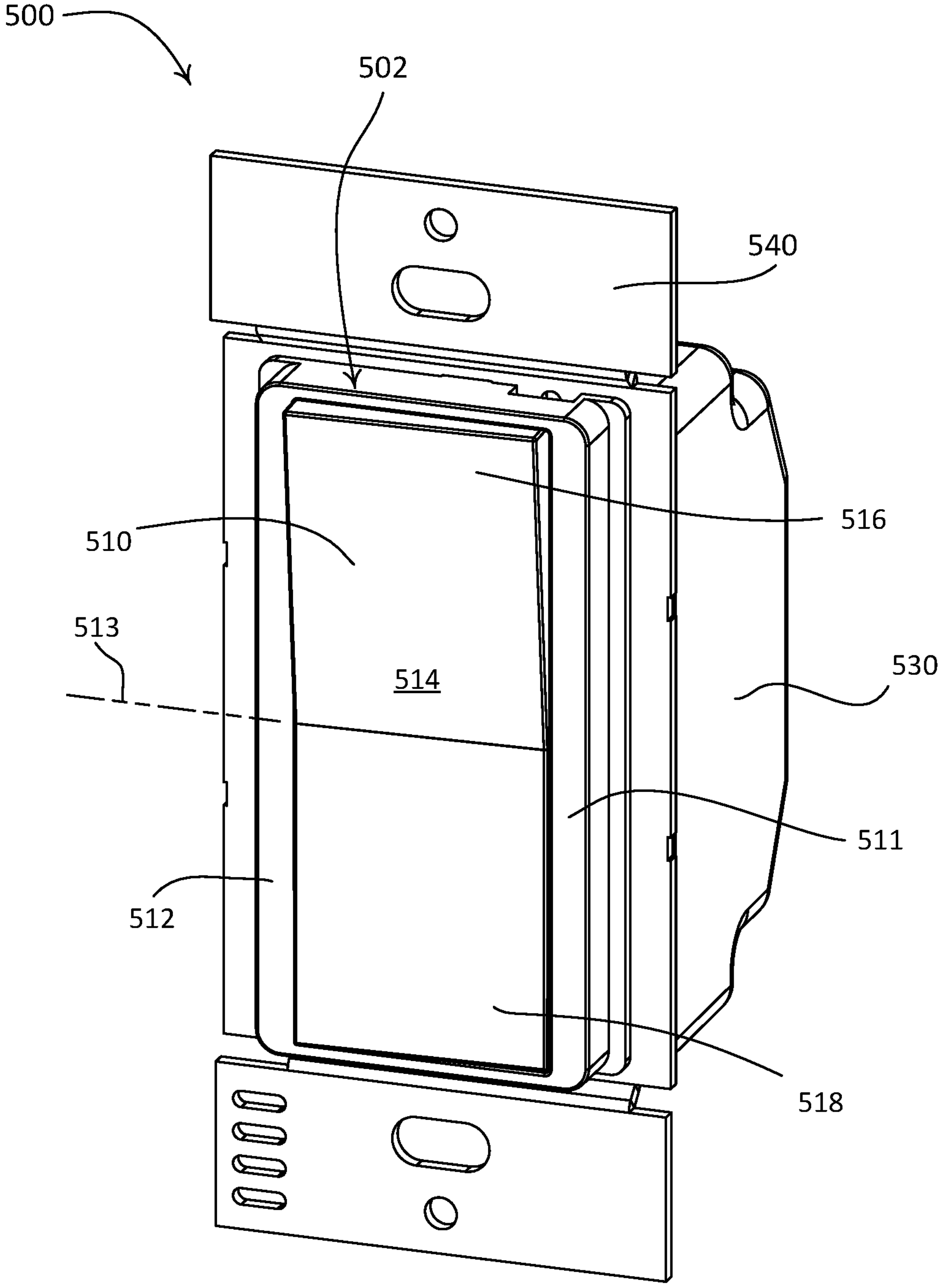
FIG. 15 is a perspective view of an example control device that may be deployed as a wall-mounted load control device, a retrofit remote control device, and/or a wall-mounted remote control device of the load control system illustrated in FIG. 1.

FIGS. 15-25E depict an example control device 500 that may be deployed as the wall-mounted load control device 110, the retrofit remote control device 112, and/or the wall-mounted remote control device 114 in the lighting control system 100 shown in FIG. 1. FIG. 15 is a perspective view of the control device 500. The control device 500 may be configured to be installed in an electrical wallbox with a faceplate (e.g., the faceplate 204). The control device 500 may comprise a user interface 502 that may be configured to be received in an opening of the faceplate. The control device 500 may be configured to control the amount of power delivered to an electrical load, such as a lighting load. The control device 500 may be configured to control the lighting load, for example, to turn the lighting load on or off. For example, the control device 500 may control the lighting load by controlling an internal load control circuit (e.g., a controllably conductive device of the control device 500) and/or by transmitting a message for controlling the lighting load via a communication circuit (e.g., a wireless signal via a wireless communication circuit). When the control device 500 is a wall-mounted load control device, such as a wall-mounted electronic switch, the control device 500 may comprise an enclosure 530 for housing load control circuitry of the electronic switch. The control device 500 may be configured to indicate whether the lighting load is on or off, for example, when the lighting load is controlled remotely and/or locally.

The user interface 502 of the control device 500 may include an actuation member 510 that is configured to be operably attached (e.g., mounted) to a base portion 512 (e.g., a bezel) of the control device 500. The actuation member 510 may be received in an opening in a front surface 511 of the bezel 512. The actuation member 510 may comprise a front surface 514 including an upper portion 516 and a lower portion 518. The actuation member 510 may be configured to pivot about a pivot axis 513 (e.g., a central axis) in response to an actuation of the upper portion 516 or the lower portion 518. For example, the actuation member 510 of the control device 500 may be a bi-stable actuator that may be in one of two positions. In response to an actuation of the lower portion 518 of the actuation member 510, the actuation member 510 may be placed in a first position (e.g., an off position) in which the upper portion 516 protrudes from the bezel 512 and the lower portion 518 is positioned close to (e.g., in a plane that is substantially parallel to) the front surface 511 of the bezel 512 (e.g., as shown in FIG. 15). In response to an actuation of the upper portion 516 of the actuation member 510, the actuation member 510 may be placed in a second position (e.g., an on position) in which the lower portion 518 protrudes from the bezel 512 and the upper portion 516 is positioned close to (e.g., in a plane that is substantially parallel to) the front surface 511 of the bezel 512. For example, the lower portion 516 may be parallel to and/or flush with the front surface 511 of the bezel 512 in the first position and the upper portion 518 may be parallel to and/or flush with the front surface 511 of the bezel 512 in the second position.

The control device 500 may be configured to turn the lighting load on in response to an actuation of the upper portion 516 and to turn the lighting load off in response to an actuation of the lower portion 518 (or vice versa). For example, the control device 500 may include a controllably conductive device adapted to be coupled in series electrical connection between an alternating current (AC) power source and the lighting load. The control device 500 may be configured to control the amount of power delivered from the AC power source to the lighting load (e.g., to turn the lighting load on and off) in response to actuations of the actuation member 510. For example, the control device 500 may control the controllable conductive device to turn on (e.g., connect the AC power source to) the lighting load in response to an actuation of the upper portion 516 of the actuation member 510, and control the controllable conducive device to turn off (e.g., disconnect the AC power source from) the lighting load in response to an actuation of the lower portion 518 of the actuation member 510.

The control device 500 may comprise a yoke 540 that may be connected to the enclosure 530 and may be configured to mount the control device 500 to an electrical wallbox. The bezel 512 may be configured to be attached to the yoke 540 (e.g., in a similar manner as the bezel 312 is attached to the yoke 340 of the control device 300). Although illustrated with the enclosure 530, in some examples, such as when the control device 300 is a wireless remote control device, the enclosure 530 may be omitted. In such examples, the control device 500 may connect to a base that is affixed to the toggle or paddle actuator of a standard light switch.

Figure 38B:
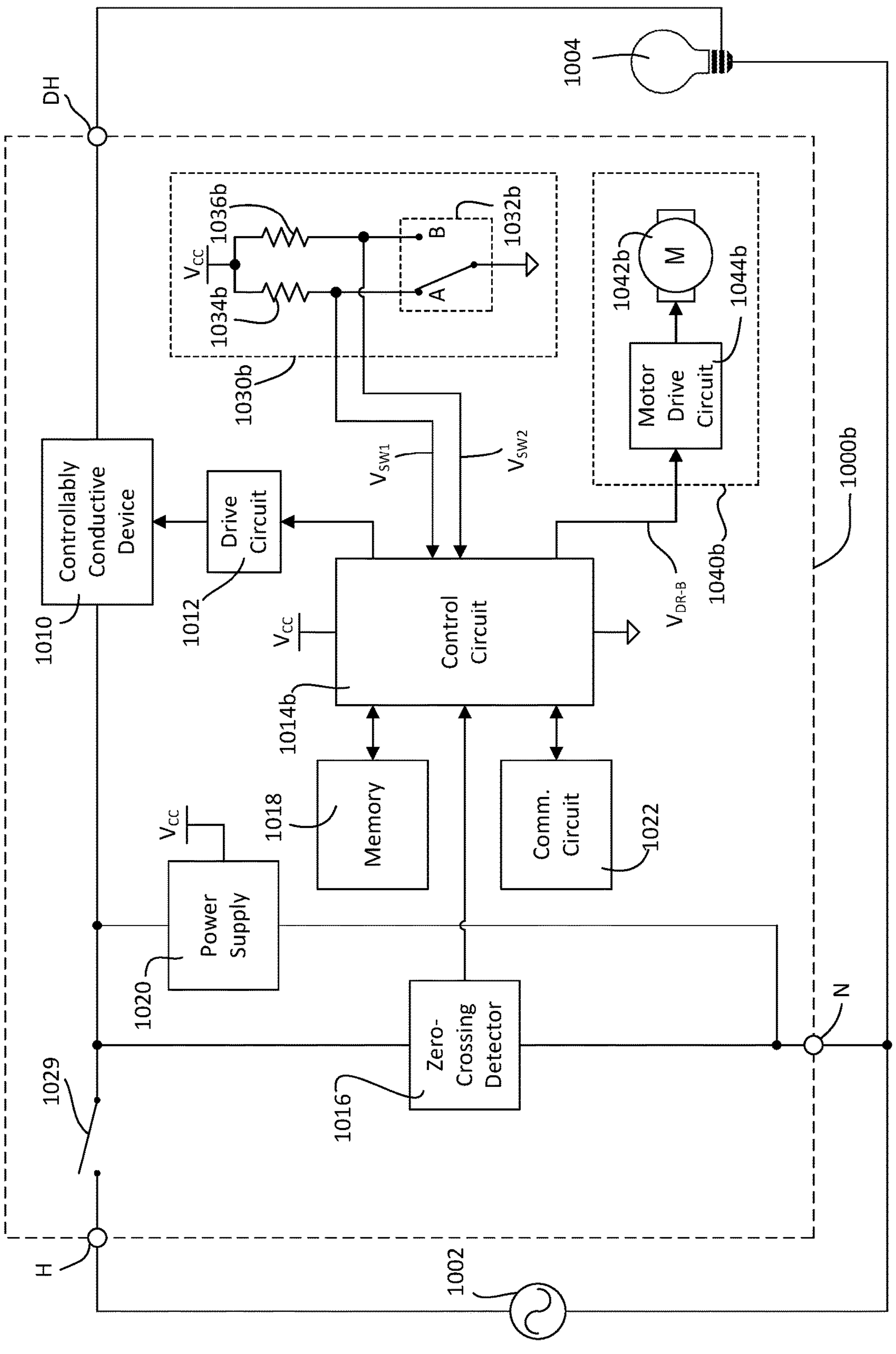

The enclosure 530 may house the load control circuitry of the control device 500, which may be mounted to a printed circuit board (not shown) of the control device 500. The printed circuit board of the control device 500 may be similar to the printed circuit board 350 of the control device 300. For example, the printed circuit board may have mounted thereto any combination of a control circuit (e.g., a primary control circuit), memory, a drive circuit, one or more controllably conductive devices, a zero-crossing detector, a low-voltage power supply, etc. (e.g., as shown in FIGS. 37 and 38B). The control circuit mounted to the printed circuit board may be operatively coupled to a control input of the controllably conductive device of the load control circuitry, for example, via the drive circuit. The control circuit may be used for rendering the controllably conductive device conductive or non-conductive, for example, to control the power delivered to the lighting load to turn the lighting load on and off.

Figure 17:
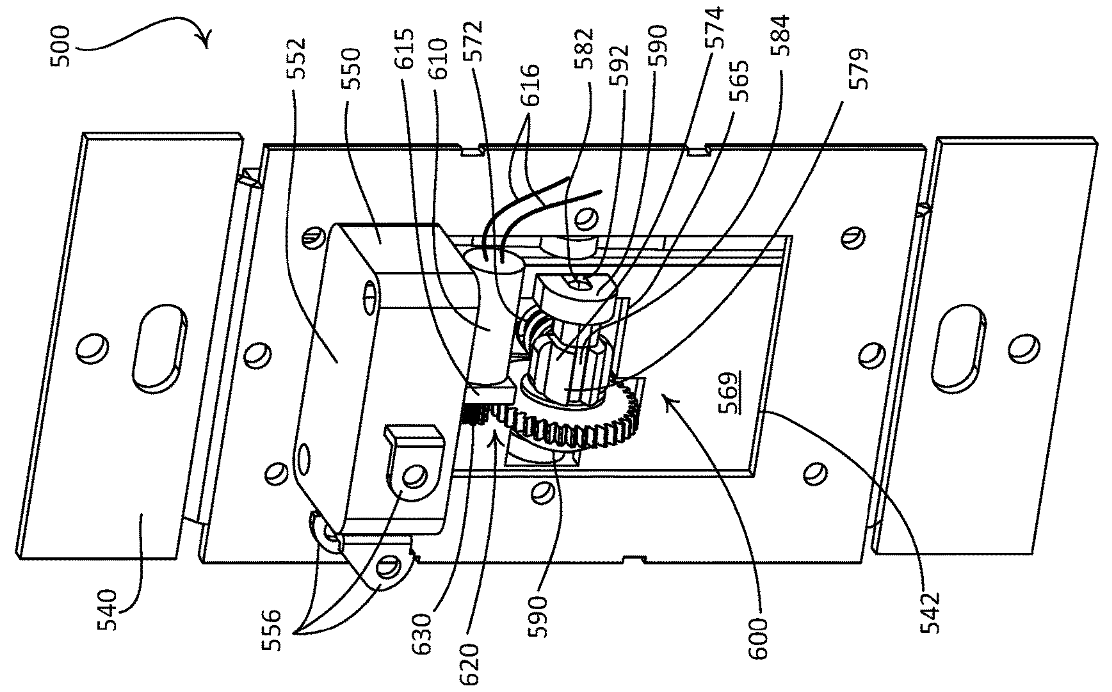
FIGS. 16 and 17 are rear perspective views of the control device of FIG. 15 with an enclosure and a printed circuit board of the control device removed to illustrate an actuator adjustment system in greater detail.
Figure 16:
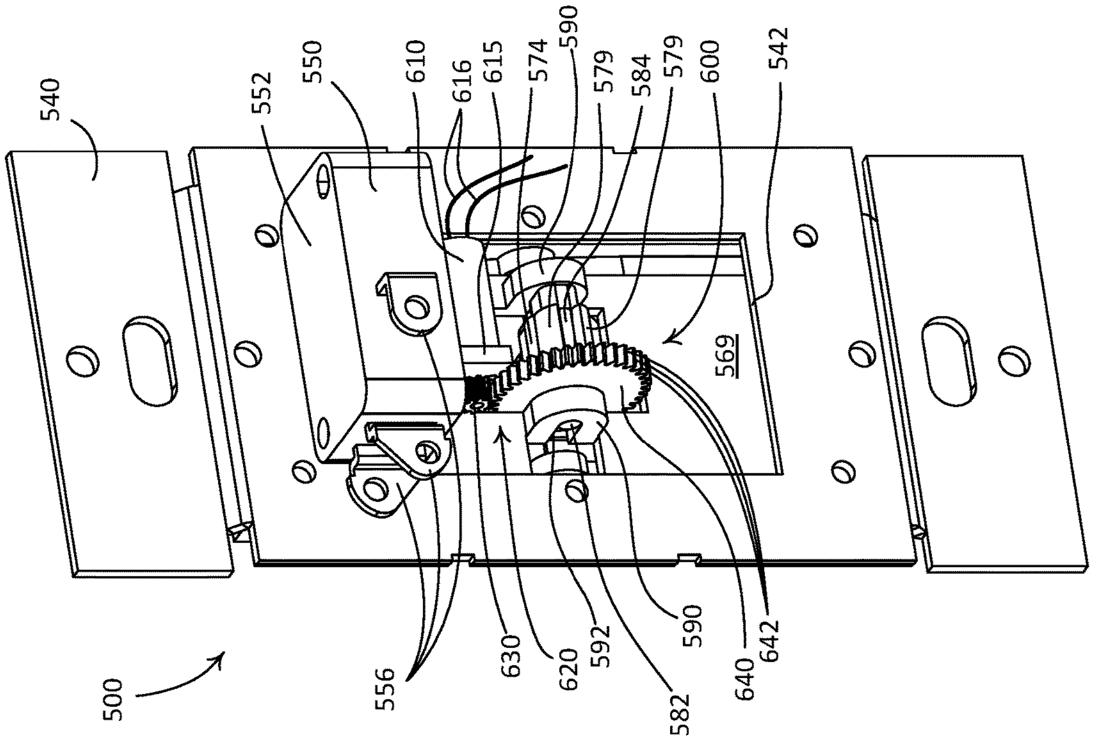
Figure 18:
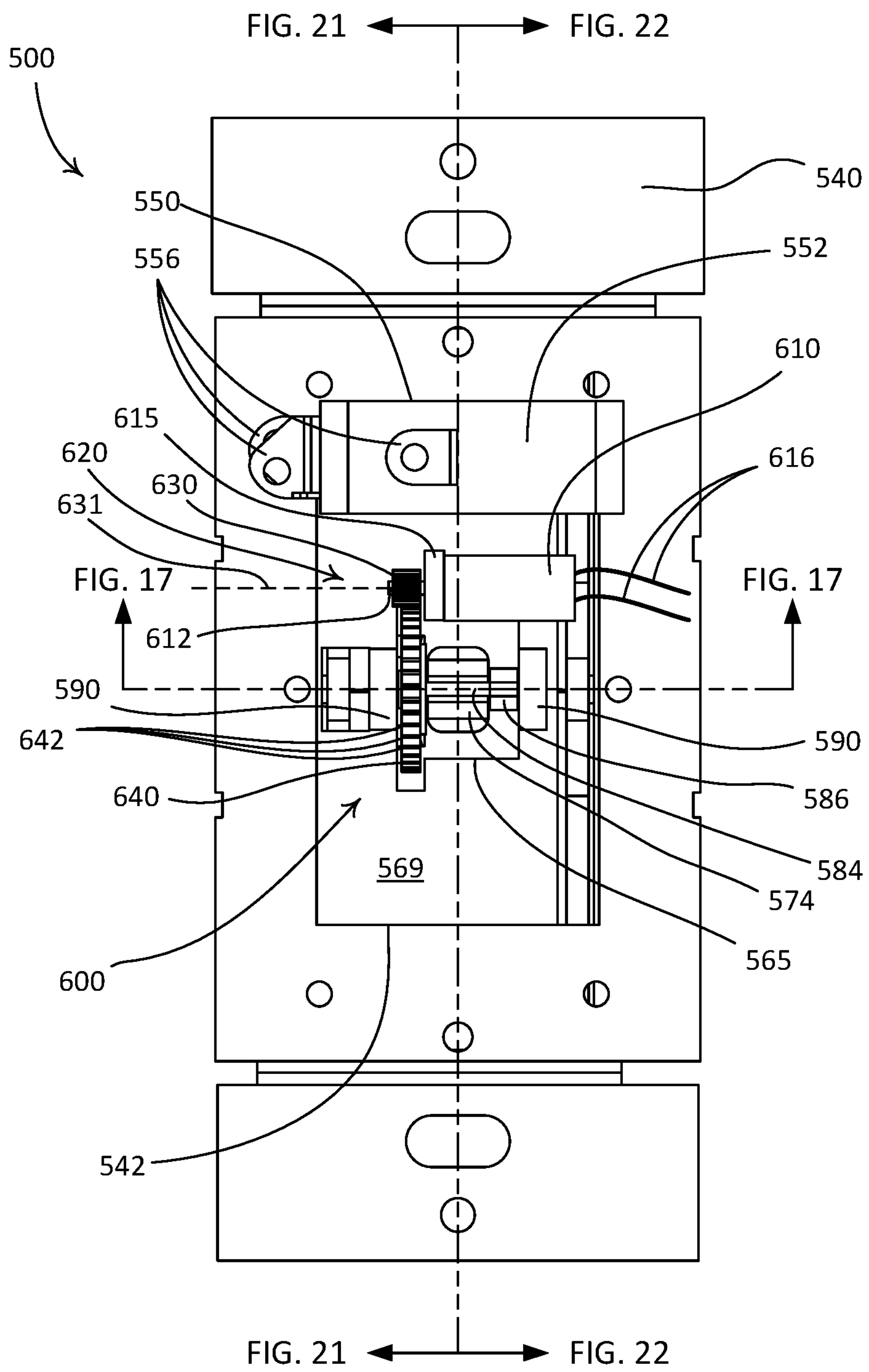
FIG. 18 is a rear view of the control device of FIG. 15 with the enclosure and the printed circuit board removed.
Figure 19:
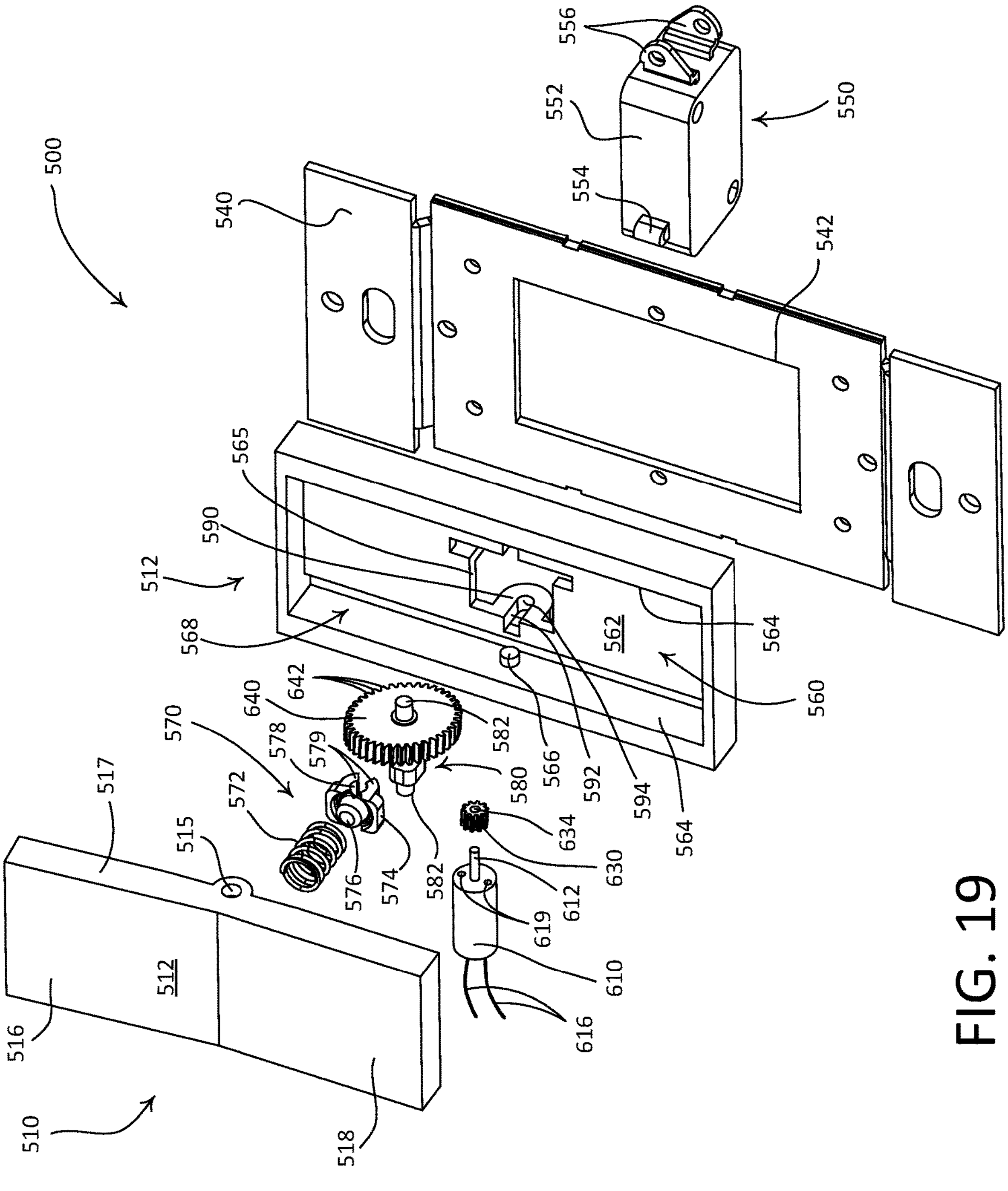
FIGS. 19 and 20 are exploded views of the control device of FIG. 15.
Figure 20:
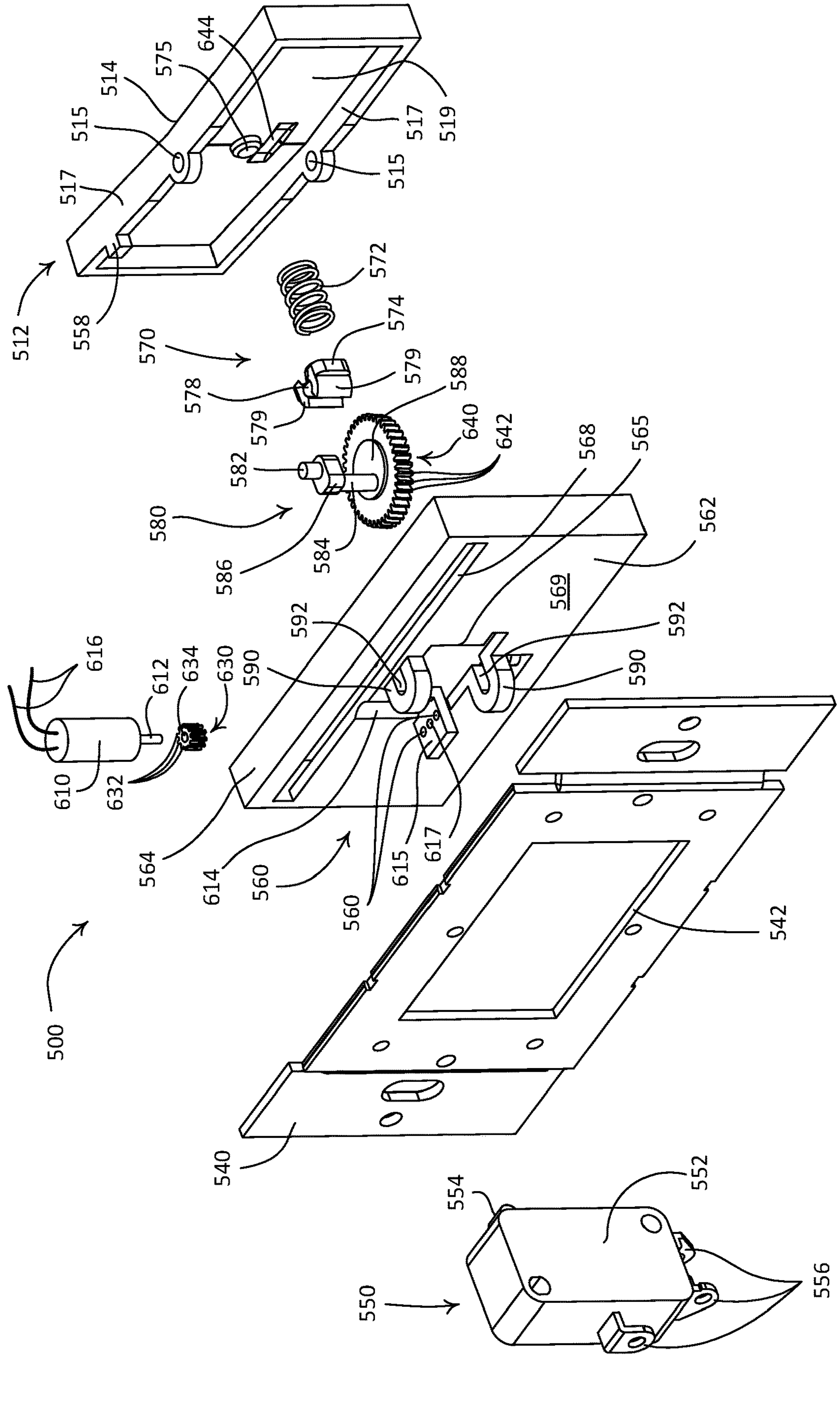
Figure 21:
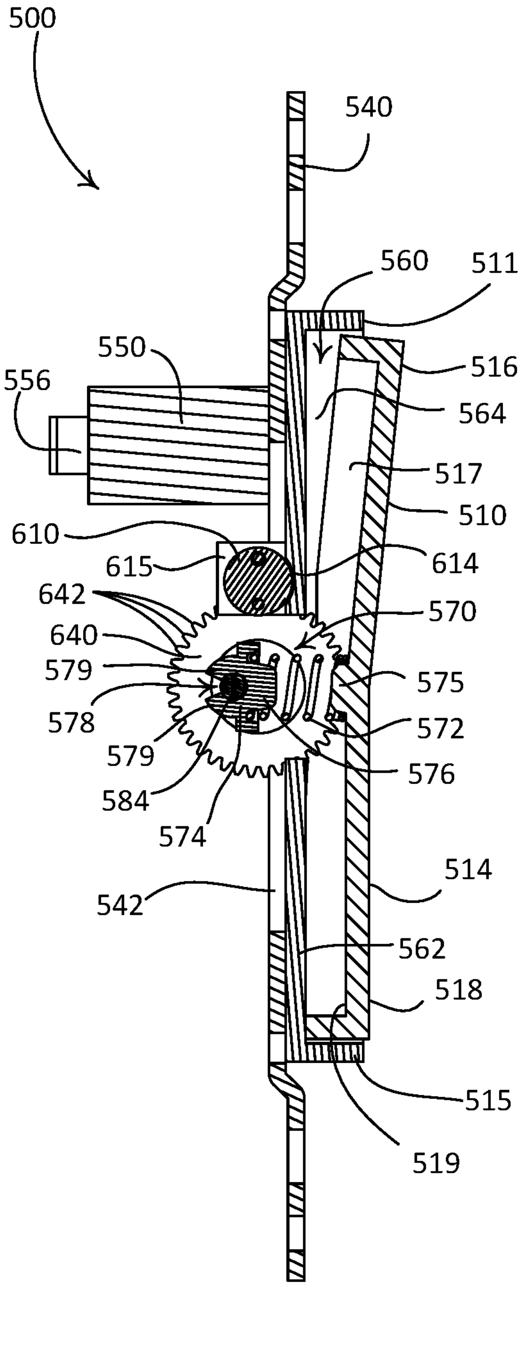
FIG. 21 is a left-side cross-section view of the control device of FIG. 15 taken through the center of the control device (e.g., through the line shown in FIG. 18).
Figure 22:
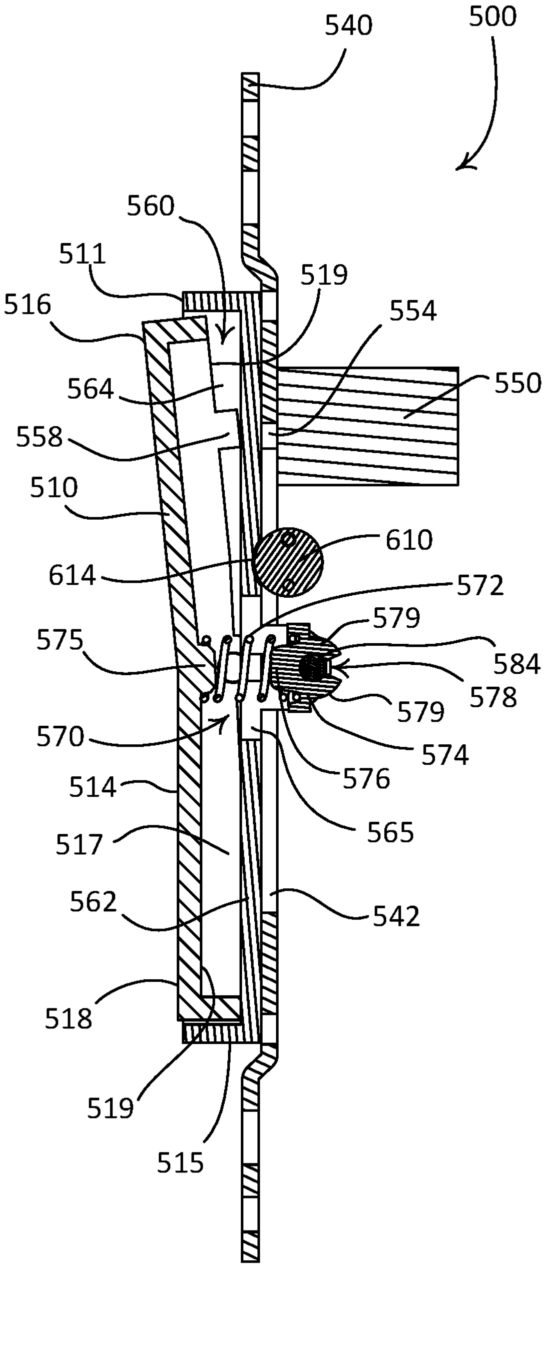
FIG. 22 is a right-side cross-section view of the control device of FIG. 15 taken through the center of the control device (e.g., through the line shown in FIG. 18).
Figure 23:
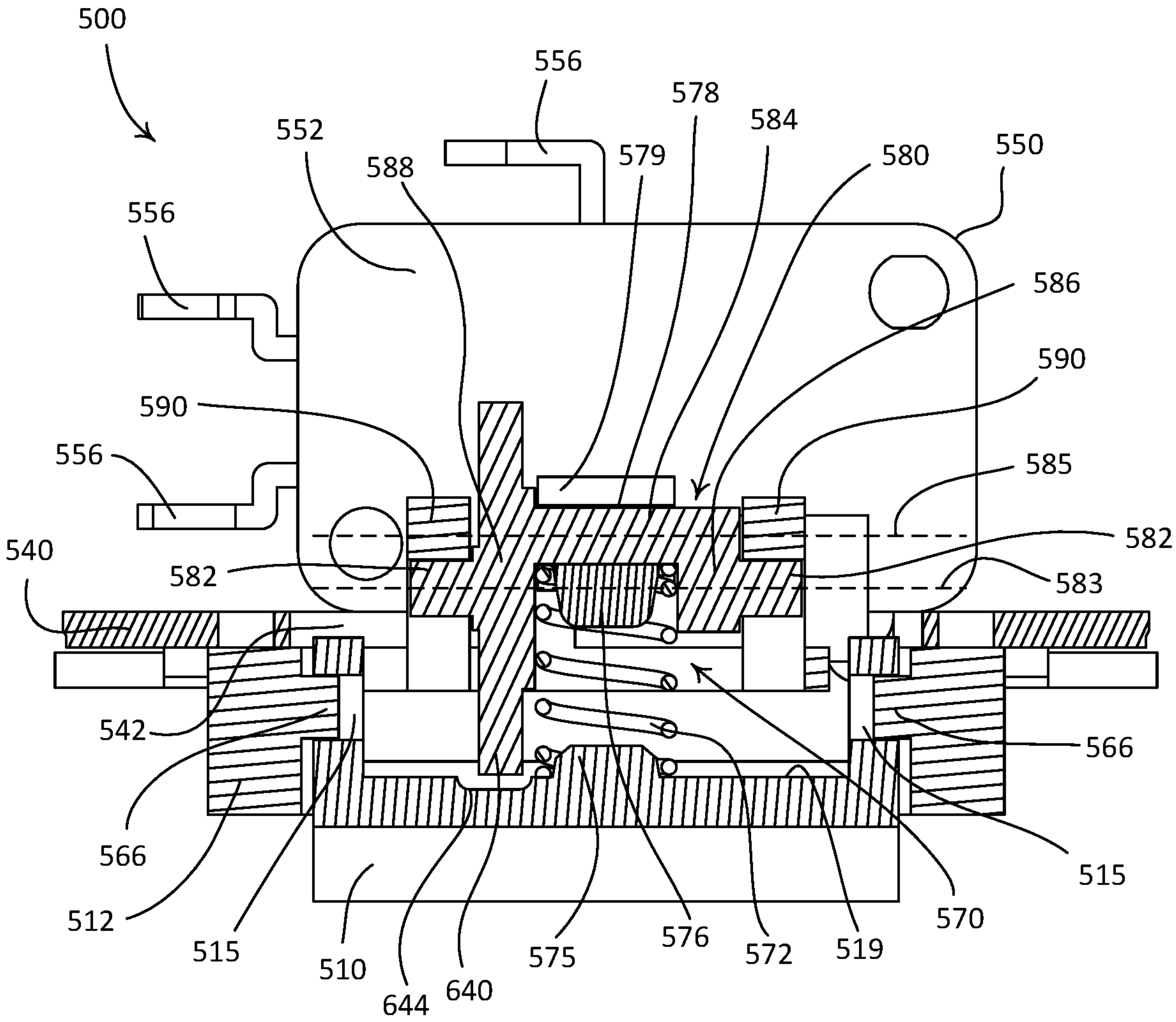
FIG. 23 is a bottom cross-section view of the control device of FIG. 15 taken through the center of the control device (e.g., through the line shown in FIG. 18).

FIGS. 16 and 17 are rear perspective views and FIG. 18 is a rear view of the control device 500 with the enclosure 530 and the printed circuit board 540 removed. FIGS. 19 and 20 are exploded views of the control device 500. FIG. 21 is a left-side cross-section view of the control device 500 taken through the center of the control device 500 (e.g., through the line shown in FIG. 18). FIG. 22 is a right-side cross-section view of the control device 500 taken through the center of the control device 500 (e.g., through the line shown in FIG. 18). FIG. 23 is a bottom cross-section view of the control device 500 taken through the center of the control device 500 (e.g., through the line shown in FIG. 18). The control device 500 may comprise one or more mechanical switches, such as switch 550 (e.g., a maintained switch). For example, the switch 550 may comprise a single-pole single-throw (SPST) switch or a single-pole double-throw (SPDT) switch. The switch 550 may comprise a switch housing 552 in which electrical contacts of the switch 550 are housed. The switch 550 may also comprise a plunger 554 (e.g., as shown in FIG. 19) that may extend from the switch housing 552 and may be actuated to open and/or close the electrical contacts of the switch 550. The plunger 554 of the switch 550 may extend through a central opening 542 of the yoke 540.

The switch 550 may comprise electrical terminals 556 that may be electrically coupled to the electrical contacts of the switch 550 inside the switch housing 552. The electrical terminals 556 may be electrically coupled to the printed circuit board for electrically coupling the electrical contacts of the switch 552 to the load control circuitry mounted to the printed circuit board. The control circuit mounted to the printed circuit board may be responsive to actuations (e.g., opening and closing) of the switch 550 (e.g., to turn the lighting load on and off). For example, when the switch 550 is a single-pole double-throw switch, the electrical contacts of the switch 550 may be closed when the plunger 554 is depressed and the electrical contacts of the switch 550 may be opened when the plunger 554 is released. When the switch 550 is a double-throw single-pole switch, one of the electrical terminals 556 may be a common terminal, while the other two terminals may be switched terminals. The switch 550 may be configured to alternately connect the common terminal to one of the two switched terminals in response to actuations of the plunger 554.

The actuation member 510 may be pivotably mounted (e.g., secured) within a recess 560 of the bezel 512. The bezel 512 may comprise a plate portion 562 and sidewalls 564 that define the recess 560. The bezel 512 may further comprise two posts 566 (e.g., circular posts) extending from the sidewalls 564 (e.g., extending from opposing sidewalls) at approximately the midpoint between a top and a bottom of the recess 560 (e.g., as shown in FIGS. 19 and 23). When the actuation member 510 is located within the recess 560 of the bezel 512, the posts 566 may be received in respective openings 515 in sidewalls 517 of the actuation member 510. The posts 566 may define the pivot axis 513 about which the actuation member 510 pivots. For example, the posts 566 may enable the actuation member to pivot about the pivot axis 513.

The actuation member 510 may comprise a tab 558 (e.g., as shown in FIGS. 20 and 22) extending from one of the sidewalls 517 of the actuation member 510. The tab 558 may be configured to actuate the plunger 554, for example, as the upper portion 516 of the actuation member 510 is pressed. When the upper portion 516 of the actuation member 510 is pressed in towards the yoke 540, the actuation member 510 may be configured to pivot about the pivot axis 513 (e.g., into the on position), such that the tab 558 extends through an opening 568 (e.g., a slot) in the plate portion 562 of the bezel 512 and presses in on (e.g., applies a force on) the plunger 554 (e.g., to close the electrical contacts of the switch 550). When the lower portion 518 of the actuation member 510 is pressed in towards the yoke 540, the actuation member 510 may be configured to pivot about the pivot axis 513 (e.g., into the on position), such that the tab 558 releases from (e.g., does not press in on) the plunger 554 (e.g., to open the electrical contacts of the switch 550). The control circuit of the control device 500 may be configured to turn the lighting load on when the actuation member 510 is in the on position (e.g., and the electrical contacts of the switch 550 are closed) and turn the lighting load off when the actuation member 510 is in the off position (e.g., and the electrical contacts of the switch 550 are open). In some examples, the control device 500 may be configured to control a lighting load of the lighting control system to turn the lighting load on in response to the tab 558 pressing in the plunger 554 of the switch 550, and to turn the lighting load off in response to the tab 558 releasing the plunger 554 of the switch 550 (or vice versa).

The control device 500 may comprise an over-center spring mechanism 570 for causing the actuation member 510 to be held in either the on position or the off position. The over-center spring mechanism 570 may comprise a spring 572 (e.g., an over-center spring) and a pivot member 574. For example, the spring 572 may be a coil spring. The spring 572 may extend between the actuation member 510 and the pivot member 574 through an opening 565 in the plate portion 562 of the bezel 512. For example, the spring 572 may extend from a nub 575 on a rear surface 519 of the actuation member 510 to a nub 576 on the pivot member 574. The nubs 575, 576 may be received in opposite ends of the spring 572 for holding the spring 572 in place. The spring 572 may be attached to the actuation member 510, for example, via the nub 575. For example, the nub 575 may receive one end of the spring 572 such that the spring 572 is secured to the actuation member 510. The spring 572 may be attached to the pivot member 574, for example via the nub 576. The nub 576 may receive the other end of the spring 572 such that the spring 572 is secured to the pivot member 574.

The pivot member 574 may be pivotably coupled to a support member 580, which may be rotatably coupled to the bezel 512. The bezel 512 may comprise two brackets 590 for rotatably supporting the support member 580. The brackets 590 may extend from a rear surface 569 of the plate portion 562 of the bezel 512. The brackets 590 may each comprise a slot 592 having an end portion 594 (e.g., a semicircular end portion). The support structure 580 may comprise axles 582 (e.g., stub axles) that may be received in the slots 592 of the brackets 590 of the bezel 512. During manufacturing of the control device 500, the support member 550 may pass through the opening 565 in the plate portion 562 of the bezel 512 and the axles 582 may be inserted into the slots 592 of the brackets 590. The axles 582 of the support structure 580 may be configured to rotate when received in the end portions 594 of the respective brackets 590. For example, the axles 582 may define a rotation axis 583 (e.g., as shown in FIG. 23) of the support structure 580.

The support member 580 may also comprise a rod 584 (e.g., a cylindrical rod) for pivotably supporting the pivot member 574. For example, the rod 584 may define a pivot axis 585 (e.g., as shown in FIG. 23) of the pivot member 574. The rod 584 may be coupled to the axles 582 via first and second offset members 586, 588, such that the pivot axis 585 of the pivot member 574 is offset from the rotation axis 583 of the support member 580.

The pivot member 574 may comprise a channel 578 (e.g., a cylindrical channel) in which the rod 584 of the support member 580 may be received. For example, the rod 584 may be configured to snap into the channel 578. The pivot member 574 may comprise arms 579 configurated to partially wrap around the rod 584 of the support member 580 of the pivot member 574 for holding the pivot member 574 in attachment with the rod 584 (e.g., as shown in FIGS. 21 and 22). The spring 572 may bias the axles 582 of the support member 580 towards the end portions 594 of the respective brackets 590.

The control device 500 may be configured to update the position of the actuation member 510, for example, when the lighting load is controlled remotely. For example, the control device 500 may be configured to adjust the position of the actuation member 510 (e.g., between the on position and the off position) upon receipt of a remote control command.

The control device 500 may comprise an actuator adjustment system 600 for allowing the control circuit of the control device 500 to adjust the position of the actuation member 510 (e.g., between the on position and the off position). The actuator adjustment system 600 may comprise a motor 610 and a gear assembly 620. The gear assembly may comprise a first gear 630 (e.g., a circular gear) and a second gear 640 (e.g., a circular gear). The motor 610 may comprise a drive shaft 612, which the motor 610 may be configured to rotate. The gear assembly 620 may be configured to couple (e.g., operatively couple) the drive shaft 612 of the motor 610 to the rod 584 about which the pivot member 574 of the over-center spring mechanism 570 pivots. The drive shaft 612 of the motor 610 may be coupled to the first gear 630 for rotating the first gear 630. The first gear 630 may be a spur gear. The first gear 630 may comprise a plurality of teeth 632 arranged around the circumference of the first gear 630.

The second gear 640 may be coupled to and surround the second offset member 588 of the support member 580. For example, the second gear 640 may be formed (e.g., molded) as part of the support member 580. The second gear 640 may comprise a plurality of teeth 642 arranged around the circumference of the second gear 640. The second gear 640 may be larger than the first gear 630 such that the number of the teeth 642 of the second gear 640 is greater than the number of the teeth 632 of the first gear 630. The first gear 630 may rotate at a first speed and the second gear 640 may rotate at a second speed that is slower than the first speed. The second gear 640 may be characterized by a center axis 631 that is aligned with the rotation axis 583 of the support member 580. For example, the second gear 640 may rotate about the center axis 631. The teeth 632 of the first gear 630 may be engaged with the teeth 642 of the second gear 640, for example, such that the first gear 630 drives the second gear 640 as the drive shaft 612 rotates. The second gear 640 may extend through the opening 565 in the plate portion 562 of the bezel 512. In addition, the rear surface 519 of the actuation member 510 may comprise a groove 644 in which the second gear 640 may be received. For example, the groove 644 may receive a portion of the second gear 640. The groove 644 may be configured such that the second gear 640 does not interfere with operation of the actuation member 510.

The motor 610 may be at least partially located in a groove 614 in the rear surface 569 of the plate portion 562 of the bezel 512. For example, the rear surface 569 of the plate portion 562 may define the groove 614 such that a portion of the motor 610 is received within the groove 614. The groove 614 may be configured such that the motor 610 can be located further away from the actuation member 510. For example, the groove 614 may be configured to prevent interference between the motor 610 and the operation of the actuation member 510. The drive shaft 612 of the motor 610 may extend through an opening 617 in a mounting tab 615 that extends from the rear surface 569 of the plate portion 562 of the bezel 512. The motor 610 may comprise protrusions 618 that may be received in openings 519 in the mounting tab 615 for holding the motor 610 in place while the motor 610 is rotating the drive shaft 612. The first gear 630 may comprise an opening 634 (e.g., a central opening) configured to receive the drive shaft 612 of the motor 610, such that the center axis 631 of the first gear 630 is aligned with a rotation axis of the drive shaft 612 of the motor 610. For example, the first gear 630 may be attached to the drive shaft 612 of the motor 610 via a press-fit connection. The first gear 630 may be attached to the drive shaft 612 on an opposite side of the mounting tab 615 as the side where the motor 610 is located. The motor 610 may comprise motor leads 616 (e.g., electrical wires) that may be electrically coupled to the printed circuit board for receiving a motor drive voltage for controlling the motor 610 to rotate the drive shaft 612.

As the motor 610 rotates the first gear 630, the second gear 640 may also rotate thus causing the support member 580 to rotate about the axles 582 that are received in the end portions 594 of the slots 592 of the brackets 590 (e.g., about the rotational axis 583). For example, the drive shaft 612 may drive the first gear 630 and the first gear 630 may drive (e.g., transfer rotation of the drive shaft 612 to) the second gear 640. The support member 580 may be configured to compress and decompress the spring 572. As the support member 580 rotates about the rotational axis 583, the rod 584 of the support member 580 may be configured to move closer to and then away from the rear surface 519 of the actuation member 510 thus respectively compressing and decompressing the spring 572. The control circuit may be configured to control the motor 610 to move the rod 584 to adjust the actuation member 510 from the off position to the on position and vice versa.

Figures 24A, 24B, 24C, 24D, 24E:
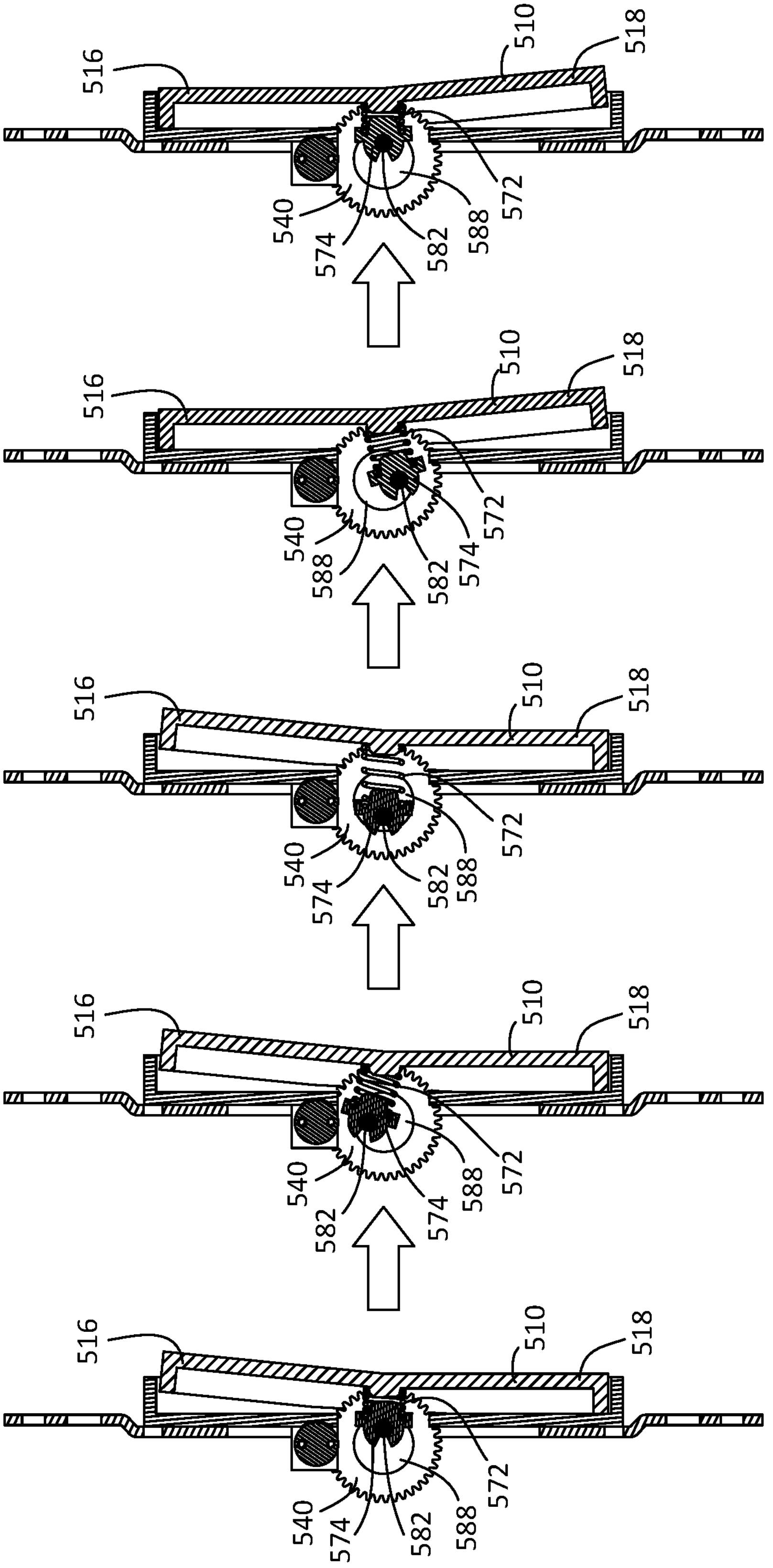
FIGS. 24A-24E are left-side cross-section views of the control device of FIG. 15 taken through the center of the control device (e.g., through the line shown in FIG. 18) that illustrate adjustment of an actuation member from an off position to an on position.

FIGS. 24A-25E are left-side cross-section views of the control device 500 taken through the center of the control device 500 (e.g., through the line shown in FIG. 18) that illustrate adjustment of the actuation member 510 between the off position and the on position. The rod 584 of the support member 580 may be in a normal position when the rod 584 is in a position around the rotational axis 583 that is closest to the actuation member 510 (e.g., as shown in FIGS. 24A and 24E). The normal position may be defined as the rod located at a 3 o'clock position when viewed from the left side as shown in FIG. 24A and FIG. 24E. When the motor 610 is not rotating, a user may actuate the upper portion 516 of the actuation member 510 to adjust the actuation member 510 to the on position and actuate the lower portion 518 of the actuation member 510 to adjust the actuation member 510 to the off position. The pivot member 574 may be tilted slightly towards the lower portion 518 of the actuation member 510 when the actuation member 510 is in the off position (e.g., as shown in FIG. 24A), and tilted slightly towards the upper portion 516 of the actuation member 510 when the actuation member 510 is in the on position (e.g., as shown in FIG. 24E). When the upper portion 518 of the actuation member 510 is pressed in by the user, the actuation member 510 may rotate from the off position towards the on position which may compress (e.g., slightly compress) the spring 572 of the over-center spring mechanism 570. The spring 572 may be compressed the most during user actuation when the actuation member 510 is half-way between the off position and the on position. After the half-way point of movement between the off position and the on position during user actuation, the spring 572 may begin to expand and continue to expand until the actuation member is in the on position. An opposite series of events may occur when the lower portion 518 of the actuation member 510 is pressed in to adjust the actuation member 510 from the on position to the off position. The spring 572 of the over-center spring mechanism 570 may be configured to hold the actuation member 510 in both the on position and the off position.

FIGS. 24A-24E illustrate the control device 500 as the motor 610 is controlled to adjust the actuation member 510 from the off position (e.g., as shown in FIG. 24A) to the on position (e.g., as shown in FIG. 24E). To adjust the actuation member 510 from the off position to the on position, the control circuit may rotate the support member 580 (e.g., via rotation of the drive shaft 612) to cause the rod 584 to rotate in a counterclockwise direction, as shown in FIGS. 24A-24E. For example, the control circuit may rotate the support member 580 one full rotation (e.g., 360 degrees) to adjust the actuation member 510 from the off position to the on position. The control circuit may first rotate the support member 580 to move the rod 584 from the normal position in a direction that is directed away from the side of the actuation member 510 that is presently depressed. For example, the control circuit may rotate the rod 584 of the support member 580 approximately 90 degrees in the counterclockwise direction to approximately the 12 o'clock position, e.g., away from the lower portion 518 of the actuation member 510, as shown in FIG. 24B. The control circuit may continue to rotate the rod 584 of the support member 580 in the counterclockwise direction thus expanding the spring 574 until the rod 584 is located approximately 180 degrees from the normal position (e.g., approximately the 9 o'clock position) as shown in FIG. 24C. The control circuit may continue to rotate the rod 584 of the support member 580 in the counterclockwise direction, e.g., to move the rod 584 towards the side of the actuation member 510 that was originally depressed when the actuation member 510 was in the normal position (e.g., the lower portion 518 of the actuation member 510 as shown in FIG. 24A). As the pivot member 574 moves closer to the actuation portion 510 (e.g., from the 9 o'clock position toward the 6 o'clock position), the pivot member 574 may tilt towards the upper portion 516 of the actuation member 510 and the spring 572 of the over-center spring mechanism 570 may compress, such that the spring 572 pushes the actuation member 510 from the off position to the on position in which the upper portion 516 of the actuation member 510 is depressed as shown in FIG. 24D. The control circuit may continue to rotate the rod 584 of the support member 580 until the rod 584 is in the normal position (e.g., approximately the 3 o'clock position) as shown in FIG. 24E at which time the spring 572 may operate to hold the actuation member 510 in the on position. The control circuit may stop driving the motor to rotate the support member 580 when the rod 584 is in the normal position. For example, the rod 584 may be configured to rest in the normal position when the actuation member 510 is in the idle position.

Figures 25A, 25B, 25C, 25D, 25E:
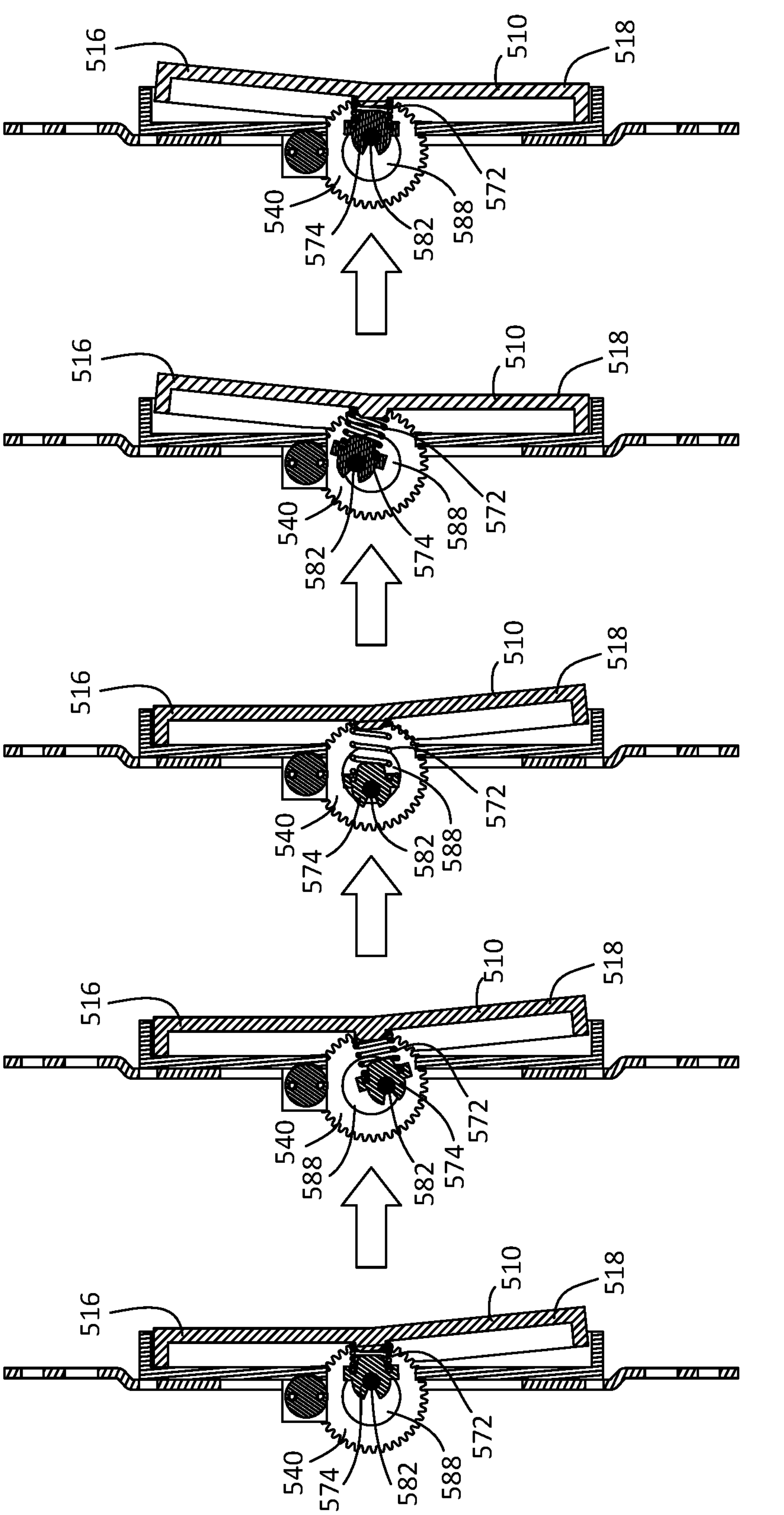
FIGS. 25A-25E are left-side cross-section views of the control device of FIG. 15 taken through the center of the control device (e.g., through the line shown in FIG. 18) that illustrate adjustment of the actuation member from the off position to the on position.

FIGS. 25A-25E illustrate the control device 500 as the motor 610 is controlled to adjust the actuation member 510 from the on position (e.g., as shown in FIG. 25A) to the off position (e.g., as shown in FIG. 25E). To adjust the actuation member 510 from the on position to the off position, the control circuit may rotate the support member 580 (e.g., via rotation of the drive shaft 612) to cause the rod 584 to rotate in a clockwise direction as shown in FIGS. 25A-25E. For example, the control circuit may rotate the support member 580 one full rotation (e.g., 360 degrees) to adjust the actuation member from the on position to the off position. The control circuit may first rotate the support member 580 to move the rod 584 from the normal position in a direction that is directed away from the side of the actuation member 510 that is presently depressed. For example, the control circuit may rotate the rod 584 of the support member 580 approximately 90 degrees in the clockwise direction to approximately the 12 o'clock position, e.g., away from the upper portion 516 of the actuation member 510, as shown in FIG. 25B. The control circuit may continue to rotate the rod 584 of the support member 580 in the clockwise direction thus expanding the spring 574 until the rod 584 is located approximately 180 degrees from the normal position (e.g., approximately the 9 o'clock position) as shown in FIG. 25C. The control circuit may continue to rotate the rod 584 of the support member 580 in the clockwise direction, e.g., to move the rod 584 towards the side of the actuation member 510 that was originally depressed when the actuation member 510 was in the normal position (e.g., the upper portion 516 of the actuation member 510 as shown in FIG. 25A). As the pivot member 574 moves closer to the actuation portion 510 (e.g., from the 9 o'clock position toward the 6 o'clock position), the pivot member 574 may tilt towards the lower portion 518 of the actuation member 510 and the spring 572 of the over-center spring mechanism 570 may compress, such that the spring 572 pushes the actuation member 510 from the on position to the off position in which the lower portion 518 of the actuation member 510 is depressed as shown in FIG. 25D. The control circuit may continue to rotate the rod 584 of the support member 580 until the rod 584 is in the normal position (e.g., approximately the 3 o'clock position) as shown in FIG. 25E at which time the spring 572 may operate to hold the actuation member 510 in the off position. The control circuit may stop driving the motor 610 to rotate the support member 580 when the rod 584 is in the normal position.

The control device 500 may comprise a communication circuit, such as a wireless communication circuit (e.g., the communication circuit 1022 shown in FIGS. 37 and 38A-38E). The wireless communication circuit may include for example, a radio-frequency (RF) transceiver coupled to an antenna for transmitting and/or receiving RF signals. The wireless communication circuit may also include an RF transmitter for transmitting RF signals, an RF receiver for receiving RF signals, and/or an infrared (IR) transmitter and/or receiver for transmitting and/or receiving IR signals. For example, the antenna may be located on the printed circuit board, located on an additional printed circuit board that is mounted perpendicularly to and electrically coupled to the printed circuit board, and/or located on an additional printed circuit board that is magnetically and/or capacitively coupled to the printed circuit board.

The wireless communication circuit may be configured to transmit a control signal that includes the control data (e.g., a digital message) generated by the control circuit to the lighting load. The wireless communication circuit may be configured to receive a message (e.g., digital message) from one or more remote control devices of the load control system (e.g., the retrofit remote control device 112 shown in FIG. 1, the wall-mounted remote control device 114 shown in FIG. 1, the tabletop remote control device 116 shown in FIG. 1, the handheld remote control device 118 shown in FIG. 1, a smart phone, a tablet, a computer, and/or the like). The message may include a command to turn on or off the lighting load controlled by the control device 500. In response to receiving a message from a remote device, the control device 500 may control the controllably conductive device to control the lighting load and adjust the position of the actuation member 510 between the on position and the off position. For example, the control circuit of the control device 500 may be configured to control the controllably conductive device to turn on the lighting load and adjust the position of the actuation member 510 to the on position in response to receiving a command to turn on the lighting load. In addition, the control circuit of the control device 500 may be configured to control the controllably conductive device to turn off the lighting load and adjust the position of the actuation member 510 to the off position in response to receiving a command to turn off the lighting load.

Figure 26:
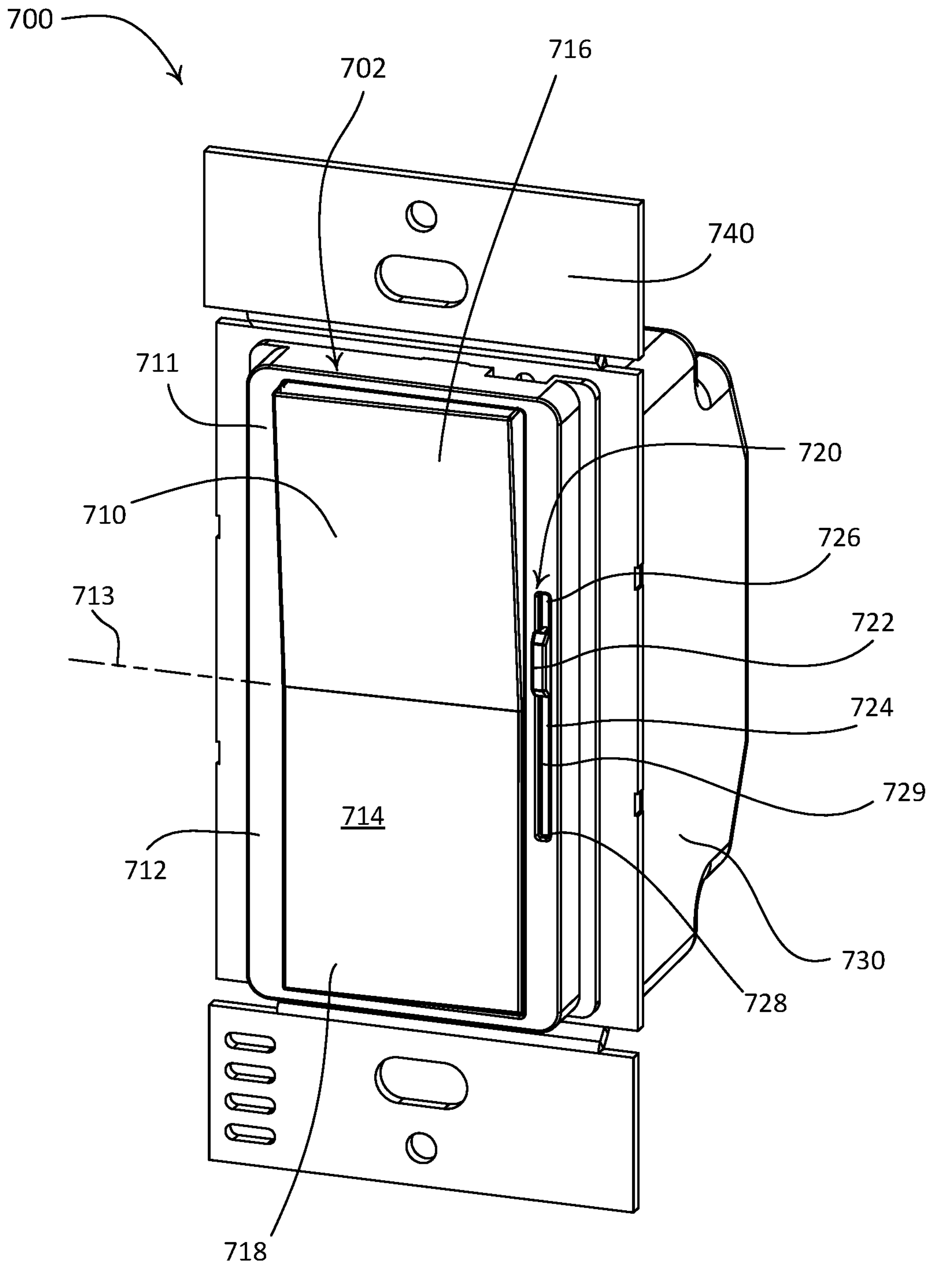
FIG. 26 is a perspective view of an example control device that may be deployed as a wall-mounted load control device, a retrofit remote control device, and/or a wall-mounted remote control device of the load control system illustrated in FIG. 1.

FIG. 26 is a perspective view of an example control device 700 that may be deployed as the wall-mounted load control device 110, the retrofit remote control device 112, and/or the wall-mounted remote control device 114 in the lighting control system 100 shown in FIG. 1. The control device 700 may be configured to be installed in an electrical wallbox with a faceplate (e.g., such as the faceplate 204 shown in FIG. 2). The control device 700 may comprise a user interface 702 (e.g., such as the user interface 202 shown in FIG. 2) that may be configured to be received in an opening of the faceplate. The control device 700 may be configured to control the amount of power delivered to an electrical load, such as a lighting load. The control device 700 may be configured to control the lighting load, for example, to turn the lighting load on or off and/or adjust a present intensity level $L_{PRES}$ of the lighting load. For example, the control device 700 may control the lighting load by controlling an internal load control circuit and/or by transmitting a message for controlling the lighting load via a communication circuit (e.g., a wireless signal via a wireless communication circuit). When the control device 700 is a wall-mounted load control device, such as a wall-mounted dimmer switch, the control device 700 may comprise an enclosure 730 for housing load control circuitry of the dimmer switch. The control device 700 may be configured to indicate whether the lighting load is on or off, for example, when the lighting load is controlled remotely and/or locally.

The user interface 702 of the control device 700 may include an actuation member 710 that is configured to be mounted to a bezel 712 (e.g., a base portion) of the control device 700. The actuation member 710 may be received in an opening in a front surface 711 of the bezel 712. The actuation member 710 may comprise a front surface 714 including an upper portion 716 and a lower portion 718. The actuation member 710 may be configured to pivot about a pivot axis 713 (e.g., a central axis) in response to an actuation of the upper portion 716 and the lower portion 718. For example, the actuation member 710 of the control device 700 may be a bi-stable actuator that may be in one of two positions. In response to an actuation of the lower portion 718 of the actuation member 710, the actuation member 710 may be in a first position (e.g., an off position) in which the upper portion 716 protrudes from the bezel 712 and the lower portion 718 is positioned close to the front surface 711 of the bezel 712 (e.g., as shown in FIG. 26). In response to an actuation of the upper portion 716 of the actuation member 710, the actuation member 710 may be in a second position (e.g., an on position) in which the lower portion 718 protrudes from the bezel 712 and the upper portion 716 is positioned close to the front surface 711 of the bezel 712. For example, the lower portion 716 may be parallel to and/or flush with the front surface 711 of the bezel 712 in the first position and the upper portion 718 may be parallel to and/or flush with the front surface 711 of the bezel 712 in the second position.

The control device 700 may be configured to turn the lighting load on in response to an actuation of the upper portion 716 and to turn the lighting load off in response to an actuation of the lower portion 718 (or vice versa). For example, the control device 700 may include a controllably conductive device adapted to be coupled in series electrical connection between an alternating current (AC) power source and the lighting load. The control device 700 may be configured to control the amount of power delivered from the AC power source to the lighting load (e.g., to turn the lighting load on and off) in response to actuations of the actuation member 710. For example, the control device 700 may control the controllable conductive device to turn on (e.g., connect the AC power source to) the lighting load in response to an actuation of the upper portion 716 of the actuation member 710, and control the controllable conducive device to turn off (e.g., disconnect the AC power source from) the lighting load in response to an actuation of the lower portion 718 of the actuation member 710.

The control device 700 may include an analog intensity adjustment actuator, such as a slider actuator 720 having a slider knob 722 configured to move along (e.g., within) an elongated slot, such a slider slot 724. For example, the analog intensity adjustment actuator may be configured to be manually operated to adjust an intensity level of light emitted by the lighting load. The slider slot 724 may be an elongated opening in the bezel 712 of the control device 700 and may extend for a length (e.g., such as the length $L_{SLIDER}$ shown in FIGS. 4 and 8). For example, the slider slot 724 may be located adjacent to the actuation member 710. The control device 700 may control the magnitude of a load current conducted through the lighting load (e.g., to adjust a present intensity level $L_{PRES}$ of the lighting load) in response to movement of the slider knob 722 along the slider slot 724. Accordingly, the control device 700 may be configured to adjust a present intensity level $L_{PRES}$ of the lighting load from an initial intensity level $L_{INIT}$ to a commanded intensity level $L_{CMD}$ in response to actuations of the analog intensity adjustment actuator (e.g., movement of the slider knob 722 along the slider slot 724). The position of the slider knob 722 along the length of the slider slot 724 may indicate the commanded intensity level $L_{CMD}$ of the lighting load (e.g., via local control). For example, when the lighting load is on, the control device 700 may control the present intensity level $L_{PRES}$ of the lighting load in response to movement of the slider knob 722 along the slider slot 724. When the lighting load is off, the control device 700 may not adjust the present intensity level $L_{PRES}$ of the lighting load in response to movement of the slider knob 722. But, when the lighting load is off and the upper portion 716 of the actuation member 710 is actuated, the control device 700 may turn on the lighting load to an intensity level determined based on the position of the slider knob 722 within the slider slot 724. The slider knob 722 may be configured to move in a vertical direction along the slider slot 724 between a low-end position 726 and a high-end position 728. The slider knob 722 of the slider actuator 720 may allow for adjustment of the present intensity level $L_{PRES}$ of the lighting load between the low-end intensity level $L_{LE}$ (e.g., when the slider knob 722 is located in the low-end position 726) to the high-end intensity level $L_{HE}$ (e.g., when the slider knob 722 is located in the high-end position 728).

The user interface 702 of the control device 700 may include a visible display, such as an illumination surface 729. For example, the illumination surface 729 of the user interface 702 may extend for the length of the slider slot 724. The illumination surface 729 of the user interface 702 may be illuminated to provide a nightlight feature, for example, when the lighting load is off (e.g., in a similar manner as the control device 300 illuminates the illumination surface 229 in the slider slot 224).

The control device 700 may comprise a yoke 740 that may be connected to the enclosure 730 and may be configured to mount the control device 700 to an electrical wallbox. The bezel 712 may be configured to be attached to the yoke 740 (e.g., in a similar manner as the bezel 712 is attached to the yoke 740). Although illustrated with the enclosure 730, in some examples, such as when the control device 700 is a wireless remote control device, the enclosure 730 may be omitted. In such examples, the control device 700 may connect to a base that is affixed to the toggle or paddle actuator of a standard light switch.

Figure 38C:
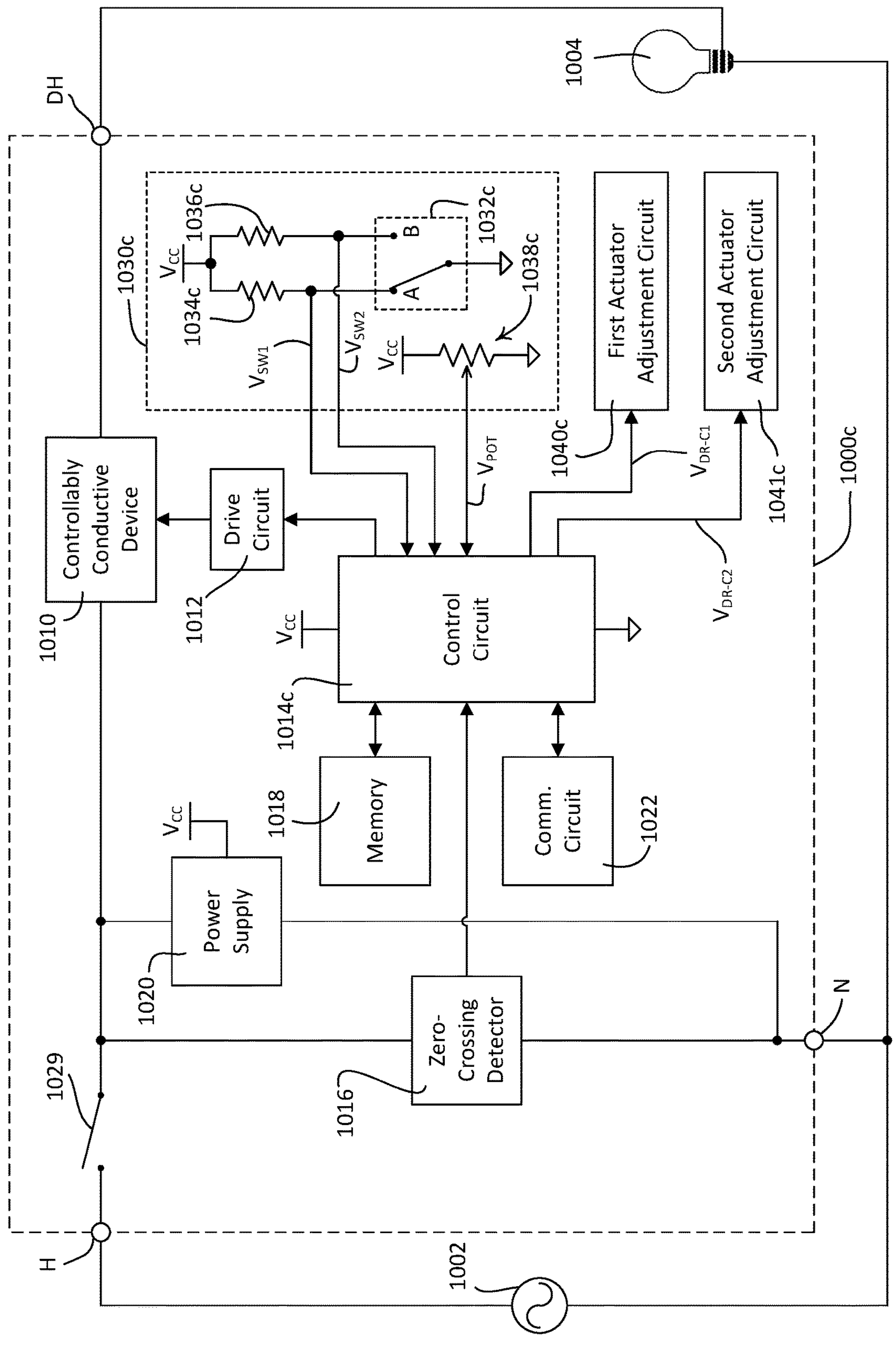

The enclosure 730 may house the load control circuitry of the control device 700, which may be mounted to a printed circuit board (not shown) of the control device 700. The printed circuit board of the control device 700 may be similar to the printed circuit board 350 of the control device 300. For example, the printed circuit board may have mounted thereto any combination of a control circuit (e.g., a primary control circuit), memory, a drive circuit, one or more controllably conductive devices, a zero-crossing detector, a low-voltage power supply, etc. (e.g., as shown in FIGS. 37 and 38C). The control circuit mounted to the printed circuit board may be operatively coupled to a control input of the controllably conductive device of the load control circuitry, for example, via the drive circuit. The control circuit may be used for rendering the controllably conductive device conductive or non-conductive, for example, to control the power delivered to the lighting load to turn the lighting load on and off.

The control device 700 may comprise one or more mechanical switches, such a switch (e.g., such as the switch 550 of the control device 500) that is configured to be opened and closed in response to respective actuations of the actuation member 710 (e.g., in a similar manner as the actuation member 510 of the control device 500 operates). When the upper portion 716 of the actuation member 710 is depressed (e.g., when the actuation member 710 is in an on position), the control device 700 (e.g., the actuation member 710) may actuate the switch to close the switch and turn on the lighting load. When the lower portion 718 of the actuation member 710 is depressed (e.g., when the actuation member 710 is an off position), the control device 700 may actuate the switch to open the switch and turn off the lighting load. The control device 700 may comprise an over-center spring mechanism (e.g., such as the over-center spring mechanism 570 shown in FIGS. 19-23) for causing the actuation member 710 to rest in either the on position or the off position.

The control device 700 may include a potentiometer (e.g., such as the potentiometer 356) having a shaft mechanically coupled to the slider knob 722. The potentiometer may be configured to generate a direct-current (DC) voltage, which may be received by the control circuit, such that the control circuit may adjust the present intensity level $L_{PRES}$ of the lighting load from a low-end intensity level $L_{LE}$ to a high-end intensity level $L_{HE}$ in response to the position of the slider knob 722 along the length of the slider slot 724.

The control device 700 may comprise a communication circuit, such as a wireless communication circuit (e.g., the communication circuit 1022 shown in FIGS. 37 and 38A-38E). The wireless communication circuit may include for example, a radio-frequency (RF) transceiver coupled to an antenna for transmitting and/or receiving RF signals. The wireless communication circuit may also include an RF transmitter for transmitting RF signals, an RF receiver for receiving RF signals, and/or an infrared (IR) transmitter and/or receiver for transmitting and/or receiving IR signals. For example, the antenna may be located on the printed circuit board, located on an additional printed circuit board that is mounted perpendicularly to and electrically coupled to the printed circuit board, and/or located on an additional printed circuit board that is magnetically and/or capacitively coupled to the printed circuit board. The wireless communication circuit may be configured to transmit a control signal that includes the control data (e.g., a digital message) generated by the control circuit to the lighting load. The wireless communication circuit may be configured to receive a message (e.g., digital message) from one or more remote control devices of the load control system (e.g., the retrofit remote control device 112 shown in FIG. 1, the wall-mounted remote control device 114 shown in FIG. 1, the tabletop remote control device 116 shown in FIG. 1, the handheld remote control device 118 shown in FIG. 1, a smart phone, a tablet, a computer, and/or the like). The message may include a command to turn on or off the lighting load controlled by the control device 700 and/or a command to adjust the present intensity level $L_{PRES}$ of the lighting load controlled by the control device 700 from an initial intensity level $L_{INIT}$ of the lighting load to a commanded intensity level $L_{CMD}$ indicated by the message.

In response to receiving a message including a command to turn on or off the lighting load from a remote device, the control device 700 may adjust the position of the actuation member 710 between the on position and the off position. For example, the control circuit of the control device 700 may be configured to adjust the position of the actuation member 710 to the on position in receiving a command to turn on the electrical load. In addition, the control circuit of the control device 700 may be configured to adjust the position of the actuation member 710 to the off position in receiving a command to turn off the electrical load. The control device 700 may comprise a first actuator adjustment system (e.g., such as the actuator adjustment system 600 of the control device 500) for adjusting the position of the actuation member 710 (e.g., between the on position and the off position). The first actuator adjustment system may comprise a motor (e.g., the motor 610) and a gear assembly (e.g., the gear assembly 620) that may couple a drive shaft of the motor to the over-center spring mechanism. The control circuit of the control device 700 may be configured to control the motor of the first actuator adjustment system to adjust the actuation member 710 from the off position to the on position and vice versa (e.g., in a similar manner as the actuator adjustment system 600 operates as described herein).

In response to receiving a message including a command to adjust the present intensity level $L_{PRES}$ of the lighting load from a remote device, the control device 700 may control the lighting load to the commanded intensity level $L_{CMD}$ indicated by the command in the message (e.g., a remote control command). For example, the control circuit of the control device 700 may be configured to adjust the position of the slider knob 722 along the length of the slider slot 724 in response to the commanded intensity level $L_{CMD}$ indicated by the command in the message. The position of the slider knob 722 along the length of the slider slot 724 may indicate the commanded intensity level $L_{CMD}$ of the lighting load (e.g., via local and remote control). The present intensity level $L_{PRES}$ of the lighting load may be synchronized with the position of the slider knob 722 along the slider slot 724 in response to both local and remote control. The control device 700 may comprise a second actuator adjustment system (e.g., such as the actuator adjustment system 400 of the control device 300) for adjusting the position of the slider knob 722 along the length of the slider slot 724. The second actuator adjustment system may comprise a motor (e.g., such as the motor 410) and a gear assembly (e.g., such as the gear assembly 420, such as a rack and pinion gear assembly) that may couple a drive shaft of the motor to the shaft of the potentiometer of the control device 700. The control circuit of the control device 700 may be configured to control the motor of the second actuator adjustment system to adjust the position of the slider knob 722 along the length of the slider slot 724 (e.g., in a similar manner as the actuator adjustment system 400 operates as described above).

The control circuit of the control device 700 may be configured to control the second actuator adjustment system to adjust the position of the slider knob 722 to indicate the present intensity level $L_{PRES}$ of the lighting load. In addition, the control circuit of the control device 700 may also be configured to control the position of the slider knob 722 to indicate other status information of the control device 700 and/or the lighting load (e.g., other than the present intensity level $L_{PRES}$ of the lighting load). For example, the control circuit may be configured to control the position of the slider knob 722 through a controlled movement (e.g., an animated movement) to indicate an operating mode of the control device 700. The control circuit may be configured to, for example, periodically control (e.g., cycle) the position of the slider knob 722 up and down across the length of the slider slot 724 to indicate when the control device 700 is in an association mode for associating the control device 700 with one or more remote control devices (e.g., during the association procedure). In addition, the control circuit may be configured to control the position of the slider knob 722 to a plurality of discrete positions (e.g., four position) in a stepwise (e.g., staccato) manner to indicate that the control device 700 is changing to a different control mode, such as a fan-speed control mode. For example, the control circuit may be configured to control the position of the slider knob 722 to the plurality of discrete positions in the stepwise manner by controlling the position of the slider knob 722 to a first position (e.g., approximately 20% along the length of the slider slot 724) and then waiting for a wait period (e.g., approximately one second), controlling the position of the slider knob 722 to a second position (e.g., approximately 40% along the length of the slider slot 724) and then waiting for the wait period, controlling the position of the slider knob 722 to a third position (e.g., approximately 60% along the length of the slider slot 724) and then waiting for the wait period, and controlling the position of the slider knob 722 to a fourth position (e.g., approximately 80% along the length of the slider slot 724).

When adjusting the position of the slider knob 722 along the slider slot 724, the control circuit of the control device 700 may be configured to stop driving the motor of the second actuator adjustment system to cease adjusting the position of the slider knob 722 in response to determining that the user is presently actuating the slider knob 722 to move the slider knob 722 along the slider slot 724. For example, the control circuit may determine that a user is actuating the slider knob 722 while the control circuit is driving the motor when the shaft of the potentiometer is not at an expected position, and/or when the motor drive voltage for driving the motor indicates unexpected conditions.

In addition, the control circuit of the control device 700 may be configured to control the second actuator adjustment system to provide feedback to a user when the user is manually adjusting the position of the slider knob 722 along the slider slot 724. For example, the control circuit may be configured to control the second actuator adjustment system to provide detents (e.g., points of higher resistance) in the movement of the slider knob 722 along the slider slot 724. When a user is sliding the slider knob 722 along the slider slot 724, the control circuit may be configured to provide one of the detents by controlling the motor to cause the drive shaft to rotate in a direction that causes the rack plate to move in direction that is opposite to which the user is moving the slider knob 722 for a predetermined (e.g., short) period of time. Control of the second actuator adjustment system to provide the detent may not hinder movement of the slider knob 722 by the user, but may provide a slight bump in the movement of the slider knob 722 to signal the detent to the user. For example, the control circuit may be configured to control the motor to provide the detents at one or more positions along the length of the slider slot 724 (e.g., to indicate intensity levels, such as 25%, 50%, and/or 75%). In addition, the control circuit may be configured to control the second actuator adjustment system to generate a vibration of the slider knob 722 at one or more positions along the slider slot 724. When a user is sliding the slider knob 722 along the slider slot 724, the control circuit may be configured to generate the vibration of the slider knob 722 by increasing a frequency of the motor drive voltage that drives the motor. For example, the control circuit may be configured to control the motor to generate the vibration at one or more positions along the length of the slider slot 724 to indicate a preset intensity level (e.g., a favorite or stored present intensity level).

Figure 27:
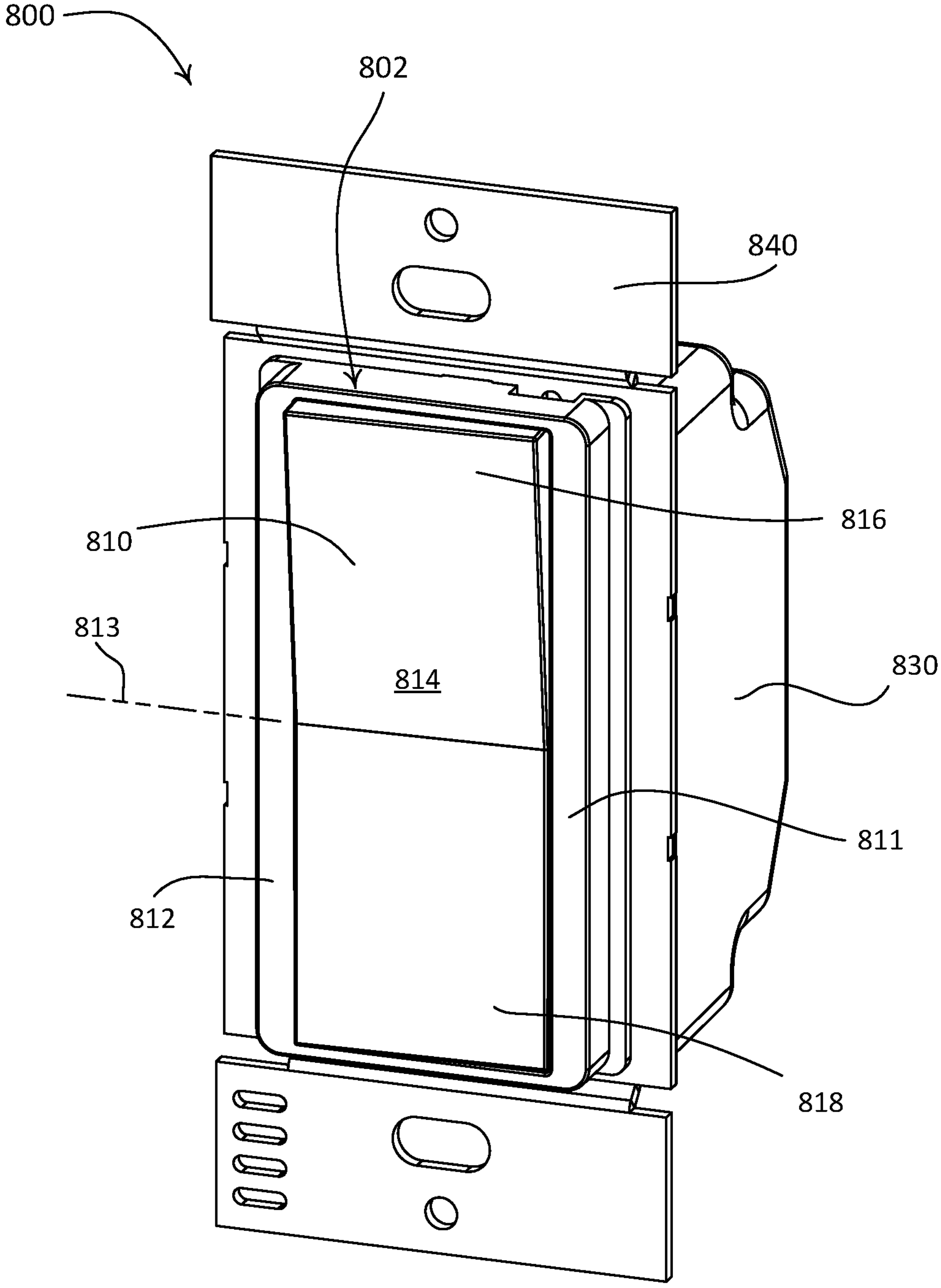
FIG. 27 is a perspective view of another example control device that may be deployed as a wall-mounted load control device, a retrofit remote control device, and/or a wall-mounted remote control device of the load control system illustrated in FIG. 1.
Figure 28:
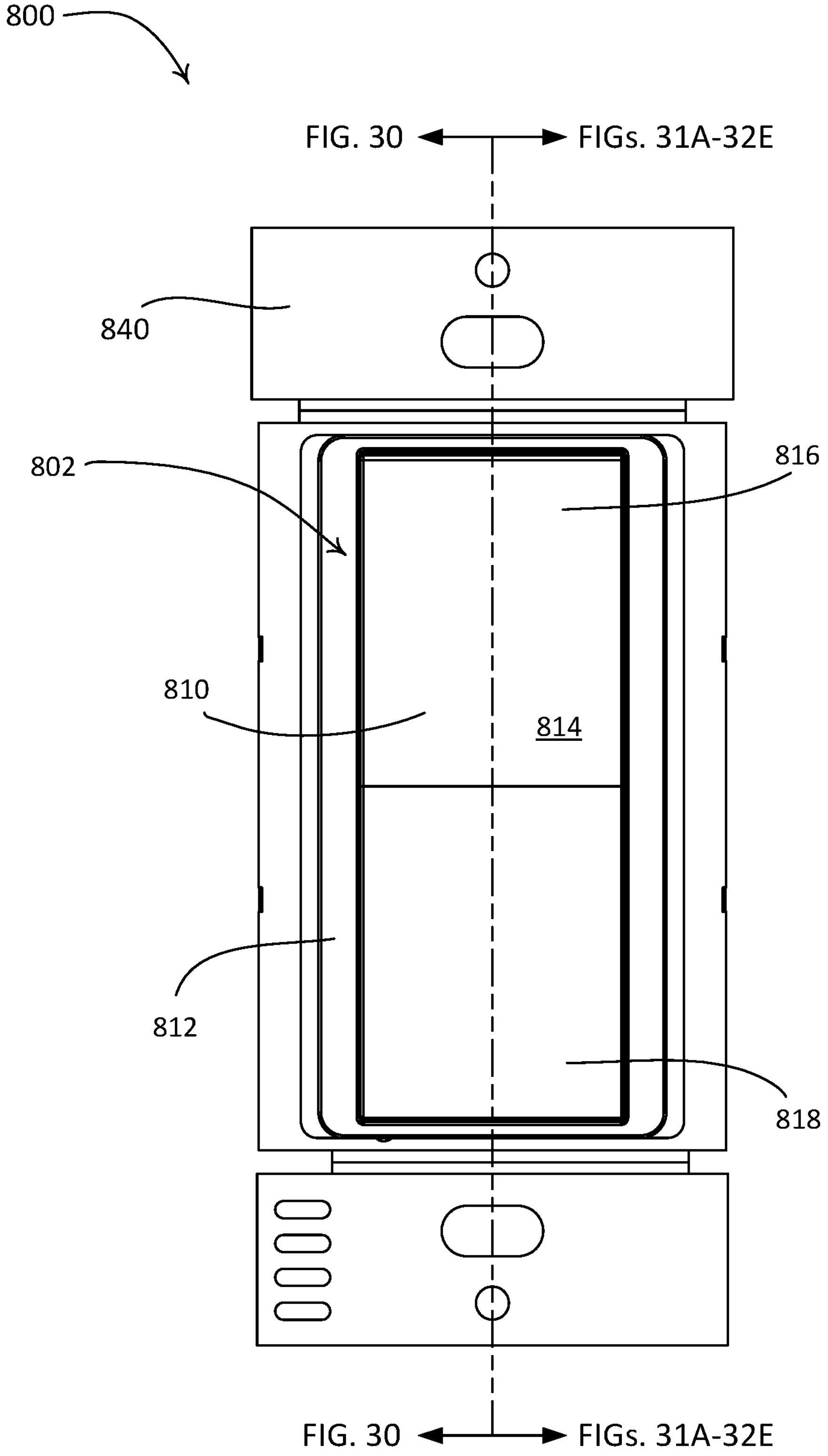
FIG. 28 is a front view of the control device of FIG. 27.

FIG. 27 is a perspective view and FIG. 28 is a front view of an example control device 800 that may be deployed as the wall-mounted load control device 110, the retrofit remote control device 112, and/or the wall-mounted remote control device 114 in the lighting control system 100 shown in FIG. 1. The control device 800 may be configured to be installed in an electrical wallbox with a faceplate (e.g., such as the faceplate 204 shown in FIG. 2). The control device 800 may comprise a user interface 802 that may be configured to be received in an opening of the faceplate. The control device 800 may be configured to control the amount of power delivered to an electrical load, such as a lighting load. The control device 800 may be configured to control the lighting load, for example, to turn the lighting load on or off. For example, the control device 800 may control the lighting load by controlling an internal load control circuit (e.g., a controllably conductive device of the control device 800) and/or by transmitting a message for controlling the lighting load via a communication circuit (e.g., a wireless signal via a wireless communication circuit). The control device 800 may be configured to indicate whether the lighting load is on or off, for example, when the lighting load is controlled remotely and/or locally. When the control device 800 is a wall-mounted load control device, such as a wall-mounted electronic, the control device 800 may comprise an enclosure 830 for housing load control circuitry of the electronic switch.

The user interface 802 of the control device 800 may include an actuation member 810 that is configured to be mounted to a base portion 812 (e.g., a bezel) of the control device 800. The actuation member 810 may be received in an opening in a front surface 811 of the bezel 812. The actuation member 810 may comprise a front surface 814 including an upper portion 816 and a lower portion 818. The actuation member 810 may be configured to pivot about a pivot axis 813 (e.g., a central axis) in response to an actuation of the upper portion 816 and the lower portion 818. For example, the actuation member 810 of the control device 800 may be a bi-stable actuator that may be in one of two positions. In response to an actuation of the lower portion 818 of the actuation member 810, the actuation member 810 may be in a first position (e.g., an off position) in which the upper portion 816 protrudes from the bezel 812 and the lower portion 818 is positioned close to the front surface 811 of the bezel 812 (e.g., as shown in FIG. 27). In response to an actuation of the upper portion 816 of the actuation member 810, the actuation member 810 may be in a second position (e.g., an on position) in which the lower portion 818 protrudes from the bezel 812 and the upper portion 816 is positioned close to the front surface 811 of the bezel 812. For example, the lower portion 816 may be parallel to and/or flush with the front surface 811 of the bezel 812 in the first position and the upper portion 818 may be parallel to and/or flush with the front surface 811 of the bezel 812 in the second position.

The control device 800 may be configured to turn the lighting load on in response to an actuation of the upper portion 816 and to turn the lighting load off in response to an actuation of the lower portion 818 (or vice versa). For example, the control device 800 may include a controllably conductive device adapted to be coupled in series electrical connection between an alternating current (AC) power source and the lighting load. The control device 800 may be configured to control the amount of power delivered from the AC power source to the lighting load (e.g., to turn the lighting load on and off) in response to actuations of the actuation member 810. For example, the control device 800 may control the controllable conductive device to turn on (e.g., connect the AC power source to) the lighting load in response to an actuation of the upper portion 816 of the actuation member 810, and control the controllable conducive device to turn off (e.g., disconnect the AC power source from) the lighting load in response to an actuation of the lower portion 818 of the actuation member 810.

The control device 800 may comprise a yoke 840 that is configured to be connected to the enclosure 830. The yoke 840 may be configured to mount the control device 800 to an electrical wallbox. The bezel 812 may be configured to be attached to the yoke 840 (e.g., in a similar manner as the bezel 312 is attached to the yoke 340). Although illustrated with the enclosure 830, in some examples, such as when the control device 800 is a wireless remote control device, the enclosure 830 may be omitted. In such examples, the control device 800 may connect to a base that is affixed to the toggle or paddle actuator of a standard light switch.

Figure 38D:
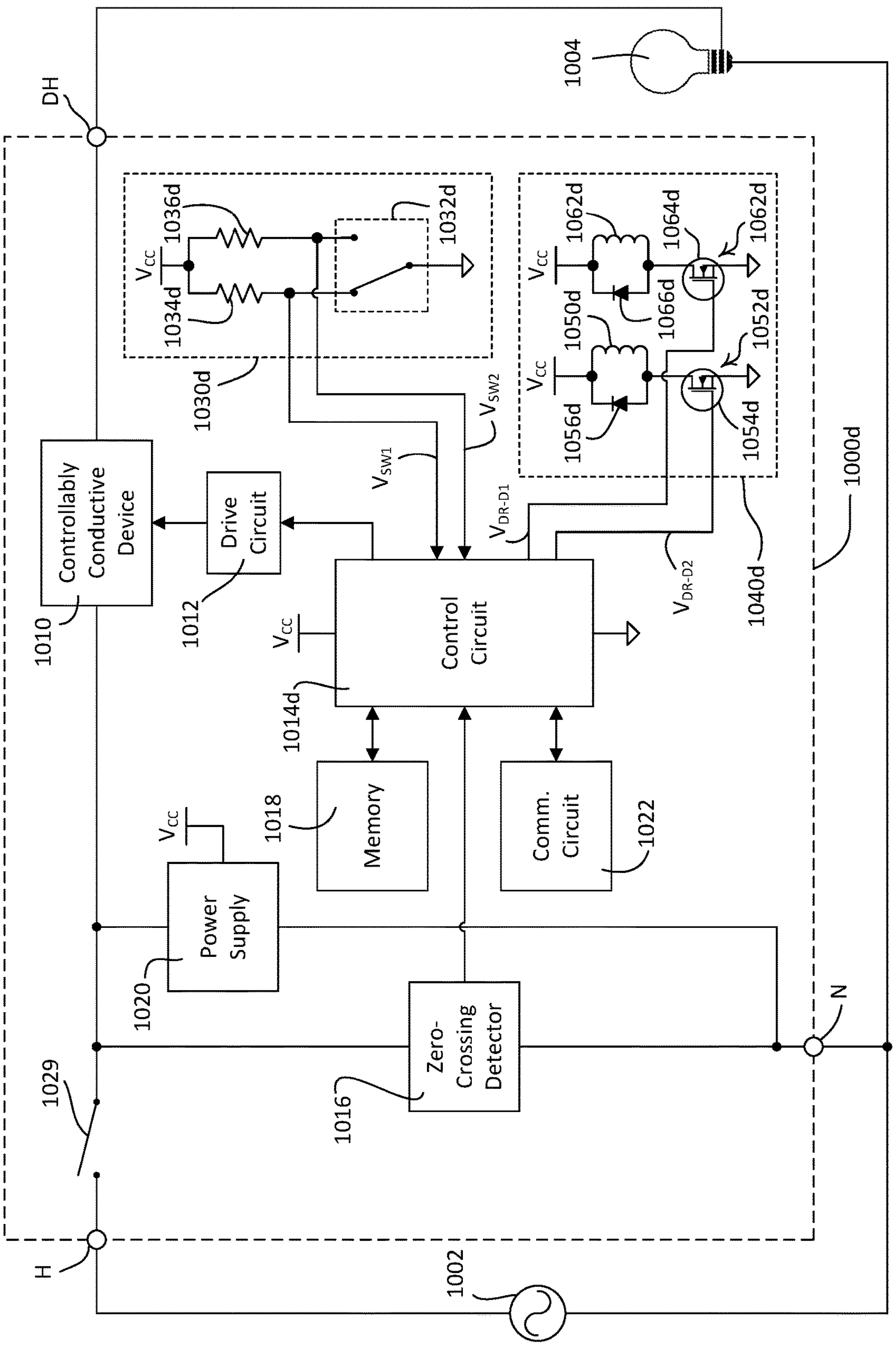

The enclosure 830 may house the load control circuitry of the control device 800, which may be mounted to a printed circuit board (not shown) of the control device 800. The printed circuit board of the control device 800 may be similar to the printed circuit board 350 of the control device 300. For example, the printed circuit board may have mounted thereto any combination of a control circuit (e.g., a primary control circuit), memory, a drive circuit, one or more controllably conductive devices, a zero-crossing detector, a low-voltage power supply, etc. (e.g., as shown in FIGS. 37 and 38D). The control circuit mounted to the printed circuit board may be operatively coupled to a control input of the controllably conductive device of the load control circuitry, for example, via the drive circuit. The control circuit may be used for rendering the controllably conductive device conductive or non-conductive, for example, to control the power delivered to the lighting load to turn the lighting load on and off.

Figure 29:
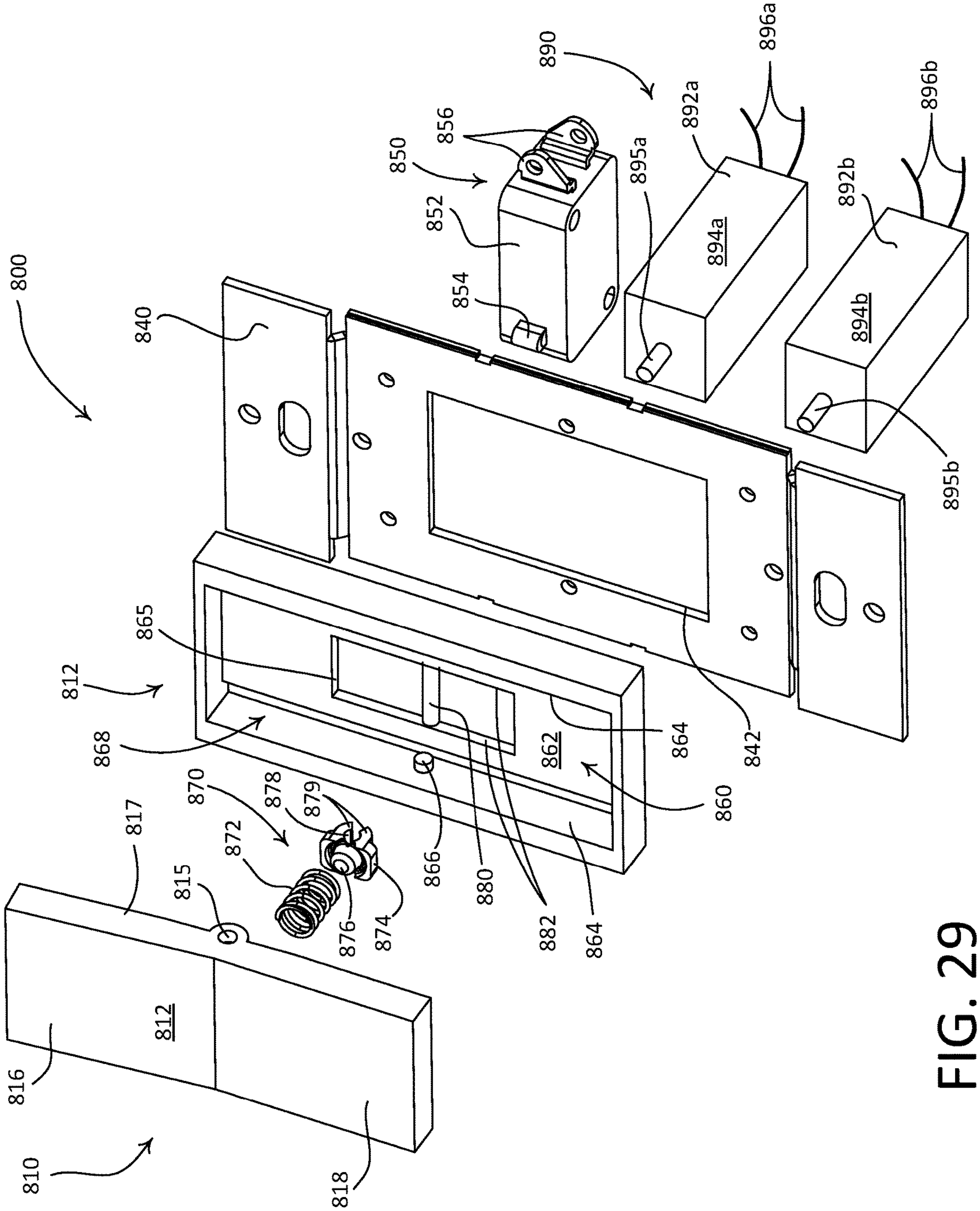
FIG. 29 is an exploded view of the control device of FIG. 27.
Figure 30:
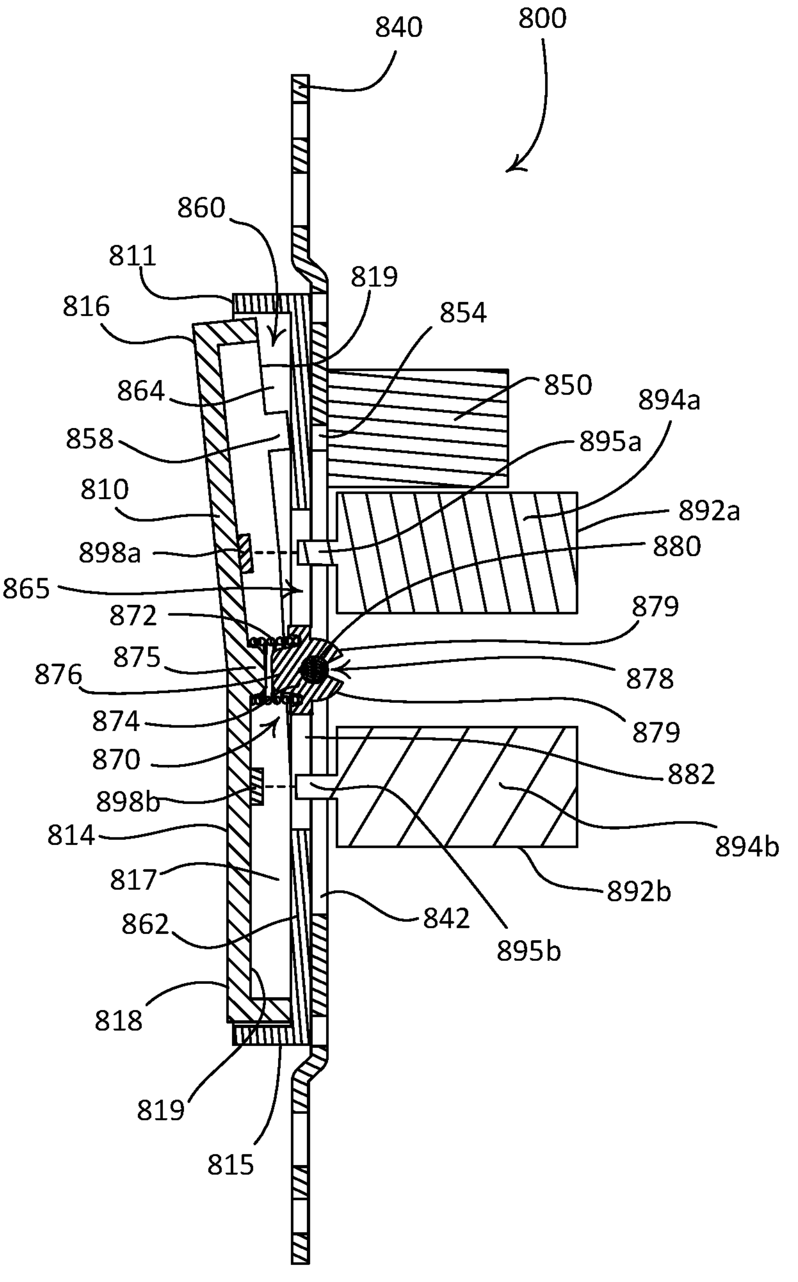
FIG. 30 is a right-side cross-section view of the control device of FIG. 27 taken through the center of the control device (e.g., through the line shown in FIG. 28).

FIG. 29 is an exploded view of the control device 800. FIG. 30 is a right-side cross-section view of the control device 800 taken through the center of the control device 800 (e.g., through the line shown in FIG. 28). The control device 800 may comprise one or more mechanical switches, such as a switch 850 (e.g., a maintained switch). For example, the switch 850 may comprise a single-pole single-throw (SPST) switch or a single-pole double-throw (SPDT) switch. The switch 850 may comprise a switch housing 852 in which electrical contacts of the switch 850 are housed. The switch 850 may also comprise a plunger 854 that may extend from the switch housing 852 and may be actuated to open and/or close the electrical contacts of the switch 850. The plunger 854 of the switch 850 may extend through a central opening 842 of the yoke 840.

The switch 850 may comprise electrical terminals 856 that may be electrically coupled to the electrical contacts of the switch 850. The electrical terminals 856 may be electrically coupled to the printed circuit board for electrically coupling the electrical contacts of the switch 850 to the load control circuitry mounted to the printed circuit board. The control circuit mounted to the printed circuit board may be responsive to actuations (e.g., opening and closing) of the switch 850 (e.g., to turn the lighting load on and off). For example, when the switch 850 is a single-pole double-throw switch, the electrical contacts of the switch 850 may be closed when the plunger 854 is depressed and the electrical contacts of the switch 850 may be opened when the plunger 854 is released. When the switch 850 is a double-throw single-pole switch, one of the electrical terminals 856 may be a common terminal, while the other two terminals may be switched terminals. The switch 850 may be configured to alternately connect the common terminal to one of the two switched terminals in response to actuations of the plunger 854.

The actuation member 810 may be pivotably mounted within a recess 860 of the bezel 812. The bezel 812 may comprise a plate portion 862 and sidewalls 864 that define the recess 860. The bezel 812 may further comprise two posts 866 (e.g., circular posts) extending the sidewalls 864 (e.g., extending from opposing sidewalls) at approximately the midpoint between a top and a bottom of the recess 860. When the actuation member 810 is located in the recess 860 of the bezel 812, the posts 866 may be received in openings 815 in sidewalls 817 of the actuation member 810. The posts 866 may define the pivot axis 813 about which the actuation member 810 pivots.

The actuation member 810 may comprise a tab 858 (e.g., as shown in FIG. 30) extending from one of the sidewalls 817 of the actuation member 810. The tab 858 may be configured to actuate the plunger 854, for example, as the upper portion 816 of the actuation member 810 is pressed. When the upper portion 816 of the actuation member 810 is pressed in towards the yoke 840, the actuation member 810 may be configured to pivot about the pivot axis 813 (e.g., into the on position), such that the tab 858 extends through an opening 868 (e.g., a slot) in the plate portion 862 of the bezel 812 and presses in on (e.g., applies a force on) the plunger 854 (e.g., to close the electrical contacts of the switch 850). When the lower portion 818 of the actuation member 810 is pressed in towards the yoke 840, the actuation member 810 may be configured to pivot about the pivot axis 813 (e.g., into the on position), such that the tab 858 releases (e.g., does not press in on) the plunger 854 (e.g., to open the electrical contacts of the switch 850). The control circuit of the control device 800 may be configured to turn the lighting load on when the actuation member 810 is in the on position (e.g., and the electrical contacts of the switch 850 are closed) and turn the lighting load off when the actuation member 810 is in the off position (e.g., and the electrical contacts of the switch 850 are open). In some examples, the control device 800 may be configured to control a lighting load of the lighting control system to turn the lighting load on in response to the tab 858 pressing in the plunger 854 of the switch 850, and to turn the lighting load off in response to the tab 858 releasing the plunger 854 of the switch 850 (or vice versa).

The control device 800 may comprise an over-center spring mechanism 870 for causing the actuation member 810 to be held in either the on position or the off position. The over-center spring mechanism 870 may comprise a spring 872 (e.g., an over-center spring) and a pivot member 874. For example, the spring 872 may be a coil spring. The spring 872 may extend between the actuation member 810 and the pivot member 874 through an opening 865 in the plate portion 862 of the bezel 812. For example, the spring 872 may extend from a nub 875 (e.g., as shown in FIG. 30) on a rear surface 819 of the actuation member 810 to a nub 876 on the pivot member 874. For example, the nub 875 may extend from the rear surface 819 of the actuation member 810 and the nub 876 may extend from the pivot member 874. The nubs 875, 876 may be received in opposite ends of the spring 872 for holding the spring 872 in place. The pivot member 874 may be pivotably supported by (e.g., pivotably coupled to) a support rod 880 (e.g., a cylindrical rod), which may extend between opposite sides 882 of the opening 865 in the plate portion 862 of the bezel 812. For example, the support rod 880 may define a pivot axis of the pivot member 874. The pivot member 874 may comprise a channel 878 (e.g., a cylindrical channel) in which the support rod 880 may be received. For example, the support rod 880 may be configured to snap into the channel 878. The pivot member 874 may comprise arms 879 configurated to partially wrap around the rod 884 of the support member 880 of the pivot member 874 for holding the pivot member 874 in attachment with the rod 884 (e.g., as shown in FIG. 30).

The control device 800 may comprise an actuator adjustment system 890 for allowing the control circuit of the control device 800 to adjust the position of the actuation member 810 (e.g., between the on position and the off position). The actuator adjustment system 890 may comprise one or more solenoids, for example, first and second solenoids 892*a*, 892*b* (e.g., push solenoids). The first and second solenoids 892*a*, 892*b* may be located between the actuation member 810 and the electrical wallbox (e.g., within the electrical wallbox). For example, the first solenoid 892*a* may be positioned behind the upper portion 816 of the actuation member 810 and the second solenoid 892*b* may be positioned behind the lower portion 818 of the actuation member 810 (e.g., as shown in FIG. 30). The first and second solenoids 892*a*, 892*b* may each comprise respective bodies 894*a*, 894*b*, and pins 895*a*, 895*b*. The first and second solenoids 892*a*, 892*b* may each comprise respective pairs of electrical leads 896*a*, 896*b* (e.g., electrical wires) configured to be electrically coupled to a solenoid drive circuit mounted to the printed circuit board. The pins 895*a*, 895*b* may be configured to extend from the bodies 894*a*, 894*b* of the respective solenoids 892*a*, 892*b* when the solenoids are energized. The pin 895*a* of the first solenoid 892*a* may be configured to extend through the central opening 842 of the yoke 840 to contact the rear surface 819 of the actuation member 810 when the upper portion 816 is depressed (e.g., in the on position) and the pin 895*b* of the second solenoid 892*b* may be configured to extend through the central opening 842 of the yoke 840 to contact the rear surface 819 of the actuation member 810 when the lower portion 818 is depressed (e.g., in the off position). The actuation member 810 may have a first damping pad 898*a* (e.g., a first piece of damping material) at the location where the pin 895*a* of the first solenoid 892*a* contacts the rear surface 819 of the actuation member 810 and a second damping pad 898*b* (e.g., a second piece of damping material) at the location where the pin 895*b* of the second solenoid 892*b* contacts the rear surface 819 of the actuation member 810. The first and second damping material pieces 898*a*, 898*b* may operate minimize noise generated by the operation of the solenoids and the contact between the pins 895*a*, 895*b* and the rear surface 819 of the actuation member 810.

The control circuit may be configured to control the solenoid drive circuit to cause the pin 895*a* of the first solenoid 892*a* to extend from the body 894*a* and contact the rear surface 819 of the actuation member 810 behind the upper portion 816 to adjust the actuation member 810 to the off position. The control circuit may be configured to control the solenoid drive circuit to cause the pin 895*b* of the second solenoid 892*b* to extend from the body 894*b* and contact the rear surface 819 of the actuation member 810 behind the lower portion 818 to adjust the actuation member 810 to the on position. The over-center spring mechanism 870 may hold the actuation member 810 in the position to which the actuation member 810 was adjusted by the solenoids 892*a*, 892*b*. For example, the control circuit may be configured to energize just the first solenoid 892*a* to adjust the actuation member 810 to the off position and energize just the second solenoid 892*b* to adjust the actuation member 810 to the on position.

In some examples, the control circuit may be configured to energize both of the solenoids as part of an adjustment sequence when adjusting the actuation member 810 between the on position and the off position. FIGS. 31A-32E are left-side cross-section views of the control device 800 taken through the center of the control device 800 (e.g., through the line shown in FIG. 28). FIGS. 31A-31E illustrate a first adjustment sequence during which the actuator adjustment system 890 adjusts the actuation member 810 from the off position to the on position, and FIGS. 32A-32E illustrate a second adjustment sequence during which the actuator adjustment system 890 adjusts the actuation member 810 from the on position to the off position.

Figures 31A, 31B, 31C, 31D, 31E:
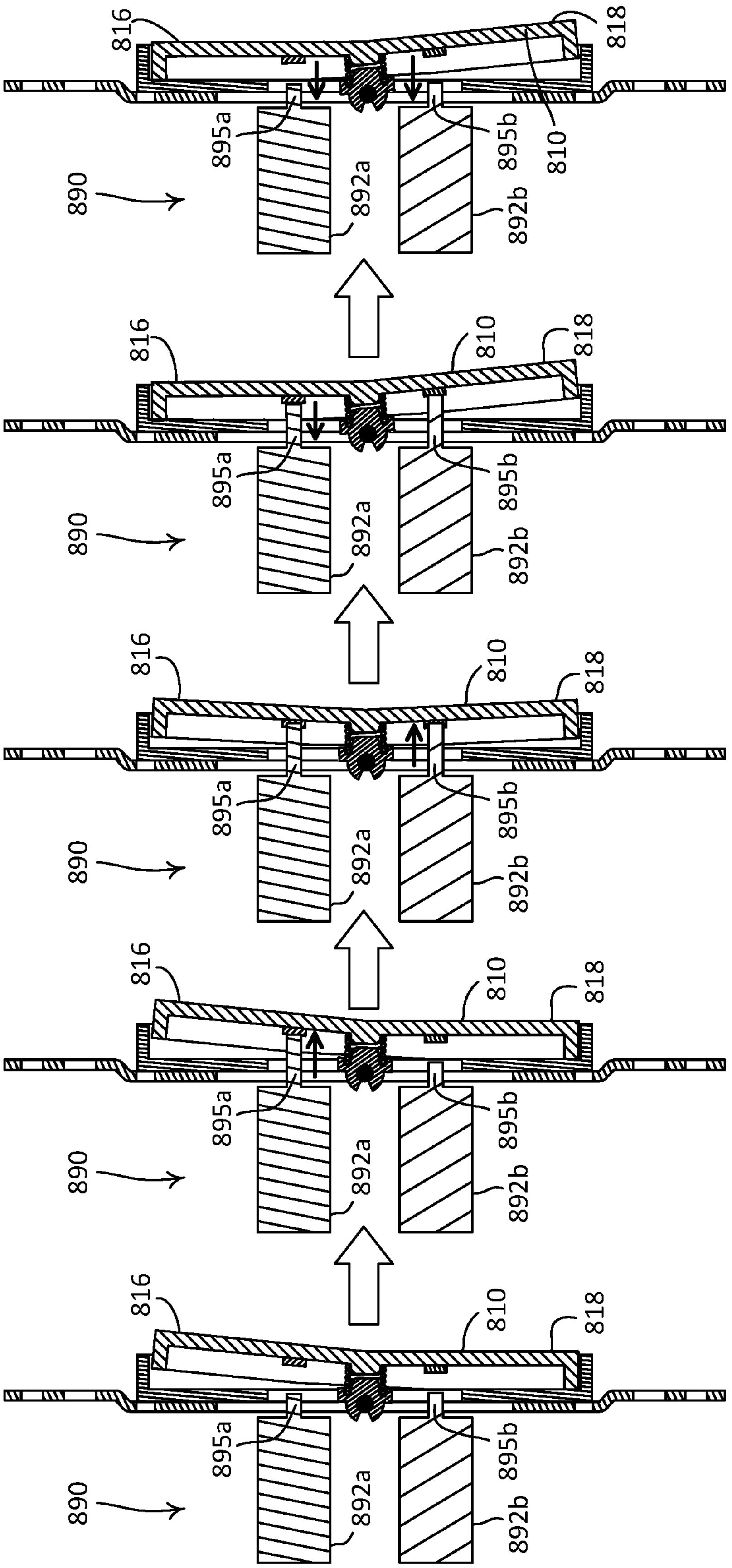
FIGS. 31A-31E are left-side cross-section views of the control device of FIG. 27 taken through the center of the control device (e.g., through the line shown in FIG. 28) that illustrate adjustment of an actuation member from an off position to an on position.

As shown in FIG. 31A-31E, the control circuit may control the first and second solenoids 892*a*, 892*b* to adjust the actuation member 810 from the off position to the on position as part of the first adjustment sequence. The actuation member 810 may initially be in the off position, and the pins 895*a*, 895*b* of the solenoids 892*a*, 892*b* may each be in a retracted position as shown in FIG. 31A. The control circuit may start the first adjustment sequence by first extending the pin 895*a* of the first solenoid 892*a* behind the upper portion 816 of the actuation member 810 (e.g., the solenoid behind the portion of the actuation member 810 that is not initially depressed) to preload the actuation member 810 as shown in FIG. 31B. The control circuit may next extend the pin 892*b* of the second solenoid 892*b* (e.g., the solenoid behind the portion of the actuation member 810 that is initially depressed), such that each pin is in an extended position and the actuation member 810 is partially pivoted (e.g., to a midpoint between the off position and the on position) as shown in FIG. 31C. For example, a force acting by the pin 892*b* of the second solenoid 892*b* on the actuation member 810 may be approximately equal to a force acting by the pin 892*a* of the first solenoid 892*a*. The control circuit may then cause the pin 895*a* of the first solenoid 892*a* behind the upper portion 816 of the actuation member 810 to retract (e.g., by a small amount) to allow the pin 895*b* of the second solenoid 892*b* to push the actuation member 810 such that the actuation member 810 finishes pivoting into the on position as shown in FIG. 31D. The control circuit may finish the first adjustment sequence by deenergizing the first and second solenoids 892*a*, 892*b* to cause the pins 895*a*, 895*b* to both retract (e.g., fully retract), such that the over-center spring mechanism 870 may hold the actuation member 810 in the on position as shown in FIG. 31E.

Figures 32A, 32B, 32C, 32D, 32E:
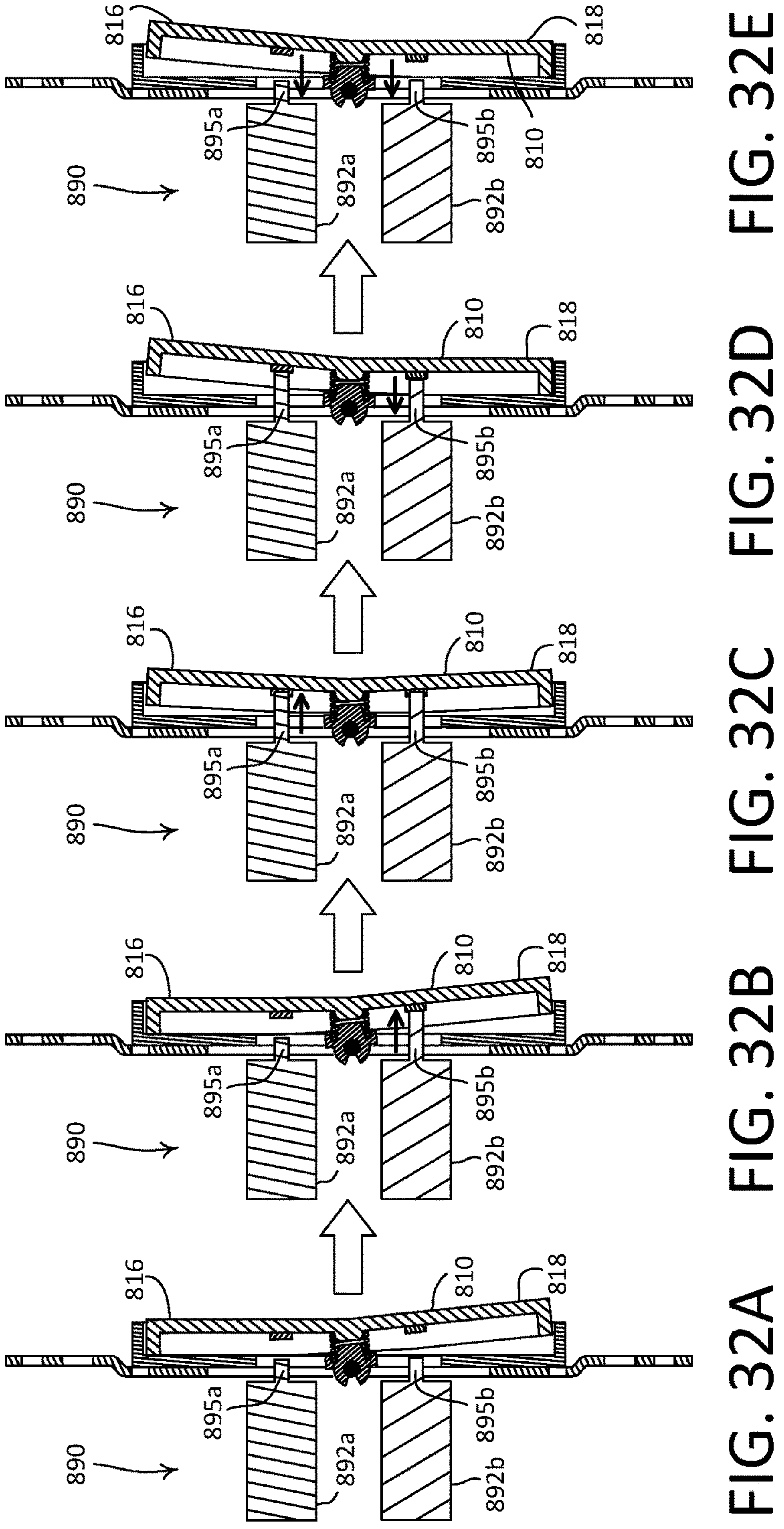
FIGS. 32A-32E are left-side cross-section views of the control device of FIG. 27 taken through the center of the control device (e.g., through the line shown in FIG. 28) that illustrate adjustment of the actuation member from the on position to the off position.

As shown in FIG. 32A-32E, the control circuit may control the first and second solenoids 892*a*, 892*b* to adjust the actuation member 810 from the on position to the off position as part of the second adjustment sequence. The actuation member 810 may initially be in the on position, and the pins 895*a*, 895*b* of the solenoids 892*a*, 892*b* may each be in a retracted position as shown in FIG. 32A. The control circuit may start the second adjustment sequence by first extending the pin 895*b* of the second solenoid 892*b* behind the lower portion 818 of the actuation member 810 (e.g., the solenoid behind the portion of the actuation member 810 that is not initially depressed) to preload the actuation member 810 as shown in FIG. 32B. The control circuit may next extend the pin 892*a* of the first solenoid 892*a* (e.g., the solenoid behind the portion of the actuation member 810 that is initially depressed), such that each pin is in an extended position and the actuation member 810 is partially pivoted (e.g., to a midpoint between the on position and the off position) as shown in FIG. 32C. For example, a force acting by the pin 892*a* of the first solenoid 892*a* on the actuation member 810 may be approximately equal to a force acting by the pin 892*b* of the second solenoid 892*b*. The control circuit may then cause the pin 895*b* of the second solenoid 892*b* behind the lower portion 818 of the actuation member 810 to retract by a small amount to allow the pin 895*a* of the first solenoid 892*a* to push the actuation member 810 such that the actuation member 810 finishes pivoting into the on position as shown in FIG. 32D. The control circuit may finish the second adjustment sequence by deenergizing the second solenoids 892*a*, 892*b* to cause the pins 895*a*, 895*b* to both retract (e.g., fully retract), such that the over-center spring mechanism 870 may hold the actuation member 810 in the off position as shown in FIG. 32E.

The control device 800 may comprise a communication circuit, such as a wireless communication circuit (e.g., the communication circuit 1022 shown in FIGS. 37 and 38A-38E). The wireless communication circuit may include for example, a radio-frequency (RF) transceiver coupled to an antenna for transmitting and/or receiving RF signals. The wireless communication circuit may also include an RF transmitter for transmitting RF signals, an RF receiver for receiving RF signals, and/or an infrared (IR) transmitter and/or receiver for transmitting and/or receiving IR signals. For example, the antenna may be located on the printed circuit board, located on an additional printed circuit board that is mounted perpendicularly to and electrically coupled to the printed circuit board, and/or located on an additional printed circuit board that is magnetically and/or capacitively coupled to the printed circuit board.

The wireless communication circuit may be configured to transmit a control signal that includes the control data (e.g., a digital message) generated by the control circuit to the lighting load. The wireless communication circuit may be configured to receive a message (e.g., digital message) from one or more remote control devices of the load control system (e.g., the retrofit remote control device 112 shown in FIG. 1, the wall-mounted remote control device 114 shown in FIG. 1, the tabletop remote control device 116 shown in FIG. 1, the handheld remote control device 118 shown in FIG. 1, a smart phone, a tablet, a computer, and/or the like). The message may include a command to turn on or off the lighting load controlled by the control device. In response to receiving a message from a remote device, the control device 800 may control the controllably conductive device to control the lighting load and adjust the position of the actuation member 810 between the on position and the off position. For example, the control circuit of the control device 800 may be configured to control the controllably conductive device to turn on the lighting load and adjust the position of the actuation member 810 to the on position in response to receiving a command to turn on the lighting load. In addition, the control circuit of the control device 800 may be configured to control the controllably conductive device to turn off the lighting load and adjust the position of the actuation member 810 to the off position in response to receiving a command to turn off the lighting load.

Figure 33:
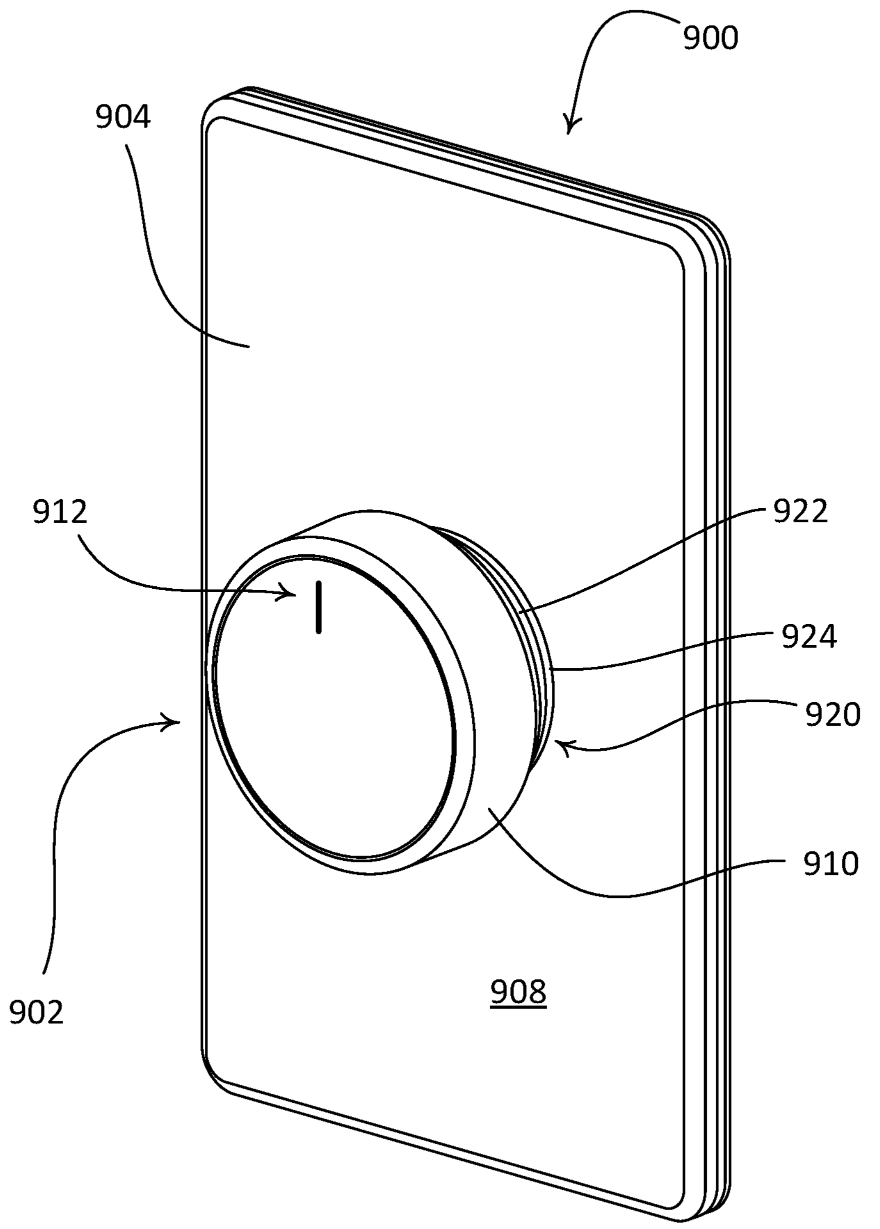
FIG. 33 is a perspective view of an example control device that may be deployed as a wall-mounted load control device of the load control system illustrated in FIG. 1.
Figure 34:
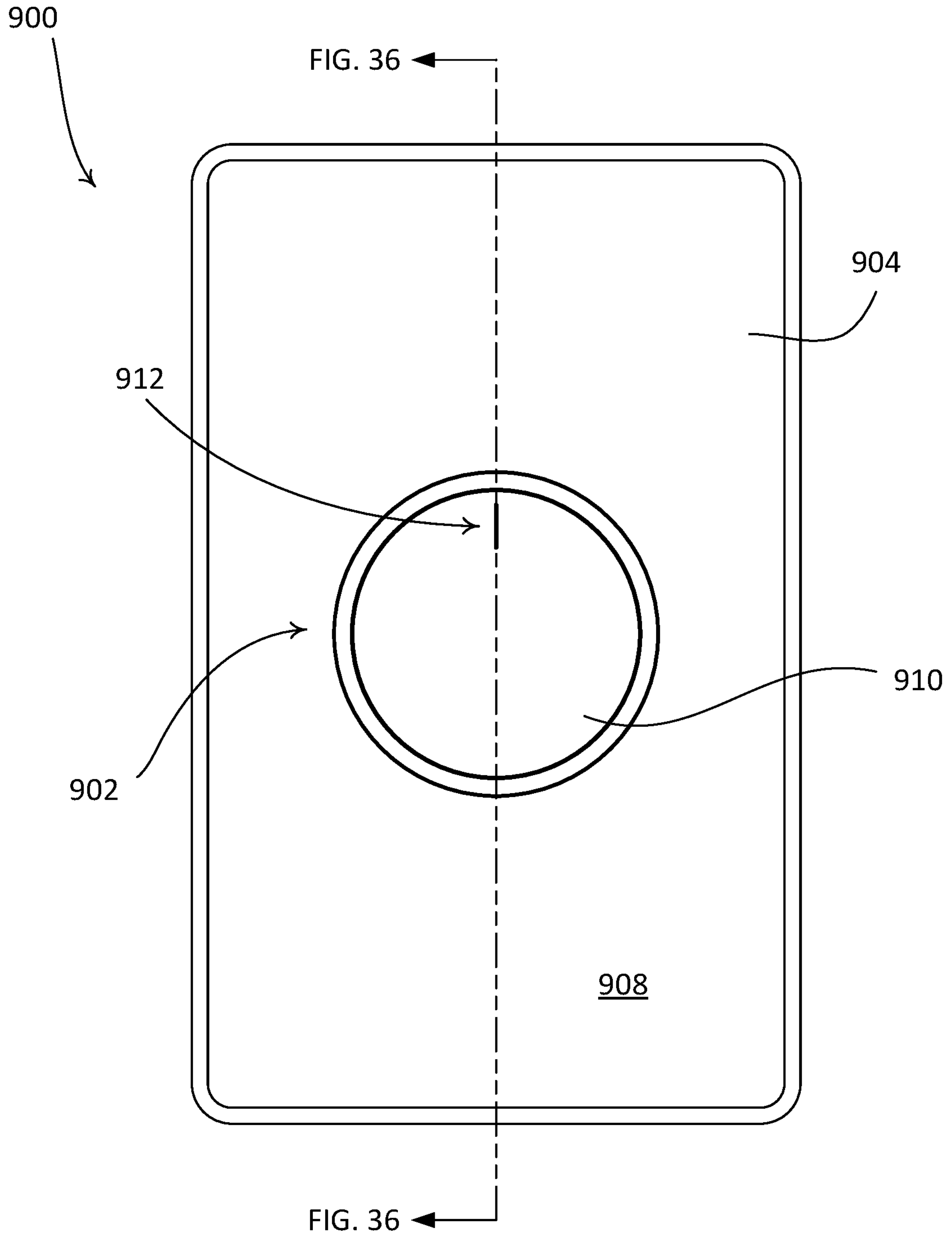
FIG. 34 is a front view of the control device of FIG. 33.

FIG. 33 is a perspective view and FIG. 34 is a front view of an example control device 900 that may be deployed as the wall-mounted load control device 110 in the lighting control system 100. The control device 900 may comprise a user interface 902 and a faceplate 904. The user interface 902 of the control device 900 may comprise an analog intensity adjustment actuator, such as a rotary knob 910. The rotary knob 910 may be configured to be rotatable with respect to the collar 920. The control device 900 may include a collar 920 located between the rotary knob 910 and the faceplate 904. The rotary knob 910 may be configured to be rotatable with respect to the collar 920. For example, the rotary knob 910 may be characterized by non-continuous rotation having a high-end stopping point and a low-end stopping point. The low-end stopping point may be associated with a minimum intensity level of the lighting load. The high-end stopping point may be associated with a maximum intensity level of the lighting load. The control device 900 may be configured to control the amount of power delivered to an electrical load, such as a lighting load. The control device 900 may be configured to turn the lighting load on and off in response to actuations of the rotary knob 910 that push the rotary knob 910 in towards the faceplate 904. The control device 900 may be configured to adjust a present intensity level $L_{PRES}$ of the lighting load in response to rotations of the rotary knob 910. For example, the control device 900 may control the lighting load by controlling internal load control circuitry and/or by transmitting a message for controlling the lighting load via a communication circuit (e.g., a wireless signal via a wireless communication circuit).

For example, the internal load control circuit of the control device 900 may include a controllably conductive device adapted to be coupled in series electrical connection between an alternating current (AC) power source and the lighting load. The control device 900 may control the controllable conductive device to turn on (e.g., connect the AC power source to) the lighting load and control the controllable conducive device to turn off (e.g., disconnect the AC power source from) the lighting load in response to actuations (e.g., presses) of the rotary knob 910. The control device 900 may control the magnitude of a load current conducted through the lighting load (e.g., to adjust a present intensity level $L_{PRES}$ of the lighting load) in response to rotations of the rotary knob 910. Accordingly, the control device 900 may be configured to adjust the present intensity level $L_{PRES}$ of the lighting load from an initial intensity level $L_{INIT}$ to a commanded intensity level $L_{CMD}$ in response to an actuation of the rotary knob 910. The position of an indicator 912 on the rotary knob 910 along the circumference of the rotary knob 910 may indicate the commanded intensity level $L_{CMD}$ of the lighting load (e.g., via local control). For example, the indicator 912 of the rotary knob 910 may be at a first position (e.g., such as a zero-degrees position) when the rotary knob 910 is at the low-end stopping point and the indicator 912 of the rotary knob 910 may be at a second position (e.g., such as a 360-degrees position) when the rotary knob 910 is at the high-end stopping point. When the lighting load is on, the control device 900 may control the present intensity level $L_{PRES}$ of the lighting load in response to rotation of the rotary knob 910. When the lighting load is off, the control device 900 may not adjust the present intensity level $L_{PRES}$ of the lighting load in response to rotation of the rotary knob 910. But, when the lighting load is off and the rotary knob 910 is pressed, the control device 900 may turn on the lighting load to an intensity level determined based on the angular position of the rotary knob 910.

Figure 35:
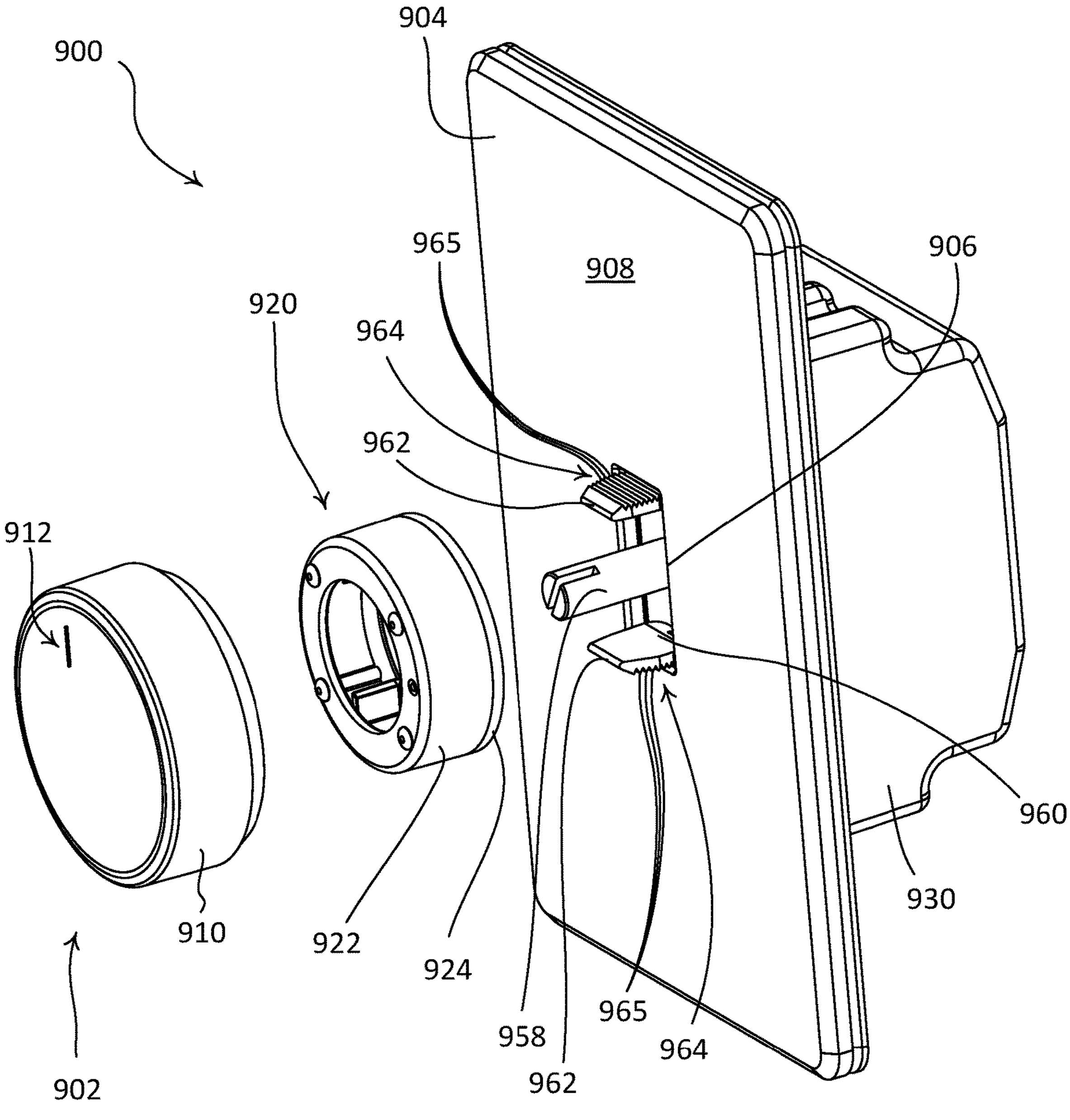
FIG. 35 is a perspective view of the control device of FIG. 33 with a rotary knob removed.
Figure 36:
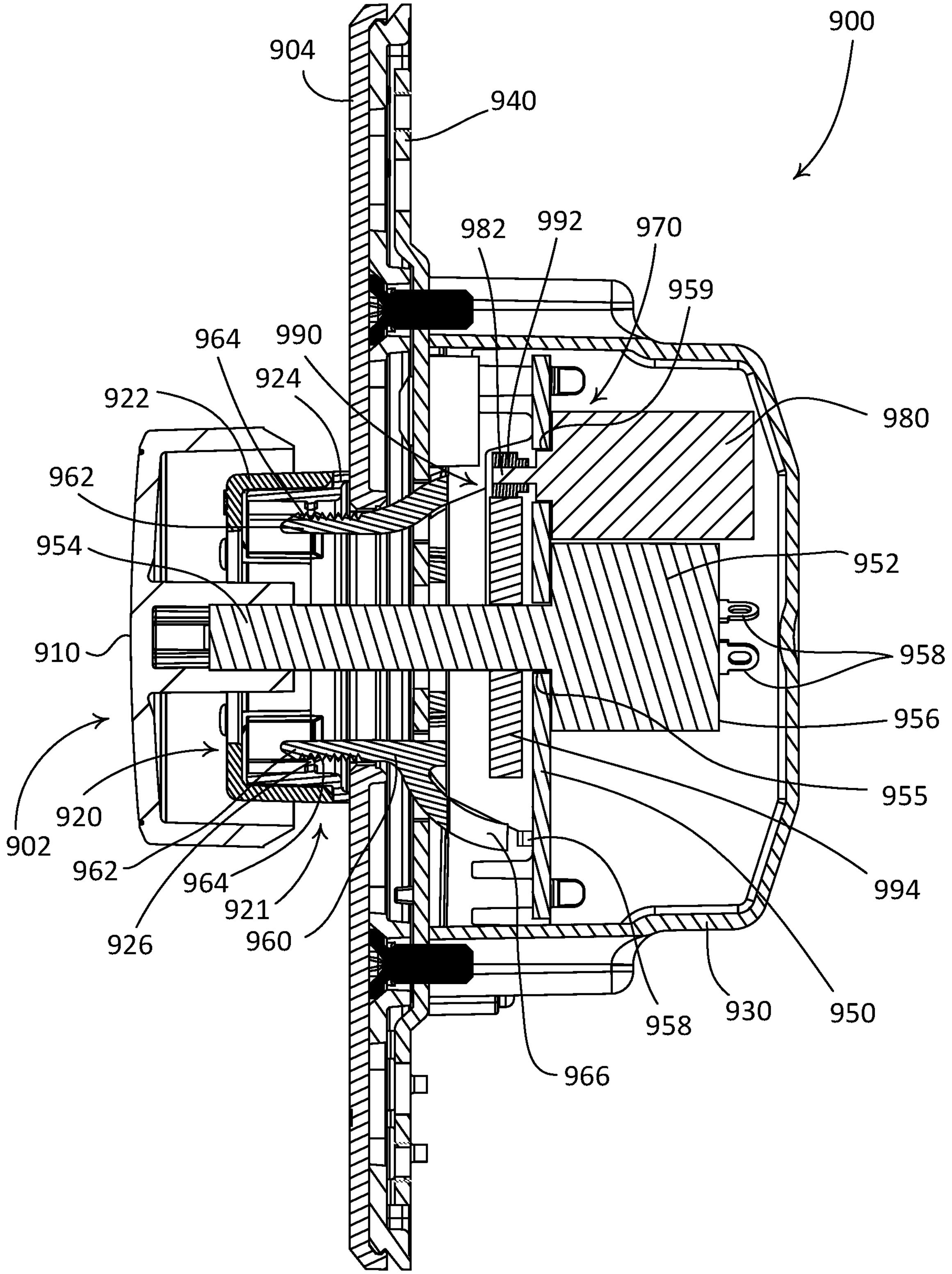
FIG. 36 is a right-side cross-section view of the control device of FIG. 33 taken through the center of the control device (e.g., through the line shown in FIG. 34).
Figure 38E:
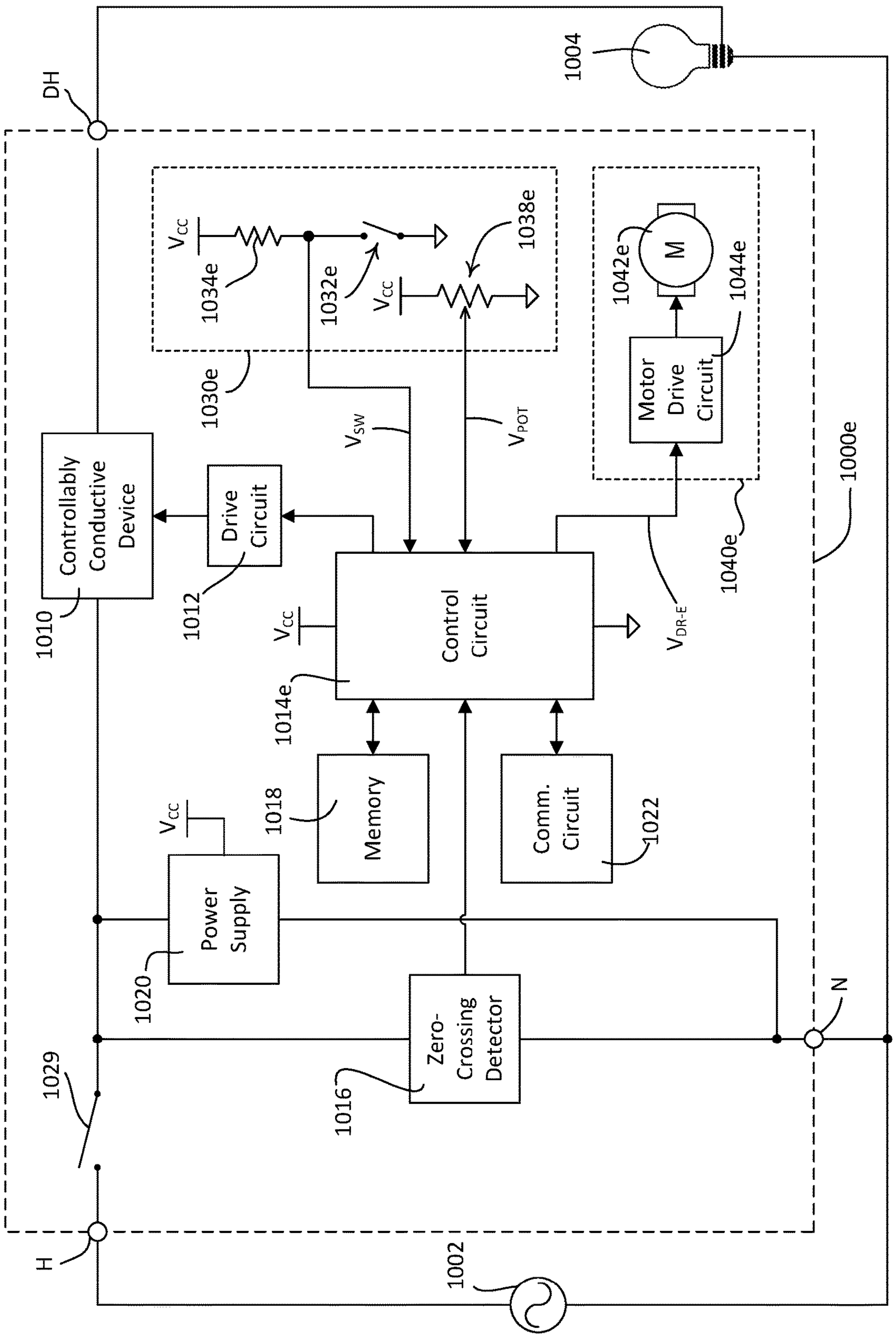

FIG. 35 is a perspective view of the control device 900 with the rotary knob 910 removed. FIG. 36 is a right-side cross-section view of the control device 900 taken through the center of the control device 900 (e.g., through the line shown in FIG. 34). The control device 900 may comprise an enclosure 930 for housing the load control circuitry of the control device 900. The control device 900 may comprise a yoke 940 that may be connected to the enclosure 930 and may be configured to mount the control device 900 to an electrical wallbox. The load control circuitry of the control device 900 may be mounted to a printed circuit board 950, which may be housed within the enclosure 930. For example, the printed circuit board 950 may have mounted thereto any combination of a control circuit (e.g., a primary control circuit), memory, a drive circuit, one or more controllably conductive devices, a zero-crossing detector, a low-voltage power supply, etc. (e.g., as shown in FIGS. 37 and 38E).

The control device 900 may include a potentiometer 952 having a shaft 954 that extends through an opening 906 of the faceplate 904. The control device 900 may include a mounting member 960. The shaft 954 of the potentiometer 952 may extend through an opening 955 in the printed circuit board 950. The potentiometer 952 may comprise an enclosure 956 configured to house a switch and a resistive element of the potentiometer 952. The potentiometer 952 (e.g., the switch and a variable resistive element of the potentiometer 952) may be electrically connected to the load control circuitry on the printed circuit board 950 via electrical wires (not shown) connected to pins 958 of the potentiometer 952. The rotary knob 910 may be coupled to the shaft 954 of the potentiometer 952. The variable resistive element of the potentiometer 952 may be characterized by a variable impedance (e.g., resistance) and may be configured to generate a direct-current (DC) voltage, which may be received by the control circuit and may have a magnitude representative of the desired amount of power to be delivered to the lighting load and thus the present intensity level $L_{PRES}$ of the lighting load. The resistance of the potentiometer 952 and thus the magnitude of the DC voltage generated by the potentiometer 952 may be adjusted in response to a rotation (e.g., a user input) of the rotary knob 910 and thus the shaft 954 of the potentiometer 952 in order to control the amount of power delivered to the lighting load. Rotations of the rotary knob 910 and thus the shaft 954 of the potentiometer 952 may allow a user to adjust the present intensity level $L_{PRES}$ of the lighting load from a low-end intensity level $L_{LE}$ to a high-end intensity level $L_{HE}$. In addition, the switch of the potentiometer 952 may be actuated in response to pushes of the shaft 954 towards the enclosure 956. Actuations of the rotary knob 910 and thus the switch of the potentiometer 952 may allow the user to turn the lighting load on and off.

The control device 900 may include a mounting member 960. The mounting member 960 may be configured to secure (e.g., removably secure) the collar 920 thereto. The mounting member 960 may include compliant members 962 that are configured to extend through the opening 906 of the faceplate 904 and protrude beyond a front surface 908 of the faceplate 904. The compliant members 962 may extend on opposed sides of the shaft 954 of the potentiometer 952. When the compliant members 962 protrude beyond the front surface 908, the compliant members 962 may be received within the collar 920. Each of the compliant members 962 may define a ratcheting surface 964. The ratcheting surface 964 may include a plurality of teeth 965. The ratcheting surface 964 of each of the compliant members 962 may be distal from (e.g., facing away from) the shaft 954 of the potentiometer 952.

The mounting member 960 may include one or more light pipe structures 966. For example, the light pipe structures 966 may be connected to the compliant members 962. The light pipe structures 966 may be configured to conduct light from one or more light sources inside of the control device 900 to the rotary knob 910 and/or the faceplate 904 (e.g., the front surface 908). For example, the light emitted by the one or more light sources is directed through a gap 921 between the rotary knob 910 and the faceplate 904, for example, to illuminate the front surface 908 of the faceplate 904. For example, light sources may include one or more light-emitting diodes (LEDs) 948 mounted to the printed circuit board 950 adjacent to respective ends of the light pipe structures 966 (e.g., as shown in FIG. 36). For example, at least a portion of the mounting member 960 (e.g., the compliant members 962 and/or the light pipe structures 966) may be made of a transparent and/or translucent material.

The control device 900 may be configured to provide a nightlight feature by shining light out of the collar 920. The mounting member 960 may be configured to conduct light emitted from the LEDs 948 through the respective light pipe structures 966 and through the respective compliant members 962 to an interior of the collar 920. The collar 920 may comprise an opaque portion 922 and a translucent portion 924. The translucent portion 924 may be made from a transparent or translucent (e.g., diffuse) material, and may be configured to the conduct the light emitted by the LEDs 948 and emit the light around a perimeter of the collar 920. The opaque portion 922 may be made from an opaque material, and may be configured to prevent the light emitted by the LEDs 948 from passing through the opaque portion 922. For example, the opaque portion 922 may be configured to direct the light from the LEDs 948 through the translucent portion 924 and towards the front surface 908 of the faceplate 904.

The collar 920 may be configured to attach to the mounting member 960. For example, the collar 920 may be configured to attach to the mounting member 960 via the ratcheting surfaces 964 of the compliant members 962 such that the collar 920 surrounds the shaft 954 of the potentiometer 952. The translucent portion 924 may be substantially flush with the faceplate 904 when the collar 920 is attached to the mounting member 960. The translucent portion 924 may include one or more tabs 926 that are at opposite sides of the translucent portion 924 (e.g., two tabs as shown in FIG. 36). The collar 920 may be attached to the mounting member 960 via engagement of the two tabs 926 with respective ratcheting surfaces 964 of the compliant members 962. For example, each of the tabs 926 may be configured to abut a respective one of the compliant members 962 such that the tabs 926 engage with (e.g., are located between) adjacent teeth of the plurality of teeth 965. As the collar 920 is pressed toward the faceplate 904, the tabs 926 move into engagement with successive teeth of the plurality of teeth 965, for example, until the translucent portion 924 abuts the front surface 908 of the faceplate 904. The ratcheting function of the two tabs 926 with respective ratcheting surfaces 964 of the compliant members 962 may ensure that the translucent portion 924 abuts the front surface 908 of the faceplate 904, for example, even when the collar 920 is installed over faceplates of different depths.

The control device 900 may comprise a communication circuit, such as a wireless communication circuit (e.g., the communication circuit 1022 shown in FIGS. 37 and 38A-38E). The wireless communication circuit may include for example, a radio-frequency (RF) transceiver coupled to an antenna for transmitting and/or receiving RF signals. The wireless communication circuit may also include an RF transmitter for transmitting RF signals, an RF receiver for receiving RF signals, and/or an infrared (IR) transmitter and/or receiver for transmitting and/or receiving IR signals. The wireless communication circuit may be configured to transmit a control signal that includes the control data (e.g., a digital message) generated by the control circuit to the lighting load. The wireless communication circuit may be configured to receive a message (e.g., digital message) from one or more remote control devices of the load control system (e.g., the retrofit remote control device 112 shown in FIG. 1, the wall-mounted remote control device 114 shown in FIG. 1, the tabletop remote control device 116 shown in FIG. 1, the handheld remote control device 118 shown in FIG. 1, a smart phone, a tablet, a computer, and/or the like). The message may include a command to adjust the present intensity level $L_{PRES}$ of the lighting load controlled by the control device 900 from an initial intensity level $L_{INIT}$ of the lighting load to a commanded intensity level $L_{CMD}$ indicated by the message. For example, the antenna may be located on the printed circuit board 950, located on an additional printed circuit board that is mounted perpendicularly to and electrically coupled to the printed circuit board 950, and/or located on an additional printed circuit board that is magnetically and/or capacitively coupled to the printed circuit board 950.

In response to receiving a message from a remote device, the control device 900 may control the lighting load to the commanded intensity level $L_{CMD}$ indicated by the command in the message (e.g., a remote control command). For example, the control circuit of the control device 900 may be configured to adjust the position (e.g., the angular position) of the rotary knob 910 along the circumference of the rotary knob 910 in response to the commanded intensity level $L_{CMD}$ indicated by the command in the message. The position of the rotary knob 910 along the circumference of the rotary knob 910 may indicate the commanded intensity level $L_{CMD}$ of the lighting load (e.g., via local and remote control). The present intensity level $L_{PRES}$ of the lighting load may be synchronized with the position of the rotary knob 910 along the circumference of the rotary knob 910 in response to both local and remote control.

The control device 900 may comprise an actuator adjustment system 970 for allowing the control circuit of the control device 900 to adjust the position of the rotary knob 910 along the circumference of the rotary knob 910. The actuator adjustment system 970 may comprise a motor 980 and a gear assembly 990 including a first gear 992 (e.g., a circular gear) and a second gear 994 (e.g., a circular gear). The gear assembly 990 may be operably coupled to the rotary knob 910 (e.g., via the potentiometer 952). The motor 980 may comprise a drive shaft 982, which the motor 980 may be configured to rotate. The gear assembly 990 may be configured to couple (e.g., mechanically couple) the drive shaft 982 of the motor 980 to the shaft 954 of the potentiometer 952. The motor 980 may be housed within the enclosure 930 and the drive shaft 982 of the motor 980 is configured to extend through an opening 959 in the printed circuit board 950. The drive shaft 982 of the motor 980 may be coupled to the second gear 994 for rotating the second gear 994. The first gear 992 may be coupled to the shaft 954 of the potentiometer 952. The first gear 992 may comprise a number of teeth (not shown) arranged around the circumference of the first gear 992 (e.g., such as the teeth 642 of the first gear 640 of the actuator adjustment system 600). The second gear 994 may comprise a number of teeth (not shown) arranged around the circumference of the second gear 994 (e.g., similar to the teeth 632 of the second gear 630 of the actuator adjustment system 900). The teeth of the second gear 994 may be engaged with the teeth of the first gear 992, such that rotation of the drive shaft 982 of the motor 980 may result in rotation of the drive shaft 954 of the potentiometer 952. The rotary knob 910 may rotate clockwise when the motor 980 rotates in a first angular direction. The rotary knob 910 may rotate counterclockwise when the motor 980 rotates in a second angular direction.

The control circuit of the control device 900 may be configured to control the second actuator adjustment system to adjust the position of the rotary knob 910 to indicate the present intensity level $L_{PRES}$ of the lighting load. In addition, the control circuit of the control device 700 may also be configured to control the position of the rotary knob 910 to indicate other status information of the control device 900 and/or the lighting load (e.g., other than the present intensity level $L_{PRES}$ of the lighting load). For example, the control circuit may be configured to control the position of the rotary knob 910 through a controlled movement (e.g., an animated movement) to indicate an operating mode of the control device 900. The control circuit may be configured to, for example, periodically control (e.g., cycle) the position of the rotary knob 910 in a first rotational direction and the in a second rotational direction to indicate when the control device 900 is in an association mode for associating the control device 900 with one or more remote control devices (e.g., during the association procedure). In addition, the control circuit may be configured to control the position of the rotary knob 910 to a plurality of discrete positions (e.g., four position) in a stepwise (e.g., staccato) manner to indicate that the control device 900 is changing to a different control mode, such as a fan-speed control mode. For example, the control circuit may be configured to control the position of the rotary knob 910 to the plurality of discrete positions in the stepwise manner by controlling the position of the rotary knob 910 to a first position (e.g., approximately 20% around a circle defined by the rotary knob 910) and then waiting for a wait period (e.g., approximately one second), controlling the position of the rotary knob 910 to a second position (e.g., approximately 40% around the circle defined by the rotary knob 910) and then waiting for the wait period, controlling the position of the rotary knob 910 to a third position (e.g., approximately 60% around the circle defined by the rotary knob 910) and then waiting for the wait period, and controlling the position of the rotary knob 910 to a fourth position (e.g., approximately 80% around the circle defined by the rotary knob 910).

When adjusting the position of the rotary knob 910, the control circuit of the control device 900 may be configured to stop driving the motor 980 of the actuator adjustment system 970 to cease adjusting the position of the rotary knob 910 in response to determining that the user is presently actuating the rotary knob 910 to rotate the rotary knob 910. For example, the control circuit may determine that a user is actuating the rotary knob 910 while the control circuit is driving the motor 980 when the shaft 954 of the potentiometer 952 is not at an expected position, and/or when the motor drive voltage for driving the motor 980 indicates unexpected conditions.

In addition, the control circuit of the control device 900 may be configured to control the actuator adjustment system 970 to provide feedback to a user when the user is manually adjusting the position of the rotary knob 910. For example, the control circuit may be configured to control the actuator adjustment system 970 to provide detents (e.g., points of higher resistance) in the rotation of the rotary knob 910 around the circle defined by the rotary knob 910. When a user is rotating the rotary knob 910, the control circuit may be configured to provide one of the detents by controlling the motor 980 to cause the drive shaft 982 to rotate in a direction that causes shaft 954 of the potentiometer 952 to move in a direction that is opposite to which the user is moving the rotary knob 910 for a predetermined (e.g., short) period of time. Control of the actuator adjustment system 970 to provide the detent may not hinder rotation of the rotary knob 910 by the user, but may provide a slight bump in the rotation of the rotary knob 910 to signal the detent to the user. For example, the control circuit may be configured to control the motor 980 to provide the detents at one or more positions around the circle defined by the rotary knob 910 (e.g., to indicate intensity levels, such as 25%, 50%, and/or 75%). In addition, the control circuit may be configured to control the actuator adjustment system 970 to generate a vibration of the rotary knob 910 at one or more positions around the circle defined by the rotary knob 910. When a user is rotating the rotary knob 910, the control circuit may be configured to generate the vibration of the rotary knob 910 by increasing a frequency of the motor drive voltage that drives the motor 980. For example, the control circuit may be configured to control the motor 980 to generate the vibration at one or more positions around the circle defined by the rotary knob 910 to indicate a preset intensity level (e.g., a favorite or stored present intensity level).

FIG. 37 is a simplified block diagram of an example control device 1000 (e.g., a dimmer switch) that may be deployed as, for example, the any of the control devices shown in FIGS. 1-36. The control device 1000 may include a hot terminal H adapted to be coupled to a hot side of an AC power source 1002 and a neutral terminal N adapted to be coupled to a neutral side of the AC power source 1002. The hot terminal H and the neutral terminal N may be configured to receive an AC mains line voltage $V_A C$ from the AC power source 1002. The control device 1000 may also include a dimmed hot terminal DH that may be adapted to be coupled to an electrical load, such as a lighting load 1004, which may also be coupled to the neutral side of the AC power source 1002.

The control device 1000 may include a controllably conductive device 1010 coupled in series electrical connection between the hot terminal H and the dimmed hot terminal DH, such that the controllably conductive device 1010 is adapted to be coupled in series electrical connection between the AC power source 1002 and the lighting load 1004. The controllably conductive device 1010 may control the amount of power delivered to the lighting load. The controllably conductive device 1010 may include a suitable type of bidirectional semiconductor switch, such as, for example, a triac, a field-effect transistor (FET) in a rectifier bridge, two FETs in anti-series connection, or one or more insulated-gate bipolar junction transistors (IGBTs). The control device 1000 may also comprise an air-gap switch 1029 that may be coupled in series with the controllably conductive device 1010. The air-gap switch 1029 may be opened and closed in response to actuations of an air-gap actuator (e.g., the air-gap switch 219). When the air-gap switch 1029 is closed, the controllably conductive device 1010 may be operable to conduct a load current through the lighting load 1004. When the air-gap switch 1029 is open, the lighting load 1004 may be disconnected from the AC power source 1002.

The control device 1000 may include a control circuit 1014. The control circuit 1014 may include one or more of a processor (e.g., a microprocessor), a microcontroller, a programmable logic device (PLD), a field programmable gate array (FPGA), an application specific integrated circuit (ASIC), or any suitable controller or processing device. The control circuit 1014 may be operatively coupled to a control input of the controllably conductive device 1010, for example, via a gate drive circuit 1012. The control circuit 1014 may be configured to render the controllably conductive device 1010 conductive or non-conductive, for example, to control the amount of power delivered to the lighting load 1004. The control device 1000 may comprise a zero-crossing detector 1016, which may be coupled between the hot terminal H and the neutral terminal N. The control circuit 1014 may receive a control signal representative of the zero-crossing points of the AC mains line voltage $V_{AC}$ of the AC power source 1002 from the zero-crossing detector 1016. In some examples, the control device 1000 may not comprise a neutral terminal N and the zero-crossing detector 1016 may be coupled in parallel with the controllably conductive device 1010. The control circuit 1014 may be configured to render the controllably conductive device 1010 conductive and/or non-conductive at predetermined times relative to the zero-crossing points of the AC mains line voltage $V_{AC}$ using a phase-control dimming technique. The control circuit 1014 may be configured to control the magnitude of the load current conducted through the lighting load 1004 so as to control a present intensity level $L_{PRES}$ of the lighting load 1004 across a dimming range between a low-end intensity level $L_{LE}$ and a high-end intensity level $L_{HE}$. For example, the control circuit 1014 may be configured to control the present intensity level $L_{PRES}$ of the lighting load 504 to a number $N_{INT}$ (e.g., 255) of intensity levels between the low-end intensity level $L_{LE}$ and the high-end intensity level $L_{HE}$.

The control device 1000 may include a memory 1018. The memory 1018 may be communicatively coupled to the control circuit 1014 for the storage and/or retrieval of, for example, operational settings, such as, lighting presets and associated preset light intensities. The memory 1018 may be implemented as an external integrated circuit (IC) or as an internal circuit of the control circuit 1014. The memory 1018 may comprise computer-executable instructions or machine-readable instructions that include one or more portions of the procedures described herein. The control circuit 1014 may access the instructions from memory 1018 for being executed to cause the control circuit 1014 to operate as described herein, or to operate one or more other devices as described herein. The memory 1018 may comprise computer-executable instructions for executing configuration software. The computer-executable instructions may be executed to perform the procedures 1100, 1200, and/or 1300, as described herein. Further, the memory 1018 may have stored thereon one or more settings and/or control parameters associated with the control device 1000.

The control device 1000 may include a power supply 1020, which may be coupled between the hot terminal H and the neutral terminal N. The power supply 1020 may generate a direct-current (DC) supply voltage $V_{CC}$ for powering the control circuit 1014 and the other low-voltage circuitry of the control device 1000. In some examples, the control device 1000 may not comprise the neutral terminal N and the power supply 1020 may be coupled in parallel with the controllably conductive device 1010, such that the power supply 1020 may conduct a charging current through the lighting load 1004 to generate the DC supply voltage $V_{CC}$.

The control device 1000 may comprise a user interface circuit 1030. The control circuit 1014 may be responsive to local control of the lighting load, such as user inputs received from actuators of the control device 1000. The actuators of the control device 1000 may comprise an actuation member (e.g., the actuation member 210, 310, 510, 710, 810) and and/or a rotary knob (e.g., the rotary knob 910) that may be actuated to turn the lighting load 1004 on and off. The user interface circuit 1030 may comprise one or more switches (e.g., the tactile switches 354, 355 and/or the switches 550, 850) that may be actuated in response to actuations of the actuators. The control circuit 1014 may be configured to control the controllably conductive device 1010 to turn the lighting load 1004 on and off in response to actuations of the switches of the user interface circuit 1030. In addition, the actuators of the control device 100 may comprise an analog intensity adjustment actuator (e.g., the slider actuators 220, 320, 720) and/or a rotary knob (e.g., the rotary knob 910). The user interface circuit 1030 may comprise a potentiometer (e.g., the potentiometers 356, 952). The control circuit 1014 may control the controllably conductive device 1010 to adjust the present intensity level $L_{PRES}$ of the lighting load 1004 in response to actuations of the potentiometer of the user interface circuit 1030. For example, the control circuit 1014 may determine a commanded intensity level $L_{CMD}$ based on actuations of the potentiometer of the user interface circuit 1030.

The control device 1000 may comprise a communication circuit 1022 configured to communication (e.g., transmit and receive) message (e.g., digital message). For example, the control circuit 1014 may be configured to receive a message via the communication circuit 102 to provide for remote control of the lighting load 1004. The communication circuit 1022 may include a wired communication circuit and/or a wireless communication circuit, such as, for example, a radio-frequency (RF) transceiver coupled to an antenna for transmitting and/or receiving RF signals. For example, the communication circuit 1022 may also include an RF transmitter for transmitting RF signals, an RF receiver for receiving RF signals, or an infrared (IR) transmitter and/or receiver for transmitting and/or receiving IR signals. The communication circuit 1022 may be implemented as an external integrated circuit (IC) or as an internal circuit of the control circuit 1014. The communication circuit 1022 may be configured to transmit messages that includes control data (e.g., commands) generated by the control circuit 1014 to the lighting load 1004.

The communication circuit 1032 may be configured to receive a message (e.g., digital message) from one or more remote control devices of the load control system (e.g., the retrofit remote control device 112 shown in FIG. 1, the wall-mounted remote control device 114 shown in FIG. 1, the tabletop remote control device 116 shown in FIG. 1, the handheld remote control device 118 shown in FIG. 1, a smart phone, tablet, and/or the like), and provide the message (e.g., data from the message) to the control circuit 1014. For example, the control device 1000 may be configured to be associated with the one or more of the remote control devices during an association procedure. The message may include a command for controlling the lighting load 1004 (e.g., a command to turn the lighting load on or off, and/or a command to adjust the intensity level of the lighting load 1004). The message may comprise an indication of a commanded intensity level $L_{CMD}$ of the lighting load 1004. In response to the message, the control circuit 1014 may be configured to control the controllably conductive device 1010 to turn the lighting load 1004 on or off, and/or to adjust the present intensity level $L_{PRES}$ of the lighting load 1004.

The control device 1000 may also comprise an actuator adjustment circuit 1040 that may be configured to adjust the position of one or more of the actuators of the control device 1000. For example, the actuator adjustment circuit 1040 may be configured to provide the functionality of the actuator adjustment system 400 of the control device 300, the actuator adjustment system 600 of the control device 500, the actuator adjustment system of the control device 700, the actuator adjustment system 890 of the control device 800, and/or the actuator adjustment system 970 of the control device 900. For example, the actuator adjustment circuit 1040 may comprise a motor (e.g., the motor 410 and/or the motor 980) that may be coupled to a potentiometer of the user interface circuit 1030 (e.g., the potentiometers 356, 952) for adjusting the position of an analog intensity adjustment actuator (e.g., the slider actuators 220, 320, 720) and/or a rotary knob (e.g., the rotary knob 910). In addition, the actuator adjustment circuit 1040 may comprise a motor (e.g., the motor 610) configured to be rotated for adjusting an actuation member (e.g., the actuation member 510) between an on position and an off position. Further, the actuator adjustment circuit 1040 may comprise one or more solenoids (e.g., the solenoids 892*a*, 892*b*) that may be energized for adjusting an actuation member (e.g., the actuation member 810) between an on position and an off position. In response to receiving a message including a command to control the lighting load 1004, the control circuit 1014 may be configured to control the controllably conductive device 1010 to turn the lighting load 1004 on or off, and/or to adjust the present intensity level $L_{PRES}$ of the lighting load 1004, and also to control the actuator adjustment circuit 1040, such that the actuators of the control device 1000 match the state of the lighting load 1004.

FIG. 38A is a simplified block diagram of an example control device 1000*a* (e.g., a dimmer switch) that may be deployed as, for example, the control device 300 shown in FIGS. 1-14. The control device 1000*a* may have similar functional blocks as the control device 1000 shown in FIG. 37. However, the control device 1000*a* may comprise a user interface circuit 1030*a* having switches 1031*a*, 1032*a* and a potentiometer 1038*a*. For example, the switches 1031*a*, 1032*a* may represent the tactile switches 354, 355 of the control device 300 and the potentiometer 1038*a* may represent the potentiometer 356 of the control device 300. A control circuit 1014*a* of the control device 1000*a* may be responsive to actuations of the switches 1031*a*, 1032*a* and the potentiometer 1038*a*. The switch 1031*a* may be coupled in series with a resistor R1034*a* between the supply voltage $V_{CC}$ and circuit common for generating a first switch signal $V_{SW1}$ at the junction of the resistor 1034*a* and the switch 1031*a*. The switch 1032*a* may be coupled in series with a resistor R1036*a* between the supply voltage $V_{CC}$ and circuit common for generating a second switch signal $V_{SW2}$ at the junction of the resistor 1036*a* and the switch 1032*a*. For example, the switch 1031*a* may be actuated in response to an actuation of the upper portion 316 of the actuation member 310 and the switch 1032*a* may be actuated in response to an actuation of the lower portion 318 of the actuation member 310. The control circuit 1014*a* may receive the first and second switch signals $V_{SW1}$, $V_{SW2}$. The control circuit 1014*a* may be configured to turn on the lighting load 1004 in response to actuations of the switch 1031*a* and to turn off the lighting load 1004 in response to actuations of the switch 1032*a*.

The potentiometer 1038*a* may include a resistive element coupled between the supply voltage $V_{CC}$ and circuit common, and may be configured to generate a potentiometer signal $V_{POT}$ at a wiper of the potentiometer 1038*a*. The position of the potentiometer 1038*a* (e.g., the position of the wiper along the resistive element) may be adjusted by movement of a shaft of the potentiometer 1038*a* (e.g., the shaft 358). The shaft of the potentiometer 1038*a* may be coupled to a slider knob of a slider actuator (e.g., the slider knob 322 of the slider actuator 320). For example, the potentiometer signal $V_{POT}$ may have a direct-current (DC) magnitude that may be adjusted in response to movement of the shaft of the potentiometer 1038*a*, such that the magnitude of the potentiometer signal $V_{POT}$ indicates the position of the potentiometer 1038*a*. The control circuit 1014*a* may receive the potentiometer signal $V_{POT}$ and may be configured to control the present intensity level $L_{PRES}$ of the lighting load 1004 in response to the DC magnitude of the potentiometer signal $V_{POT}$. For example, the control circuit 1014*a* may be configured to determine commanded intensity level $L_{CMD}$ for the lighting load 1004 in response to the DC magnitude of the potentiometer signal $V_{POT}$.

The control device 1000*a* may also comprise an actuator adjustment circuit 1040*a* for adjusting a present position $P_{PRES}$ of a slider knob along a slider slot (e.g., the slider knob 322 along the slider slot 324). For example, the actuator adjustment circuit 1040*a* may be configured to provide the functionality of the actuator adjustment system 400 of the control device 300. The actuator adjustment circuit 1040*a* may comprise a motor 1042*a* (e.g., the motor 410 of the actuator adjustment system 400) and a motor drive circuit 1044*a*. The control circuit 1014*a* may be configured to generate one or more drive signals $V_{DR-A}$ for controlling the motor drive circuit 1044*a* to energize the motor 1042*a* to rotate a drive shaft of the motor 1042*a* (e.g., the drive shaft 412). For example, the motor drive circuit 1044*a* may comprise an H-bridge drive circuit, and the drive signals $V_{DR-A}$ generated by the control circuit 1014*a* may comprise pulse-width modulated signals. The control circuit 1014*a* may be configured to adjust a duty cycle of each of the drive signals $V_{DR-A}$ to adjust a rotational speed of the motor 1042*a* and adjust a phase between the drive signals $V_{DR-A}$ to control a direction of rotation of the motor 1042*a*.

The drive shaft of the motor 1042*a* may be coupled to the shaft of the potentiometer 1038*a* via a gear assembly (e.g., the gear assembly 420 of the actuator adjustment system 400). The control circuit 1014*a* may be configured to control the motor 1042*a* to adjust the position of the potentiometer 1038*a*. The control circuit 1014*a* may be configured to control the motor 1042*a* to rotate the drive shaft in a first rotational direction to cause the magnitude of the potentiometer signal $V_{POT}$ to increase and in a second rotation direction to cause the magnitude of the potentiometer signal $V_{POT}$ to decrease. For example, the control circuit 1014*a* may be configured to control the motor 1042*a* (e.g., the motor 410) to adjust the present position $P_{PRES}$ of a slider knob along a slider slot. The control circuit 1014*a* may be configured to control the motor 1042*a* (e.g., the motor 410) to rotate the drive shaft of the motor 1042*a* in a first rotational direction to raise the slider knob 322 in the slider slot 324 and in a second rotation direction to lower the slider knob 322 in the slider slot 324.

In response to receiving a message including a command to control the lighting load 1004, the control circuit 1014*a* may be configured to control the controllably conductive device 1010 to control the lighting load 1004 and control the actuator adjustment circuit 1040*a* to adjust the present position $P_{PRES}$ of the slider knob along the slider slot, such that the present position $P_{PRES}$ of the slider knob matches the present intensity level $L_{PRES}$ of the lighting load. The control circuit 1014*a* may be configured to determine a destination position $P_{DEST}$ from the command included in the received message (e.g., from the commanded intensity level $L_{CMD}$). For example, the destination position $P_{DEST}$ along the slider slot may be equal to the commanded intensity level $L_{CMD}$. The control circuit 1014*a* may be configured to control the present position $P_{PRES}$ of the slider knob as the slider knob moves from an initial position $P_{INIT}$ to the destination position $P_{DEST}$ according to a movement profile. For example, the control circuit 1014*a* may increase the rotational speed of the motor 1042*a* for a ramp-up period at the beginning of the movement, decrease the rotational speed of the motor 1042*a* for a ramp-down period as the end of the movement, and maintain the rotational speed of the motor 1042*a* substantially constant between the ramp-up period and the ramp-down period. When the difference between the destination position $P_{DEST}$ and the present position $P_{PRES}$ of the slider knob is less than an adjustment threshold $P_{TH}$, the control circuit 1014*a* may be configured to maintain the present position $P_{PRES}$ of the slider knob rather adjusting the present position $P_{PRES}$ by a small amount to the destination position $P_{DEST}$.

When controlling the motor 1042*a*, the control circuit 1014*a* may be configured to use the magnitude of the potentiometer signal $V_{POT}$ as feedback of the present position $P_{PRES}$ of the slider knob along the slider slot. The control circuit 1014*a* may be configured to control the motor 1042*a* (e.g., adjust the drive signals $V_{DR-A}$) using closed-loop control based on the destination position $P_{DEST}$ and the magnitude of the potentiometer signal $V_{POT}$. For example, the control circuit 1014*a* may use a digital proportional-integral (PI) controller for adjusting the duty cycle of the drive signals $V_{DR-A}$ in response to the destination position $P_{DEST}$ and the magnitude of the potentiometer signal $V_{POT}$.

The control circuit 1014*a* may be configured to control the present intensity level $L_{PRES}$ of the lighting load 1004 independently from the present position $P_{PRES}$ of the slider knob along the slider slot in response to receiving a message including a command to control the lighting load 1004. For example, the control circuit 1014*a* may be configured to control (e.g., quickly control) the lighting load 1004 before controlling the present position $P_{PRES}$ of the slider knob along the slider slot. The control circuit 1014*a* may be configured to control the present intensity level $L_{PRES}$ of the lighting load 1004 at a faster rate than controlling the present position $P_{PRES}$ of the slider knob along the slider slot. For example, the control circuit 1014*a* may adjust the lighting load 1004 from the present intensity level $L_{PRES}$ to the commanded intensity level $L_{CMD}$ at a first rate and may adjust the position of the slider knob at a second rate.

In addition, the control circuit 1014*a* may be configured to wait for a timeout period after receiving the last remote control command before beginning to adjust the present position $P_{PRES}$ of the slider knob along the slider slot. For example, the control circuit 1014*a* may be configured to control (e.g., immediately control) the controllably conductive device 1010 to control the lighting load 1004 upon receiving a command to control the lighting load 1004, but wait for the timeout period (e.g., without receiving another command to control the lighting load 1004) before controlling the actuator adjustment circuit 1040*a* to adjust the present position $P_{PRES}$ of the slider knob along the slider slot. The timeout period may prevent unwanted energizations of the motor when a user may remotely adjust the present intensity level $L_{PRES}$ of the lighting load 1004 multiple times within a short period of time.

In addition, the control circuit 1014*a* may be configured to adjust the present position $P_{PRES}$ of the slider knob to indicate status information of the control device 1000*a* and/or the lighting load 1004 (e.g., other than indicating the present intensity level $L_{PRES}$). For example, the control circuit 1014*a* may be configured to control the present position $P_{PRES}$ of the slider knob through a controlled movement (e.g., an animated movement) to indicate an operating mode of the control device 1000*a*. The control circuit 1014*a* may be configured to, for example, periodically control (e.g., cycle) the position of the slider knob up and down across the length of the slider slot to indicate when the control device 1000*a* is in an association mode for associating the control device 1000*a* with one or more remote control devices (e.g., during the association procedure). In addition, the control circuit 1014*a* may be configured to control the position of the slider knob to a plurality of discrete positions (e.g., four position) in a stepwise (e.g., staccato) manner to indicate that the control device 1000*a* is changing to a different control mode, such as a fan-speed control mode. For example, the control circuit 1014*a* may be configured to control the position of the slider knob to the plurality of discrete positions in the stepwise manner by controlling the position of the slider knob to a first position (e.g., approximately 20% along the length of the slider slot)

and then waiting for a wait period (e.g., approximately one second), controlling the position of the slider knob to a second position (e.g., approximately 40% along the length of the slider slot) and then waiting for the wait period, controlling the position of the slider knob to a third position (e.g., approximately 60% along the length of the slider slot) and then waiting for the wait period, and controlling the position of the slider knob to a fourth position (e.g., approximately 80% along the length of the slider slot).

When adjusting the present position $P_{PRES}$ of the slider knob along the slider slot, the control circuit 1014*a* may be configured to stop driving the motor 1042*a* of the actuator adjustment circuit 1040*a* to cease adjusting the present position $P_{PRES}$ of the slider knob in response to determining that the user is presently actuating the slider knob to move the slider knob along the slider slot. For example, the control circuit 1014*a* may be configured to determine that a user is actuating the slider knob while the control circuit 1014*a* is driving the motor 1042*a* if the present position $P_{PRES}$ of the slider knob (e.g., as indicated by the magnitude of the potentiometer signal $V_{POT}$) is not close to an expected position $P_{EXP}$. The control circuit 1014*a* may be configured to also track the expected position $P_{EXP}$ of the slider knob based on the movement profile for moving the slider knob along the slider slot. The control circuit 1014*a* may be configured to determine that the user is actuating the slider knob while the control circuit 1014*a* is driving the motor 1042*a* if the present position $P_{PRES}$ of the slider knob is greater than a threshold amount away from the predicted position $P_{EXP}$. In addition, the control circuit 1014*a* may be configured to determine that the user is actuating the slider knob while the control circuit 1014*a* is driving the motor 1042*a* if the duty cycle of any of the drive signals $V_{DR-A}$ for driving the motor 1042*a* is high (e.g., greater than a high-duty-cycle threshold) and the present position $P_{PRES}$ of the slider knob does not reach the destination position $P_{DEST}$ (e.g., is not equal to the destination position $P_{DEST}$) after the expiration of a user-actuation-detection time period from the beginning of the movement.

In addition, the control circuit 1014*a* may be configured to adjust the present position $P_{PRES}$ of the slider knob to provide feedback to a user when the user is manually adjusting the present position $P_{PRES}$ of the slider knob along the slider slot. For example, the control circuit 1014*a* may be configured to adjust the present position $P_{PRES}$ of the slider knob to provide detents (e.g., points of higher resistance) in the movement of the slider knob along the slider slot. When a user is sliding the slider knob along the slider slot, the control circuit 1014*a* may be configured to provide one of the detents by controlling the motor 1042*a* to cause the drive shaft of the motor 1042*a* to rotate in a direction that opposes the movement of the slider knob for a predetermined (e.g., short) period of time. Control of the motor 1042*a* of the actuator adjustment circuit 1040*a* to provide the detent may not hinder movement of the slider knob by the user, but may provide a slight bump in the movement of the slider knob to signal the detent to the user. For example, the control circuit 1014*a* may be configured to control the motor 1042*a* to provide the detents at one or more positions along the length of the slider slot (e.g., to indicate intensity levels, such as 25%, 50%, and/or 75%). In addition, the control circuit 1042*a* may be configured to control the motor 1042*a* to generate a vibration of the slider knob at one or more positions along the slider slot. When a user is sliding the slider knob along the slider slot, the control circuit 1014*a* may be configured to generate the vibration of the slider knob by increasing a frequency of one or more of the drive signals $V_{DR-A}$ for driving the motor 1042*a*. For example, the control circuit 1014*a* may be configured to control the motor 1042*a* to generate the vibration at one or more positions along the length of the slider slot to indicate a preset intensity level (e.g., a favorite or stored present intensity level).

FIG. 38B is a simplified block diagram of an example control device 1000*b* (e.g., an electronic switch) that may be deployed as, for example, the control device 500 shown in FIGS. 15-25E. The control device 1000*b* may have similar functional blocks as the control device 1000 shown in FIG. 37. However, the control device 1000*b* may comprise a user interface circuit 1030*b* having a switch 1032*b*, which may represent the switch 550 of the control device 500. For example, the switch 1032*b* may comprise a single-pole double-throw (SPDT) switch as shown in FIG. 38B. The switch 1032*b* may comprise a common terminal coupled to circuit common. The switch 1032*b* may comprise a first switched terminal A coupled to the supply voltage $V_{CC}$ via a first resistor R1034*b* for generating a first switch signal $V_{SW1}$ at the first switched terminal A. The switch 1032*b* may also comprise a second switched terminal B coupled to the supply voltage $V_{CC}$ via a second resistor R1036*b* for generating a second switch signal $V_{SW2}$ at the second switched terminal B. For example, the electrical contact of the switch 1032*b* may be changed to the first switched terminal A in response to an actuation of the upper portion 516 of the actuation member 510 and the electrical contact of the switch 1032*b* may be changed to the second switched terminal B in response to an actuation of the lower portion 518 of the actuation member 510. A control circuit 1014*b* of the control device 1000*b* may be responsive to actuations of the switch 1032*b* and may receive the first and second switch signal $V_{SW1}$, $V_{SW2}$. The control circuit 1014*b* may be configured to turn on the lighting load 1004 when the electrical contact of the switch 1032*b* is connected to the first switched terminal A and to turn off the lighting load 1004 when the electrical contact of the switch 1032*b* is connected to the second switched terminal B.

The control device 1000*b* may also comprise an actuator adjustment circuit 1040*b* for adjusting an actuation member (e.g., the actuation member 510 of the control device 500) between an on position and an off position. For example, the actuator adjustment circuit 1040*b* may be configured to provide the functionality of the actuator adjustment system 600 of the control device 500. The actuation member may be held in the on position and the off position by an over-center spring mechanism (e.g., the over-center spring mechanism 570). The actuator adjustment circuit 1040*b* may comprise a motor 1042*b* (e.g., the motor 610 of the actuator adjustment system 600) and a motor drive circuit 1044*b*. The control circuit 1014*b* may be configured to generate one or more drive signals $V_{DR-B}$ for controlling the motor drive circuit 1044*b* to energize the motor 1042*b* to adjust a pivot axis of the over-center spring mechanism of the control device 1000*b*. For example, the motor drive circuit 1044*b* may comprise an H-bridge drive circuit, and the drive signals $V_{DR-B}$ generated by the control circuit 1014*b* may comprise pulse-width modulated signals. The control circuit 1014*b* may be configured to adjust a duty cycle of each of the drive signals $V_{DR-B}$ to adjust a rotational speed of the motor 1042*b* and adjust a phase between the drive signals $V_{DR-B}$ to control a direction of rotation of the motor 1042*b*. The control circuit 1014*b* may be configured to rotate the pivot axis of the over-center spring mechanism in a first rotational direction for a full rotation (e.g., approximately 360 degrees) to change the actuation member from the off position to the on position, and rotate the pivot axis of the over-center spring mechanism in a second rotational direction for a full rotation (e.g., approximately 360 degrees) to change the actuation member from the on position to the off position.

In response to receiving a message including a command to control the lighting load 1004, the control circuit 1014*b* may be configured to control the controllably conductive device 1010 to control the lighting load 1004 and control the actuator adjustment circuit 1040*b* to adjust the position of the actuation member between the on position and the off position, such that the position of the actuation member matches the state of the lighting load 1004. The control circuit 1014*b* may be configured to turn the lighting load 1004 on and off independently from the controlling the position of the actuation member in response to receiving a message including a command to control the lighting load 1004. For example, the control circuit 1014*b* may be configured to control (e.g., quickly control) the lighting load 1004 before controlling the position of the actuation member. The control circuit 1014*b* may be configured to wait for a timeout period after receiving the last remote control command before beginning to adjust the position of the actuation member. For example, the control circuit 1014*b* may be configured to control (e.g., immediately control) the controllably conductive device 1010 to control the lighting load 1004 upon receiving a command to control the lighting load 1004, but wait for the timeout period (e.g., without receiving another command to control the lighting load 1004) before controlling the actuator adjustment circuit 1040*b* to adjust the position of the actuation member. The timeout period may prevent unwanted energizations of the motor 1042*b* when a user may remotely turn the lighting load 1004 on and off multiple times within a short period of time.

FIG. 38C is a simplified block diagram of an example control device 1000*c* (e.g., a dimmer switch) that may be deployed as, for example, the control device 700 shown in FIG. 26. The control device 1000*c* may have similar functional blocks as the control device 1000 shown in FIG. 37. However, the control device 1000*c* may comprise a user interface circuit 1030*c* having a switch 1032*c* and a potentiometer 1038*c*. For example, the switch 1032*c* may represent a switch similar to the switch 550 of the control device 500, and the potentiometer 1038*c* may represent a potentiometer similar to the potentiometer 356 of the control device 300. A control circuit 1014*c* of the control device 1000*c* may be responsive to actuations of the switch 1032*c* and the potentiometer 1038*c*.

As shown in FIG. 38C, the switch 1032*c* may comprise a single-pole double-throw (SPDT) switch. The switch 1032*c* may comprise a common terminal coupled to circuit common. The switch 1032*c* may comprise a first switched terminal A coupled to the supply voltage $V_{CC}$ via a first resistor R1034*c* for generating a first switch signal $V_{SW1}$ at the first switched terminal A. The switch 1032*c* may also comprise a second switched terminal B coupled to the supply voltage $V_{CC}$ via a second resistor R1036*c* for generating a second switch signal $V_{SW2}$ at the second switched terminal B. For example, the electrical contact of the switch 1032*c* may be changed to the first switched terminal A in response to an actuation of the upper portion 716 of the actuation member 710 and the electrical contact of the switch 1032*c* may be changed to the second switched terminal B in response to an actuation of the lower portion 718 of the actuation member 710. The control circuit 1014*c* of the control device 1000*c* may receive the first and second switch signal $V_{SW1}$, $V_{SW2}$. The control circuit 1014*c* may be configured to turn on the lighting load 1004 when the electrical contact of the switch 1032*c* is connected to the first switched terminal A and to turn off the lighting load 1004 when the electrical contact of the switch 1032*c* is connected to the second switched terminal B.

The potentiometer 1038*c* may include a resistive element coupled between the supply voltage $V_{CC}$ and circuit common, and may be configured to generate a potentiometer signal $V_{POT}$ at a wiper of the potentiometer 1038*c*. The position of the potentiometer 1038*c* (e.g., the position of the wiper along the resistive element) may be adjusted by movement of a shaft of the potentiometer 1038*c* (e.g., such as the shaft 358). The shaft of the potentiometer 1038*c* may be coupled to a slider knob of a slider actuator (e.g., the slider knob 722 of the slider actuator 720). For example, the potentiometer signal $V_{POT}$ may have a direct-current (DC) magnitude that may be adjusted in response to movement of the shaft of the potentiometer 1038*c*, such that the magnitude of the potentiometer signal $V_{POT}$ indicates the position of the potentiometer 1038*c*. The control circuit 1014*c* may receive the potentiometer signal $V_{POT}$ and may be configured to control the present intensity level $L_{PRES}$ of the lighting load 1004 in response to the DC magnitude of the potentiometer signal $V_{POT}$. For example, the control circuit 1014*c* may be configured to determine commanded intensity level $L_{CMD}$ for the lighting load 1004 in response to the DC magnitude of the potentiometer signal $V_{POT}$.

The control device 1000*c* may comprise a first actuator adjustment circuit 1040*c* for adjusting an actuation member (e.g., the actuation member 710 of the control device 700) between an on position and an off position. The first actuator adjustment circuit 1040*c* may be configured to provide the functionality of, for example, the actuator adjustment system 600. The actuation member may be held in the on position and the off position by an over-center spring mechanism (e.g., such as the over-center spring mechanism 570). For example, the first actuator adjustment circuit 1040*c* may be the same as the actuator adjustment circuit 1040*b* of the control device 1000*b*. The first actuator adjustment circuit 1040*c* may comprise a motor (e.g., the motor 1042*b* shown in FIG. 38B) and a motor drive circuit (e.g., the motor drive circuit 1044*b* shown in FIG. 38B). The control circuit 1014*c* may be configured to generate one or more drive signals $V_{DR-C1}$ for controlling the motor drive circuit to energize the motor to adjust a pivot axis of the over-center spring mechanism of the control device 1000*c*. For example, the motor drive circuit of the first actuator adjustment circuit 1040*c* may comprise an H-bridge drive circuit, and the drive signals $V_{DR-C1}$ generated by the control circuit 1014*c* may comprise pulse-width modulated signals. The control circuit 1014*c* may be configured to adjust a duty cycle of each of the drive signals $V_{DR-C1}$ to adjust a rotational speed of the motor and adjust a phase between the drive signals $V_{DR-C1-DR}$ to control a direction of rotation of the motor. The control circuit 1014*c* may be configured to rotate the pivot axis of the over-center spring mechanism in a first rotational direction for a full rotation (e.g., approximately 360 degrees) to change the actuation member from the off position to the on position, and rotate the pivot axis of the over-center spring mechanism in a second rotational direction for a full rotation (e.g., approximately 360 degrees) to change the actuation member from the on position to the off position.

The control device 1000*c* may also comprise a second actuator adjustment circuit 1041*c* for adjusting a present position $P_{PRES}$ of a slider knob along a slider slot (e.g., the slider knob 722 along the slider slot 724). The second actuator adjustment circuit 1041*c* may be configured to provide the functionality of, for example, the actuator adjustment system 400. For example, the second actuator adjustment circuit 1041*c* may be the same as the actuator adjustment circuit 1040*a* of the control device 1000*a*. The second actuator adjustment circuit 1041*c* may comprise a motor (e.g., the motor 1042*a* shown in FIG. 38A) and a motor drive circuit (e.g., the motor drive circuit 1044*a* shown in FIG. 38A). The control circuit 1014*c* may be configured to generate one or more drive signals $V_{DR-C2}$ for controlling the motor drive circuit to energize the motor to rotate a drive shaft of the motor. For example, the motor drive circuit of the second actuator adjustment circuit 1041*c* may comprise an H-bridge drive circuit, and the drive signals $V_{DR-C2}$ generated by the control circuit 1014*c* may comprise pulse-width modulated signals. The control circuit 1014*c* may be configured to adjust a duty cycle of each of the drive signals $V_{DR-C2}$ to adjust a rotational speed of the motor and adjust a phase between the drive signals $V_{DR-C2}$ to control a direction of rotation of the motor.

The drive shaft of the motor may be coupled to the shaft of the potentiometer 1038*c* via a gear assembly (e.g., such as the gear assembly 420 of the actuator adjustment system 400). The control circuit 1014*c* may be configured to control the motor of the second actuator adjustment circuit 1041*c* to adjust the position of the potentiometer 1038*c*. The control circuit 1014*c* may be configured to control the motor to rotate the drive shaft in a first rotational direction to cause the magnitude of the potentiometer signal $V_{POT}$ to increase and in a second rotation direction to cause the magnitude of the potentiometer signal $V_{POT}$ to decrease. For example, the control circuit 1014*c* may be configured to control the motor to adjust the present position $P_{PRES}$ of the slider knob along the slider slot. The control circuit 1014*c* may be configured to control the motor to rotate the drive shaft of the motor in a first rotational direction to raise the slider knob 722 in the slider slot 724 and in the second rotation direction to lower the slider knob 722 in the slider slot 724.

In response to receiving a message including a command to control the lighting load 1004, the control circuit 1014*c* may be configured to control the controllably conductive device 1010 to control the lighting load 1004, control the first actuator adjustment circuit 1040*c* to adjust the position of the actuation member between the on position and the off position, and/or control the second actuator adjustment circuit 1041*c* to adjust the present position $P_{PRES}$ of the slider knob along the slider slot, such that the position of the actuation member and the present position $P_{PRES}$ of the slider knob match the present state of the lighting load.

The control circuit 1014*c* may be configured to determine a destination position $P_{DEST}$ from the command included in the received message (e.g., from the commanded intensity level $L_{CMD}$). For example, the destination position $P_{DEST}$ along the slider slot may be equal to the commanded intensity level $L_{CMD}$. The control circuit 1014*c* may be configured to control the present position $P_{PRES}$ of the slider knob as the slider knob moves from an initial position $P_{INIT}$ to the destination position $P_{DEST}$ according to a movement profile. For example, the control circuit 1014*c* may ramp up the drive of the motor for a period of time at the beginning of the movement, drive the motor at a substantially constant rotational speed, and ramp down the drive of the motor as the end of the movement. When the difference between the destination position $P_{DEST}$ and the present position $P_{PRES}$ of the slider knob is less than an adjustment threshold $P_{TH}$, the control circuit 1014*c* may be configured to maintain the present position $P_{PRES}$ of the slider knob rather adjusting the present position $P_{PRES}$ by a small amount to the destination position $P_{DEST}$.

When controlling the motor, the control circuit 1014*c* may be configured to use the magnitude of the potentiometer signal $V_{POT}$ as feedback of the present position $P_{PRES}$ of the slider knob along the slider slot. The control circuit 1014*c* may be configured to control the motor (e.g., adjust the drive signals $V_{DR-C2}$) using closed-loop control based on the destination position $P_{DEST}$ and the magnitude of the potentiometer signal $V_{POT}$. For example, the control circuit 1014*c* may use a digital proportional-integral (PI) controller for adjusting the duty cycle of the drive signals $V_{DR-C2}$ in response to the destination position $P_{DEST}$ and the magnitude of the potentiometer signal $V_{POT}$.

In response to receiving a message including a command to control the lighting load 1004, the control circuit 1014*c* may be configured to control the lighting load 1004 independently from adjusting the position of the actuation member and/or the present position $P_{PRES}$ of the slider knob along the slider slot. For example, the control circuit 1014*c* may be configured to control (e.g., quickly control) the lighting load 1004 before adjusting the position of the actuation member and/or present position $P_{PRES}$ of the slider knob along the slider slot. The control circuit 1014*c* may be configured to control the present intensity level $L_{PRES}$ of the lighting load 1004 at a faster rate than controlling the present position $P_{PRES}$ of the slider knob along the slider slot.

In addition, the control circuit 1014*c* may be configured to wait for a timeout period after receiving the last remote control command before beginning to adjust the position of the actuation member and/or the present position $P_{PRES}$ of the slider knob along the slider slot. For example, the control circuit 1014*c* may be configured to control (e.g., immediately control) the controllably conductive device 1010 to control the lighting load 1004 upon receiving a command to control the lighting load 1004, but wait for the timeout period (e.g., without receiving another command to control the lighting load 1004) before controlling the first actuation adjustment circuit 1040*c* to adjust the position of the actuation member and/or the second actuator adjustment circuit 1041*c* to adjust the present position $P_{PRES}$ of the slider knob along the slider slot. The timeout period may prevent unwanted energizations of the motors of the first actuation adjustment circuit 1040*c* and the second actuation adjustment circuit 1041*c* when a user may remotely control the lighting load 1004 multiple times within a short period of time.

In addition, the control circuit 1014*c* may be configured to adjust the present position $P_{PRES}$ of the slider knob to indicate status information of the control device 1000*c* and/or the lighting load 1004 (e.g., other than indicating the present intensity level $L_{PRES}$). For example, the control circuit 1014*c* may be configured to control the present position $P_{PRES}$ of the slider knob through a controlled movement (e.g., an animated movement) to indicate an operating mode of the control device 1000*c*. The control circuit 1014*c* may be configured to, for example, periodically control (e.g., cycle) the position of the slider knob up and down across the length of the slider slot to indicate when the control device 1000*c* is in an association mode for associating the control device 1000*c* with one or more remote control devices (e.g., during the association procedure). In addition, the control circuit 1014*c* may be configured to control the position of the slider knob to a plurality of discrete positions (e.g., four position) in a stepwise (e.g., staccato) manner to indicate that the control device 1000*c* is changing to a different control mode, such as a fan-speed control mode. For example, the control circuit 1014*c* may be configured to control the position of the slider knob to the plurality of discrete positions in the stepwise manner by controlling the position of the slider knob to a first position (e.g., approximately 20% along the length of the slider slot) and then waiting for a wait period (e.g., approximately one second), controlling the position of the slider knob to a second position (e.g., approximately 40% along the length of the slider slot) and then waiting for the wait period, controlling the position of the slider knob to a third position (e.g., approximately 60% along the length of the slider slot) and then waiting for the wait period, and controlling the position of the slider knob to a fourth position (e.g., approximately 80% along the length of the slider slot).

When adjusting the present position $P_{PRES}$ of the slider knob along the slider slot, the control circuit 1014*c* may be configured to stop driving the motor of the second actuator adjustment circuit 1041*c* to cease adjusting the present position $P_{PRES}$ of the slider knob in response to determining that the user is presently actuating the slider knob to move the slider knob along the slider slot. For example, the control circuit 1014*c* may be configured to determine that a user is actuating the slider knob while the control circuit 1014*c* is driving the motor if the present position $P_{PRES}$ of the slider knob (e.g., as indicated by the magnitude of the potentiometer signal $V_{POT}$) is not close to an expected position $P_{EXP}$. The control circuit 1014*c* may be configured to also track the expected position $P_{EXP}$ of the slider knob based on the movement profile for moving the slider knob along the slider slot. The control circuit 1014*c* may be configured to determine that the user is actuating the slider knob while the control circuit 1014*c* is driving the motor if the present position $P_{PRES}$ of the slider knob is greater than a threshold amount away from the predicted position $P_{EXP}$. In addition, the control circuit 1014*c* may be configured to determine that the user is actuating the slider knob while the control circuit 1014*c* is driving the motor if the duty cycle of any of the drive signals $V_{DR-C2}$ for driving the motor is high (e.g., greater than a high-duty-cycle threshold) and the present position $P_{PRES}$ of the slider knob does not reach the destination position $P_{DEST}$ (e.g., is not equal to the destination position $P_{DEST}$) after the expiration of a user-actuation-detection time period from the beginning of the movement.

In addition, the control circuit 1014*c* may be configured to adjust the present position $P_{PRES}$ of the slider knob to provide feedback to a user when the user is manually adjusting the present position $P_{PRES}$ of the slider knob along the slider slot. For example, the control circuit 1014*c* may be configured to adjust the present position $P_{PRES}$ of the slider knob to provide detents (e.g., points of higher resistance) in the movement of the slider knob along the slider slot. When a user is sliding the slider knob along the slider slot, the control circuit 1014*c* may be configured to provide one of the detents by controlling the motor of the second actuator adjustment circuit 1041*c* to cause the drive shaft of the motor to rotate in a direction that opposes the movement of the slider knob for a predetermined (e.g., short) period of time. Control of the motor of the second actuator adjustment circuit 1041*c* to provide the detent may not hinder movement of the slider knob by the user, but may provide a slight bump in the movement of the slider knob to signal the detent to the user. For example, the control circuit 1014*c* may be configured to control the motor to provide the detents at one or more positions along the length of the slider slot (e.g., to indicate intensity levels, such as 25%, 50%, and/or 75%). In addition, the control circuit 1042*c* may be configured to control the motor to generate a vibration of the slider knob at one or more positions along the slider slot. When a user is sliding the slider knob along the slider slot, the control circuit 1014*c* may be configured to generate the vibration of the slider knob by increasing a frequency of one or more of the drive signals $V_{DR-C2}$ for driving the motor. For example, the control circuit 1014*c* may be configured to control the motor to generate the vibration at one or more positions along the length of the slider slot to indicate a preset intensity level (e.g., a favorite or stored present intensity level).

FIG. 38D is a simplified block diagram of an example control device 1000*d* (e.g., an electronic switch) that may be deployed as, for example, the control device 800 shown in FIGS. 27-32E. The control device 1000*d* may have similar functional blocks as the control device 1000 shown in FIG. 37. However, the control device 1000*d* may comprise a user interface circuit 1030*d*, which may be the same as the user interface circuit 1030*b* of the control device 1000*b* shown in FIG. 38B. The user interface circuit 1030*d* may comprise a switch 1032*d*, which may represent the switch 850 of the control device 800. For example, the switch 1032*d* may comprise a single-pole double-throw (SPDT) switch as shown in FIG. 38D. The switch 1032*d* may comprise a common terminal coupled to circuit common. The switch 1032*d* may comprise a first switched terminal A coupled to the supply voltage $V_{CC}$ via a first resistor R1034*d* for generating a first switch signal $V_{SW1}$ at the first switched terminal A. The switch 1032*d* may also comprise a second switched terminal B coupled to the supply voltage $V_{CC}$ via a second resistor R1036*d* for generating a second switch signal $V_{SW2}$ at the second switched terminal B. For example, the electrical contact of the switch 1032*d* may be changed to the first switched terminal A in response to an actuation of the upper portion 816 of the actuation member 810 and the electrical contact of the switch 1032*d* may be changed to the second switched terminal B in response to an actuation of the lower portion 818 of the actuation member 810. A control circuit 1014*d* of the control device 1000*d* may be responsive to actuations of the switch 1032*d* and may receive the first and second switch signal $V_{SW1}$, $V_{SW2}$. The control circuit 1014*d* may be configured to turn on the lighting load 1004 when the electrical contact of the switch 1032*d* is connected to the first switched terminal A and to turn off the lighting load 1004 when the electrical contact of the switch 1032*d* is connected to the second switched terminal B.

The control device 1000*d* may also comprise an actuator adjustment circuit 1040*d* for adjusting an actuation member (e.g., the actuation member 810 of the control device 800) between an on position and an off position. The actuation member may be held in the on position and the off position by an over-center spring mechanism (e.g., the over-center spring mechanism 870). For example, the actuator adjustment circuit 1040*d* may be configured to provide the functionality of the actuator adjustment system 890 of the control device 800. The actuator adjustment circuit 1040*d* may comprise a first solenoid coil 1050*d* of a first solenoid (e.g., the first solenoid 892*a*) and a second solenoid 1060*d* of the second solenoid (e.g., the second solenoid 892*b*). The actuator adjustment circuit 1040*d* may comprise a first solenoid drive circuit 1052*d* for allowing the control circuit 1014*d* to energize the first solenoid coil 1050*d* to cause a pin (e.g., the pin 895*a*) of the first solenoid to extend. The actuator adjustment circuit 1040*d* may also comprise a second solenoid drive circuit 1062*d* for allowing the control circuit 1014*d* to energize the first solenoid coil 1060*d* to cause a pin (e.g., the pin 895*b*) of the second solenoid to extend. Each of the first and second solenoid drive circuits 1052*d*, 1062*d* may comprise a respective switching circuit having a FET 1054*d*, 1064*d* coupled in series with the first and second solenoid coils 1050*d*, 1060*d*, respectively.

The control circuit 1014*d* may be configured to generate first and second solenoid drive signals $V_{DR-D1}$, $V_{DR-D2}$ that are coupled to gates of the FETs 1054*d*, 1064*d*, respectively, for rendering the FETs 1054*d*, 1064*d* conductive and non-conductive. The control circuit 1014*d* may be configured to render the FET 1054*d* of the first solenoid drive circuit 1052*d* conductive to energize the first solenoid coil 1040*d*, and to render the FET 1064*d* of the second solenoid drive circuit 1062*d* conductive to energize the second solenoid coil 1050*d*. The actuator adjustment circuit 1040*d* may also comprise a diode D1056*d* coupled in parallel with the first solenoid coil 1050*d* for conducting current through the first solenoid coil 1050*d* when the FET 1054*d* of the first solenoid drive circuit 1052*d* is non-conductive, and a diode D1066*d* coupled in parallel with the second solenoid coil 1060*d* for conducting current through the second solenoid coil 1060*d* when the FET 1064*d* of the second solenoid drive circuit 1062*d* is non-conductive. In addition, the control circuit 1014*d* may be configured to control the first and second solenoid coils 1050*d*, 1060*d* to control the amount of force provided by the pins of the respective solenoids. For example, the control circuit 1014*d* may be configured to energize just the first solenoid coil 1050*d* to adjust the actuation member to the off position and energize just the second solenoid coil 1060*d* to adjust the actuation member to the on position.

In some examples, the control circuit 1014*d* may be configured to energize both of the first and second solenoid coils 1050*d*, 1060*d* as part of an adjustment sequence when adjusting the actuation member between the on position and the off position. For example, to adjust the actuation member between the off position to the on position as part of a first adjustment sequence (e.g., as shown in FIGS. 31A-31E, the control circuit 1014*d* may be configured to first energize the first solenoid coil 1050*d* to extend the pin of the first solenoid and then energize the second solenoid coil 1060*d* to extend the pin of the second solenoid (e.g., when the same amount of force). The control circuit 1014*d* may next control the first solenoid drive circuit 1052*d* for controlling the first solenoid coil 1050*d* to cause the pin of the first solenoid to retract by a small amount to allow the actuation member to pivot from the off position to the on position. The control circuit 1014*d* may then deenergize the first and second solenoid coils 1050*d*, 1060*d* to cause the pins of both solenoids to retract (e.g., fully retract), such that that over-center spring mechanism may hold the actuation member in the on position.

Similarly, to adjust the actuation member between the on position to the off position as part of a second adjustment sequence (e.g., as shown in FIGS. 32A-32E, the control circuit 1014*d* may be configured to first energize the second solenoid coil 1060*d* to extend the pin of the second solenoid and then energize the first solenoid coil 1050*d* to extend the pin of the first solenoid (e.g., when the same amount of force). The control circuit 1014*d* may next control the second solenoid drive circuit 1062*d* for controlling the second solenoid coil 1060*d* to cause the pin of the second solenoid to retract by a small amount to allow the actuation member to pivot from the on position to the off position. The control circuit 1014*d* may then deenergize the first and second solenoid coils 1050*d*, 1060*d* to cause the pins of both solenoids to retract (e.g., fully retract), such that that over-center spring mechanism may hold the actuation member in the off position.

In response to receiving a message including a command to control the lighting load 1004, the control circuit 1014*d* may be configured to control the controllably conductive device 1010 to control the lighting load 1004 and control the actuator adjustment circuit 1040*d* to adjust the position of the actuation member between the on position and the off position, such that the position of the actuation member matches the state of the lighting load 1004. The control circuit 1014*d* may be configured to turn the lighting load 1004 on and off independently from the controlling the position of the actuation member in response to receiving a message including a command to control the lighting load 1004. For example, the control circuit 1014*d* may be configured to control (e.g., quickly control) the lighting load 1004 before controlling the position of the actuation member. The control circuit 1014*d* may be configured to wait for a timeout period after receiving the last remote control command before beginning to adjust the position of the actuation member. For example, the control circuit 1014*b* may be configured to control (e.g., immediately control) the controllably conductive device 1010 to control the lighting load 1004 upon receiving a command to control the lighting load 1004, but wait for the timeout period (e.g., without receiving another command to control the lighting load 1004) before controlling the actuator adjustment circuit 1040*d* to adjust the position of the actuation member. The timeout period may prevent unwanted energizations of the first and second solenoid coils 1050*d*, 1060*d* when a user may remotely turn the lighting load 1004 on and off multiple times within a short period of time.

FIG. 38E is a simplified block diagram of an example control device 1000*e* (e.g., a dimmer switch) that may be deployed as, for example, the control device 900 shown in FIGS. 33-36. The control device 1000*e* may have similar functional blocks as the control device 1000 shown in FIG. 37. However, the control device 1000*e* may comprise a user interface circuit 1030*e* having a switch 1032*e* and a potentiometer 1038*a*. For example, the potentiometer 1038*e* may represent the potentiometer 952 of the control device 900. A control circuit 1014*e* of the control device may be responsive to actuations of the switches 1032*e* and the potentiometer 1038*e*. For example, the switch 1032*e* and the potentiometer 1038*e* may be included together in the same enclosure (e.g., the enclosure 956 of the potentiometer 952), and the switch 1032*e* may be actuated in response to pushes of a rotary knob of the control device (e.g., the rotary knob 910) and thus a shaft of the potentiometer 1038*e* (e.g., the shaft 954 of the potentiometer 952). The switch 1032*e* may be coupled in series with a resistor R1034*e* between the supply voltage $V_{CC}$ and circuit common for generating a switch signal $V_{SW}$ at the junction of the resistor 1034*e* and the switch 1032*e*. The control circuit 1014*e* may receive the switch signal $V_{SW}$, and may be configured to turn on the lighting load 1004 in response to actuations of the switch 1032*e* and to turn off the lighting load 1004 in response to actuations of the switch 1032*e*. For example, the switch 1032*e* may comprise a momentary tactile switch, and the control circuit 1014*e* may be configured to toggle the lighting load on and off each time that the switch 1032*e* is actuated. In addition, the switch 1032*e* may comprise a maintained switch (e.g., a SPST and/or SPDT switch), and the control circuit 1014*e* may be configured to turn the lighting load on when the switch 1032*e* is closed and off when the switch 1032*e* is open (e.g., and vice versa).

The potentiometer 1038*e* may include a resistive element coupled between the supply voltage $V_{CC}$ and circuit common, and may be configured to generate a potentiometer signal $V_{POT}$ at a wiper of the potentiometer 1038*e*. The position of the potentiometer 1038*e* (e.g., the position of the wiper along the resistive element) may be adjusted by movement of a shaft of the potentiometer 1038*e* (e.g., the shaft 952). The shaft of the potentiometer 1038*e* may be coupled to a rotary knob of the control device 10003 (e.g., the rotary knob 910). For example, the potentiometer signal $V_{POT}$ may have a direct-current (DC) magnitude that may be adjusted in response to movement of the shaft of the potentiometer 1038*e*, such that the magnitude of the potentiometer signal $V_{POT}$ indicates the position of the potentiometer 1038*e*. The control circuit 1014*e* may receive the potentiometer signal $V_{POT}$ and may be configured to control the present intensity level $L_{PRES}$ of the lighting load 1004 in response to the DC magnitude of the potentiometer signal $V_{POT}$. For example, the control circuit 1014*e* may be configured to determine commanded intensity level $L_{CMD}$ for the lighting load 1004 in response to the DC magnitude of the potentiometer signal $V_{POT}$.

The control device 1000*e* may also comprise an actuator adjustment circuit 1040*e* for adjusting a present position $P_{PRES}$ (e.g., a present rotational position) of the rotary knob (e.g., the rotary knob 910). The actuator adjustment circuit 1040*e* may be configured to provide the functionality of, for example, the actuator adjustment system 970 of the control device 900. For example, the actuator adjustment circuit 1040*e* may be very similar to and/or the same as the actuator adjustment circuit 1040*a* of the control device 1000*a*. The actuator adjustment circuit 1040*e* may comprise a motor 1042*e* (e.g., the motor 980 of the actuator adjustment system 970) and a motor drive circuit 1044*e*. The control circuit 1014*e* may be configured to generate one or more drive signals $V_{DR-E}$ for controlling the motor drive circuit 1044*e* to energize the motor 1042*e* to rotate a drive shaft of the motor 1042*e* (e.g., the drive shaft 982). For example, the motor drive circuit 1044*e* may comprise an H-bridge drive circuit, and the drive signals $V_{DR-E}$ generated by the control circuit 1014*e* may comprise pulse-width modulated signals. The control circuit 1014*e* may be configured to adjust a duty cycle of each of the drive signals $V_{DR-E}$ to adjust a rotational speed of the motor 1042*e* and adjust a phase between the drive signals $V_{DR-E}$ to control a direction of rotation of the motor 1042*e*.

The drive shaft of the motor 1042*e* may be coupled to the shaft of the potentiometer 1038*e* via a gear assembly (e.g., the gear assembly 990 of the actuator adjustment system 970). The control circuit 1014*e* may be configured to control the motor 1042*e* to adjust the position of the potentiometer 1038*e*. The control circuit 1014*e* may be configured to control the motor 1042*e* to rotate the drive shaft in a first rotational direction to cause the magnitude of the potentiometer signal $V_{POT}$ to increase and in a second rotation direction to cause the magnitude of the potentiometer signal $V_{POT}$ to decrease. For example, the control circuit 1014*e* may be configured to control the motor 1042*e* (e.g., the motor 980) to adjust the present position $P_{PRES}$ of the rotary knob 910. The control circuit 1014*e* may be configured to control the motor 1042*e* (e.g., the motor 980) to rotate the drive shaft of the motor 1042*e* in a first rotational direction to also rotate the rotary knob 910 in the first rotational direction, and in a second rotation direction to also rotate the rotary knob 910 in the second rotational direction.

In response to receiving a message including a command to control the lighting load 1004, the control circuit 1014*e* may be configured to control the controllably conductive device 1010 to control the lighting load 1004 and control the actuator adjustment circuit 1040*e* to adjust the present position $P_{PRES}$ of the rotary knob, such that the present position $P_{PRES}$ of the rotary knob matches the present intensity level $L_{PRES}$ of the lighting load. The control circuit 1014*e* may be configured to determine a destination position $P_{DEST}$ from the command included in the received message (e.g., from the commanded intensity level $L_{CMD}$). For example, the destination position $P_{DEST}$ around a circumference of the rotary knob 910 may be equal to the commanded intensity level $L_{CMD}$. The control circuit 1014*e* may be configured to control the present position $P_{PRES}$ of the rotary knob as the rotary knob moves from an initial position $P_{PRES}$ to the destination rotational position $P_{DEST-R}$ according to a movement profile. For example, the control circuit 1014*e* may ramp up the drive of the motor 1042*e* for a period of time at the beginning of the movement, drive the motor 1042*e* at a substantially constant rotational speed, and ramp down the drive of the motor 1042*e* as the end of the movement. When the difference between the destination position $P_{DEST}$ and the present position $P_{PRES}$ of the rotary knob is less than an adjustment threshold $P_{TH}$, the control circuit 1014*e* may be configured to maintain the present position $P_{PRES}$ of the rotary knob rather adjusting the present position $P_{PRES}$ by a small amount to the destination position $P_{DEST}$.

When controlling the motor 1042*e*, the control circuit 1014*e* may be configured to use the magnitude of the potentiometer signal $V_{POT}$ as feedback of the present position of the rotary knob. The control circuit 1014*e* may be configured to control the motor 1042*e* (e.g., adjust the drive signals $V_{DR-E}$) using closed-loop control based on the destination position $P_{DEST}$ and the magnitude of the potentiometer signal $V_{POT}$. For example, the control circuit 1014*e* may use a digital proportional-integral (PI) controller for adjusting the duty cycle of the drive signals $V_{DR-E}$ in response to the destination position $P_{DEST}$ and the magnitude of the potentiometer signal $V_{POT}$. The control circuit 1014*e* may be configured to control the present intensity level $L_{PRES}$ of the lighting load 1004 independently from the present position $P_{PRES}$ of the rotary knob in response to receiving a message including a command to control the lighting load 1004. For example, the control circuit 1014*e* may be configured to control (e.g., quickly control) the lighting load 1004 before controlling the present position $P_{PRES}$ of the rotary knob. The control circuit 1014*e* may be configured to control the present intensity level $L_{PRES}$ of the lighting load 1004 at a faster rate than controlling the present position $P_{PRES}$ of the rotary knob.

In addition, the control circuit 1014*e* may be configured to wait for a timeout period after receiving the last remote control command before beginning to adjust the present position $P_{PRES}$ of the rotary knob. For example, the control circuit 1014*e* may be configured to control (e.g., immediately control) the controllably conductive device 1010 to control the lighting load 1004 upon receiving a command to control the lighting load 1004, but wait for the timeout period (e.g., without receiving another command to control the lighting load 1004) before controlling the actuator adjustment circuit 1040*e* to adjust the present position $P_{PRES}$ of the rotary knob. The timeout period may prevent unwanted energizations of the motor 1042*e* when a user may remotely adjust the present intensity level $L_{PRES}$ of the lighting load 1004 multiple times within a short period of time.

In addition, the control circuit 1014_e_ may be configured to adjust the present position $P_{PRES}$ of the rotary knob to indicate status information of the control device 1000_e_ and/or the lighting load 1004 (e.g., other than indicating the present intensity level $L_{PRES}$). For example, the control circuit 1014_e_ may be configured to control the present position $P_{PRES}$ of the rotary knob through a controlled movement (e.g., an animated movement) to indicate an operating mode of the control device 1000_e_. The control circuit 1014_e_ may be configured to, for example, periodically control (e.g., cycle) the position of the rotary knob in a first rotational direction and a second rotational direction to indicate when the control device 1000_e_ is in an association mode for associating the control device 1000_e_ with one or more remote control devices (e.g., during the association procedure). In addition, the control circuit 1014_e_ may be configured to control the position of the rotary knob to a plurality of discrete positions (e.g., four position) in a stepwise (e.g., staccato) manner to indicate that the control device 1000_e_ is changing to a different control mode, such as a fan-speed control mode. For example, the control circuit 1014_e_ may be configured to control the position of the rotary knob to the plurality of discrete positions in the stepwise manner by controlling the position of the rotary knob to a first position (e.g., approximately 20% around the circle defied by the rotary knob) and then waiting for a wait period (e.g., approximately one second), controlling the position of the rotary knob to a second position (e.g., approximately 40% around a circle or circumference defied by the rotary knob) and then waiting for the wait period, controlling the position of the rotary knob to a third position (e.g., approximately 60% around the circle defied by the rotary knob) and then waiting for the wait period, and controlling the position of the rotary knob to a fourth position (e.g., approximately 80% around the circle defied by the rotary knob).

When adjusting the present position $P_{PRES}$ of the rotary knob, the control circuit 1014_e_ may be configured to stop driving the motor 1042_e_ of the actuator adjustment circuit 1040_e_ to cease adjusting the present position $P_{PRES}$ of the rotary knob in response to determining that the user is presently actuating the rotary knob to rotate the rotary knob. For example, the control circuit 1014_e_ may be configured to determine that a user is actuating the rotary knob while the control circuit 1014_e_ is driving the motor 1042_e_ if the present position $P_{PRES}$ of the rotary knob (e.g., as indicated by the magnitude of the potentiometer signal $V_{POT}$) is not close to an expected position $P_{EXP}$. The control circuit 1014_e_ may be configured to also track the expected position $P_{EXP}$ of the rotary knob based on the movement profile for rotating the rotary knob. The control circuit 1014_e_ may be configured to determine that the user is actuating the rotary knob while the control circuit 1014_e_ is driving the motor 1042_e_ if the present position $P_{PRES}$ of the rotary knob is greater than a threshold amount away from the predicted position $P_{EXP}$. In addition, the control circuit 1014_e_ may be configured to determine that the user is actuating the rotary knob while the control circuit 1014_e_ is driving the motor 1042_e_ if the duty cycle of any of the drive signals $V_{DR\text{-}E}$ for driving the motor 1042_e_ is high (e.g., greater than a high-duty-cycle threshold) and the present position $P_{PRES}$ of the rotary knob does not reach the destination position $P_{DEST}$ (e.g., is not equal to the destination position $P_{DEST}$) after the expiration of a user-actuation-detection time period from the beginning of the movement.

In addition, the control circuit 1014_e_ may be configured to adjust the present position $P_{PRES}$ of the rotary knob to provide feedback to a user when the user is manually adjusting the present position $P_{PRES}$ of the rotary knob. For example, the control circuit 1014_e_ may be configured to adjust the present position $P_{PRES}$ of the rotary knob to provide detents (e.g., points of higher resistance) in the rotation of the rotary knob. When a user is rotating the rotary knob, the control circuit 1014_e_ may be configured to provide one of the detents by controlling the motor 1042_e_ to cause the drive shaft of the motor 1042_e_ to rotate in a direction that opposes the movement of the rotary knob for a predetermined (e.g., short) period of time. Control of the motor 1042_e_ of the actuator adjustment circuit 1040_e_ to provide the detent may not hinder rotation of the rotary knob by the user, but may provide a slight bump in the rotation of the rotary knob to signal the detent to the user. For example, the control circuit 1014_e_ may be configured to control the motor 1042_e_ to provide the detents at one or more positions around the circle defined by the rotary knob (e.g., to indicate intensity levels, such as 25%, 50%, and/or 75%). In addition, the control circuit 1042_e_ may be configured to control the motor 1042_e_ to generate a vibration of the rotary knob at one or more positions around the circle defined by the rotary knob. When a user is rotating the rotary knob, the control circuit 1014_e_ may be configured to generate the vibration of the rotary knob by increasing a frequency of one or more of the drive signals $V_{DR\text{-}E}$ for driving the motor 1042_e_. For example, the control circuit 1014_e_ may be configured to control the motor 1042_e_ to generate the vibration at one or more positions around the circle defined by the rotary knob to indicate a preset intensity level (e.g., a favorite or stored present intensity level).

Figure 39:
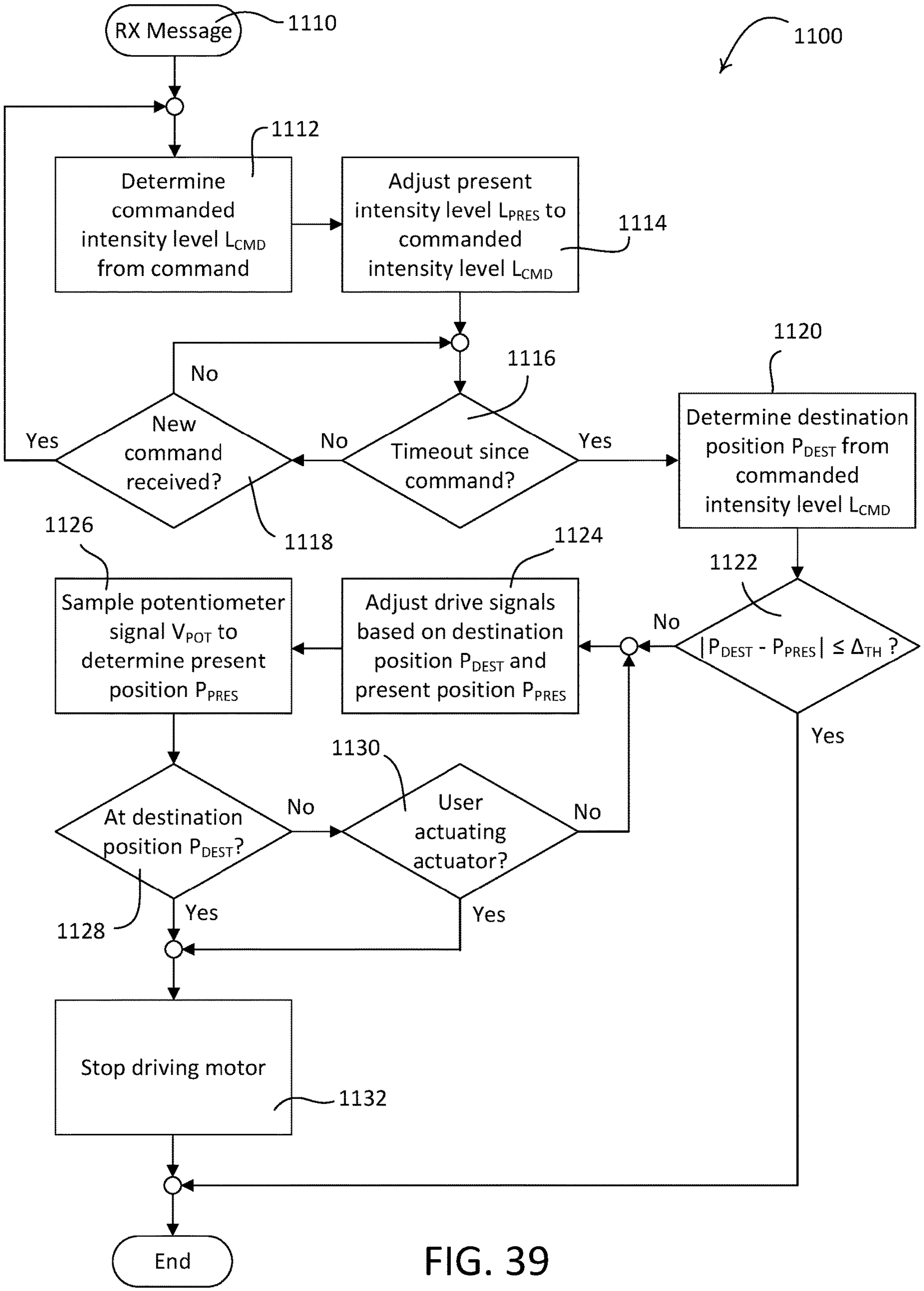
FIG. 39 is a flowchart of an example procedure for operating one or more of the control devices shown in FIGS. 1-38E in response to receiving a message from an external device.

FIG. 39 is a flowchart of an example procedure 1100 for operating a control device (e.g., such as the control device 200, 300, 700, 900, 1000, 1000_a_, 1000_c_, 1000_e_) in response to receiving a message from an external device. The control device may be configured to control a lighting load, e.g., to adjust a present intensity level $L_{PRES}$ of the lighting load. For example, the control device may comprise an analog intensity adjustment actuator, such a slider control (e.g., the slider control 220, 320, 720) and/or a rotary knob (e.g., the rotary knob 910) for allowing a user to adjust the present intensity level $L_{PRES}$ of the lighting load. The intensity adjustment actuator may be configured to control a position of a potentiometer, which may generate a potentiometer signal $V_{POT}$ having a magnitude that indicates a commanded intensity level $L_{CMD}$ for the lighting load. The control device may also comprise an actuator adjustment system (e.g., the actuator adjustment system 400, 970) and/or an actuator adjustment circuit (e.g., the actuator adjustment circuit 1040_a_, 1041_c_, 1040_e_) for adjusting a present position $P_{PRES}$ of the analog intensity adjustment actuator (e.g., the present position of the slider knob and/or the rotary knob). The control device may also be configured to receive a message including a command to control the present intensity level $L_{PRES}$ of the lighting load (e.g., the message may include a commanded intensity level $L_{CMD}$). In response to receiving a command to control the present intensity level $L_{PRES}$ of the lighting load, the control circuit may be configured to control the present intensity level $L_{PRES}$ of the lighting load and adjust the present position $P_{PRES}$ of the analog intensity adjustment actuator. For example, the control circuit may be configured to store the present intensity level $L_{PRES}$ and the present position $P_{PRES}$ of the analog intensity adjustment actuator in memory.

The control circuit may execute the procedure 1100 in response to receiving a message including a command to control for the lighting load at 1110. The control circuit may control (e.g., immediately control) the lighting load in response to the command. The control circuit may determine the commanded intensity level $L_{CMD}$ from the command in the received message at 1112 and control the present intensity level $L_{PRES}$ of the lighting load to the command intensity level $L_{CMD}$ at 1114. The control circuit may then determine at 1116 if a timeout has expired since a command was last received (e.g., as received in the message at 1110). For example, the timeout may expire at the end of a timeout period $T_{TIMEOUT}$ (e.g., approximately 1-2 seconds) from when the message is received at 1110. If the timeout has not expired at 1114, the control circuit may determine at 1116 if a message including a new command to control the lighting load has been received since the last message including a command was received. If a message including a new command to control the lighting load has been received at 1116, the control circuit may determine the new commanded intensity level $L_{CMD}$ from the new command in the received message at 1112 and control the present intensity level $L_{PRES}$ of the lighting load to the new command intensity level $L_{CMD}$ at 1114.

When the timeout expires at 1114 (e.g., without a message with a new command being received at 1116), the control circuit may determine a destination position $P_{DEST}$ for moving the analog intensity adjustment actuator, e.g., based on the commanded intensity level $L_{CMD}$ at 1120. The control circuit may set the destination position $P_{DEST}$ to be equal to and/or proportional to, for example, the commanded intensity $L_{LCD}$. For example, when the commanded intensity level $L_{CMD}$ is 50%, the control circuit may set the destination position $P_{DEST}$ to 50% (e.g., 50% of the length of the slider slot and/or 50% of the circumference of the rotary knob). At 1122, the control circuit may determine if the destination position $P_{DEST}$ is within a threshold amount $\Delta_{TH}$ of the present position $P_{PRES}$ (e.g., as stored in memory). For example, the control circuit may determine if the difference between the destination position $P_{DEST}$ and the present position $P_{PRES}$ (e.g., the absolute value of the difference between the destination position $P_{DEST}$ and the present position $P_{PRES}$) is less than or equal to the threshold amount $\Delta_{TH}$ at 1122. For example, the control circuit may not adjust the present position $P_{PRES}$ of the analog intensity adjustment actuator when the destination position $P_{DEST}$ is within the threshold amount $\Delta_{TH}$ of the present position $P_{PRES}$. When the absolute value of the difference between the destination position $P_{DEST}$ and the present position $P_{PRES}$ is less than or equal to the threshold amount $\Delta_{TH}$ at 1122, the procedure 1100 may end.

When the absolute value of the difference between the destination position $P_{DEST}$ and the present position $P_{PRES}$ is not less than or equal to the threshold amount $\Delta_{TH}$ at 1122, the control circuit may adjust the present position $P_{PRES}$ of the analog intensity adjustment actuator towards the destination position $P_{DEST}$. At 1124, the control circuit may adjust drive signals provided to a motor of the actuator adjustment circuit based on the present position $P_{PRES}$ and the destination position $P_{DEST}$. For example, the control circuit may use a digital proportional-integral controller to adjust the drive signals provided to a motor drive circuit of the actuator adjustment circuit based on the present position $P_{PRES}$ and the destination position $P_{DEST}$. At 1126, the control circuit may sample the potentiometer signal $V_{POT}$ to determine the present position $P_{PRES}$ of the analog intensity adjustment actuator. The magnitude of the potentiometer signal $V_{POT}$ may provide feedback to the control circuit of the present position $P_{PRES}$ of the analog intensity adjustment actuator. The control circuit may update the present position $P_{PRES}$ of the analog intensity adjustment actuator that is stored in memory based on the magnitude of the potentiometer signal $V_{POT}$ at 1126.

At 1128, the control circuit may determine if the analog intensity adjustment actuator is at the destination position $P_{DEST}$. For example, the control circuit may determine that the analog intensity adjustment actuator is at the destination position $P_{DEST}$ by determining if the present position $P_{PRES}$ of the analog intensity adjustment actuator (e.g., as indicated by the magnitude of the potentiometer signal $V_{POT}$) is equal to the destination position $P_{DEST}$. If the analog intensity adjustment actuator is not at the destination position $P_{DEST}$ at 1128, the control circuit may determine at 1130 if a user is actuating the analog intensity adjustment actuator while the control circuit is driving the motor of the actuator adjustment circuit to try to adjust the present position $P_{PRES}$ of the analog intensity adjustment actuator. For example, the control circuit may determine that a user is actuating the analog intensity adjustment actuator while the control circuit is driving the motor if the present position $P_{PRES}$ of the analog intensity adjustment actuator as indicated by the magnitude of the potentiometer signal $V_{POT}$ is not close to an expected position. The control circuit may be configured to also track the expected position of the analog intensity adjustment actuator based on the movement profile for moving the analog intensity adjustment actuator. The control circuit may be configured to determine that the user is actuating the analog intensity adjustment actuator while the control circuit is driving the motor if the present position $P_{PRES}$ of the analog intensity adjustment actuator as indicated by the magnitude of the potentiometer signal $V_{POT}$ is greater than a threshold amount away from the predicted position. In addition, the control circuit may be configured to determine that the user is actuating the analog intensity adjustment actuator while the control circuit is driving the motor if a duty cycle of one or more drive signals used to drive the motor is high (e.g., greater than a high-duty-cycle threshold) and the present position $P_{PRES}$ of the analog intensity adjustment actuator as indicated by the magnitude of the potentiometer signal $V_{POT}$ does not reach the destination position $P_{DEST}$ (e.g., is not equal to the destination position $P_{DEST}$) after the expiration of a user-actuation-detection time period from the beginning of the movement.

If the control circuit determines that a user is not actuating the analog intensity adjustment actuator at 1130, the control circuit may loop around to adjust drive signals provided to the motor drive circuit of the actuator adjustment circuit based on the present position $P_{PRES}$ and the destination position $P_{DEST}$ at 1124 and sample the potentiometer signal $V_{POT}$ to determine the present position $P_{PRES}$ of the analog intensity adjustment actuator at 1126. When the control circuit determines that the analog intensity adjustment actuator is at the destination position $P_{DEST}$ at 1128 or that a user is actuating the analog intensity adjustment actuator at 1130, the control circuit may stop the motor (e.g., stop generating the drive signals provided to the motor drive circuit of the actuator adjustment circuit) at 1130, before the procedure 1100 exits.

Figure 40:
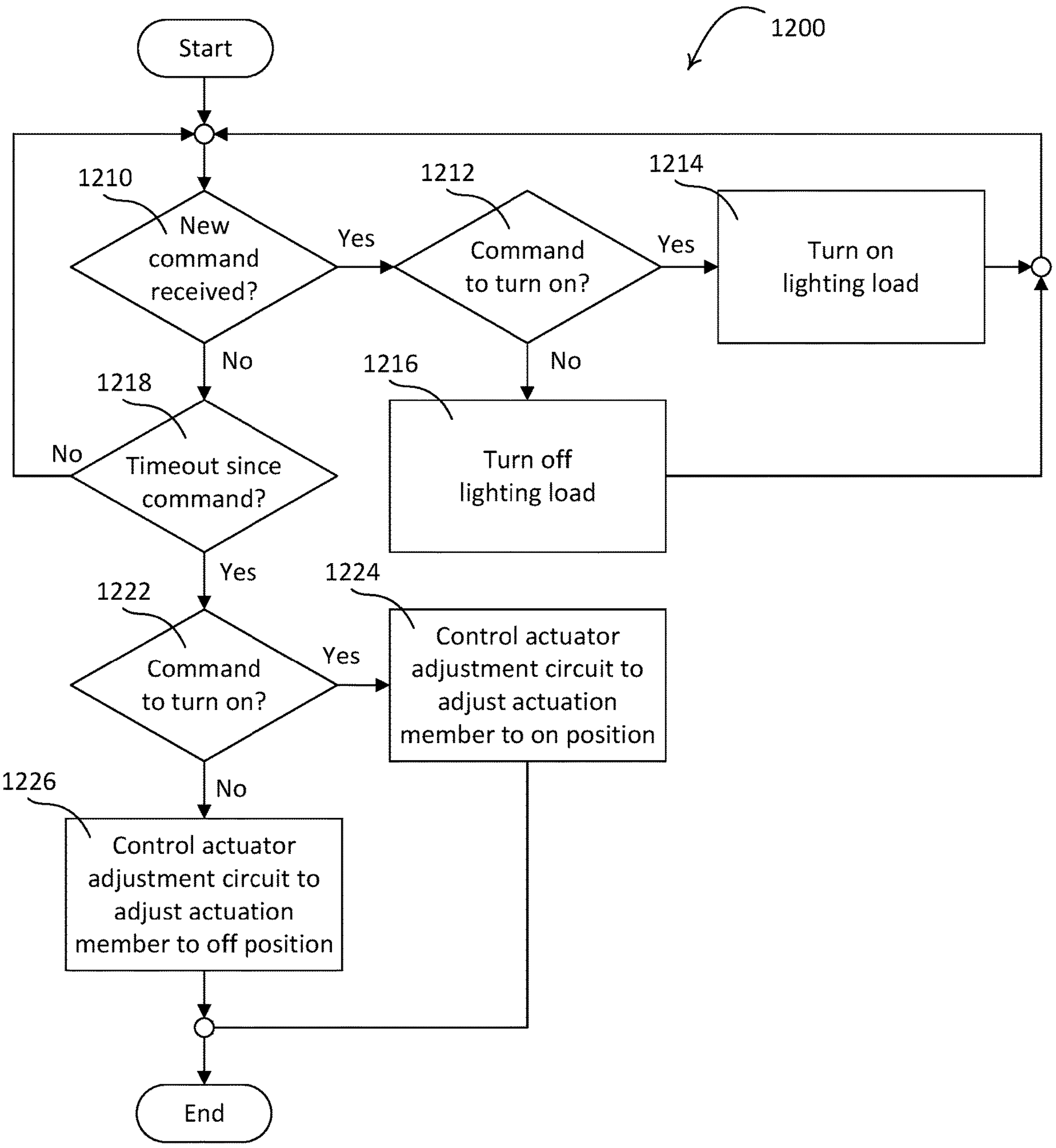
FIG. 40 is a flowchart of another example procedure for operating one or more of the control devices shown in FIGS. 1-38E in response to receiving a message from an external device.

FIG. 40 is a flowchart of an example procedure 1200 for operating a control device (e.g., the control devices 500, 700, 800, 1000, 1000*b*, 1000*c*, 1000*d*) in response to receiving a message from an external device. The control device may be configured to control a lighting load, e.g., to turn the lighting load on and/or off. For example, the control device may comprise an actuation member (e.g., the actuation member 510, 710, 810) for allowing a user to turn the lighting load on and/or off. The actuation member may be configured to actuate a switch (e.g., the switch 550, 850). The control device may also comprise an actuator adjustment system (e.g., the actuator adjustment system 600, 890) and/or an actuator adjustment circuit (e.g., the actuator adjustment circuit 1040*b*, 1040*c*, 1040*d*) for adjusting a position the actuation member. The control device may also be configured to receive a message including a command to control the lighting load (e.g., to turn the lighting load on and/or off). In response to receiving a command to control the lighting load, the control circuit may be configured to turn the lighting load on and/or off and adjust the position of the actuation member.

The control circuit may execute the procedure 1200 in response to receiving a message including a command for controlling the lighting load (e.g., the turn the lighting load on and/or off) at 1210. The control circuit may control (e.g., immediately control) the lighting load in response to the command. The control circuit may determine at 1212 whether the command is a command to turn the lighting load on. When the command at 1212 is a command to turn the lighting load on, the control circuit may turn the lighting load on at 1214. When the command at 1212 is a command to turn the lighting off, the control circuit may turn the lighting load off at 1216. In some examples, if the command is a command to toggle the state of the lighting load, the control circuit may determine to turn the lighting load on when the lighting load is presently off and determine to turn the lighting load off when the lighting load is presently on. The control circuit may then determine at 1218 if a timeout has expired since a command was last received (e.g., as received in the message at 1210). For example, the timeout may expire at the end of a timeout period $T_{TIMEOUT}$ (e.g., approximately 1-2 seconds) from when the message is received at 1210. If the timeout has not expired at 1218, the control circuit may determine at 1210 if a message including a new command to control the lighting load has been received since the last message including a command was received. If a message including a new command to control the lighting load has been received at 1210, the control circuit may either turn the lighting load on at 1214 or off at 1216.

When the timeout expires at 1218 (e.g., without a message with a new command being received at 1220), the control circuit may adjust the position of the actuation member. When the command at 1222 is a command to turn the lighting load on, the control circuit may control at 1224 the actuator adjustment circuit to adjust the position of the actuation member to the on position, and the procedure 1200 may end. When the command at 1222 is a command to turn the lighting load off, the control circuit may control at 1226 the actuator adjustment circuit to adjust the position of the actuation member to the off position, and the procedure 1200 may end. For example, the control circuit may control a motor of the actuator adjustment circuit (e.g., the motor 610 of the actuator adjustment system 600, the motor 1042*b* of the actuator adjustment circuit 1040*b*, and/or the motor of the actuator adjustment circuit 1040*c*) at 1024 and 1026 to adjust the position of the actuation member. The control circuit may control the motor to, for example, rotate a pivot axis of an over-center spring mechanism (e.g., the over-center spring mechanism 570) in a full circle (e.g., approximately 360 degrees) in a first direction to adjust the position of the actuation member from the off position to the on position and in a second direction to adjust the position of the actuation member from the on position to the off position. In addition, the control circuit may control one or more solenoids of the actuator adjustment circuit (e.g., the solenoids 892*a*, 892*b* of the actuator adjustment system 890, and/or the solenoids controlled by the first solenoid coil 1050*d* and the second solenoid coil 1060*d* of the actuator adjustment circuit 1040*d*) at 1024 and 1026 to adjust the position of the actuation member. For example, the control circuit may be configured to energize a first solenoid of the solenoids to adjust the actuation member to the on position and energize just a second solenoid of the solenoids to adjust the actuation member to the off position. Further, the control circuit may be configured to energize both of the solenoids as part of a first adjustment sequence to adjust the actuation member from the off position and the on position (e.g., as shown in FIGS. 31A-32E) and as part of a second adjustment sequence to adjust the actuation member from the on position to the off position (e.g., as shown in FIGS. 32A-32E).

Figure 41:
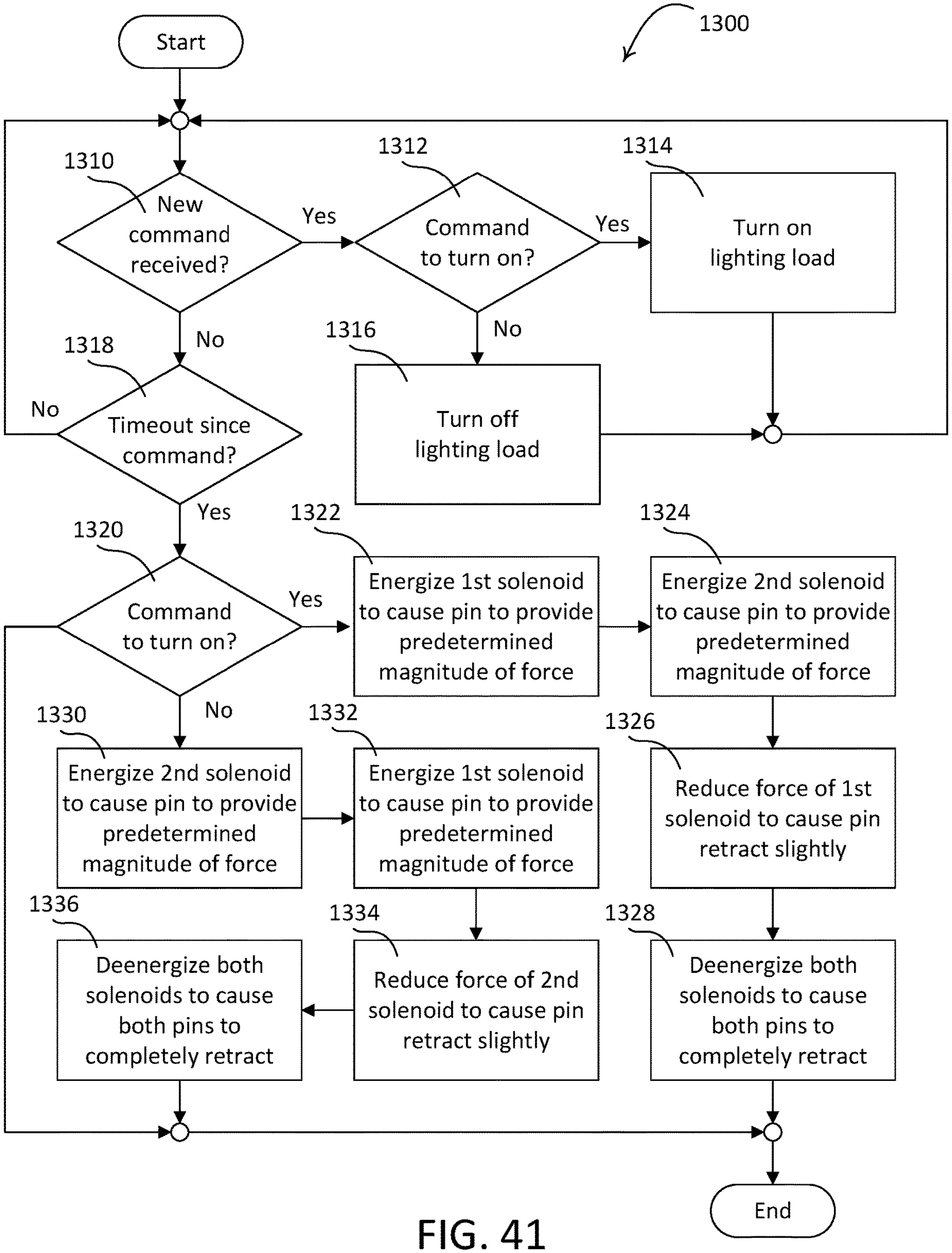
FIG. 41 is a flowchart of another example procedure for operating one or more of the control devices shown in FIGS. 1-38E in response to receiving a message from an external device.

FIG. 41 is a flowchart of an example procedure 1300 for operating a control device (e.g., the control devices 800, 1000*d*) in response to receiving a message from an external device. The control device may be configured to control a lighting load, e.g., to turn the lighting load on and/or off. For example, the control device may comprise an actuation member (e.g., the actuation member 810) for allowing a user to turn the lighting load on and/or off. The actuation member may be configured to actuate a switch (e.g., the switch 850). The control device may also comprise an actuator adjustment system including one or more solenoids (e.g., the actuator adjustment system 890 including the solenoids 892*a*, 892*b*) and/or an actuator adjustment circuit including solenoid coils for controlling one or more solenoids (e.g., the actuator adjustment circuit 1040*d* including the first solenoid coil 1050*d* and the second solenoid coil 1060*d*) for adjusting a position the actuation member. The control device may also be configured to receive a message including a command to control the lighting load (e.g., to turn the lighting load on and/or off). In response to receiving a command to control the lighting load, the control circuit may be configured to turn the lighting load on and/or off and adjust the position of the actuation member.

The control circuit may execute the procedure 1300 in response to receiving a message including a command for controlling the lighting load (e.g., the turn the lighting load on and/or off) at 1310. The control circuit may control (e.g., immediately control) the lighting load in response to the command. The control circuit may determine at 1312 whether the command received at 1310 is a command to turn the lighting load on. When the command is determined at 1312 to be a command to turn the lighting load on, the control circuit may turn the lighting load on at 1314. When the command is determined at 1312 to be a command to turn the lighting off, the control circuit may turn the lighting load off at 1316. In some examples, if the command is a command to toggle the state of the lighting load, the control circuit may determine to turn the lighting load on when the lighting load is presently off and determine to turn the lighting load off when the lighting load is presently on. The control circuit may then determine at 1318 if a timeout has expired since a command was last received (e.g., as received in the message at 1310). For example, the timeout may expire at the end of a timeout period $T_{TIMEOUT}$ (e.g., approximately xx seconds) from when the message is received at 1310. If the timeout has not expired at 1318, the control circuit may determine at 1310 if a message including a new command to control the lighting load has been received since the last message including a command was received. If a message including a new command to control the lighting load has been received at 1310, the control circuit may either turn the lighting load on at 1314 or off at 1316.

When the timeout expires at 1318 (e.g., without a message with a new command being received at 1310), the control circuit may adjust the position of the actuation member. When the command at 1320 is a command to turn the lighting load on, the control circuit may adjust the actuation member from the off position and the on position by energizing both of the solenoids as part of a first adjustment sequence (e.g., as shown in FIGS. 31A-32E). For example, the control circuit may energize at 1322 a first solenoid (e.g., the first solenoid 892*a*) to cause a pin to extend behind an upper portion of the actuation member (e.g., as shown in FIG. 31B). At 1324, the control circuit may energize a second solenoid (e.g., the second solenoid 892*b*) to cause a pin to extend behind a lower portion of the actuation member (e.g., as shown in FIG. 31C). For example, the control circuit may control the solenoids such that forces acting on the actuation member by the pins are approximately equal. At 1326, the control circuit may control the first solenoid to cause the pin to retract slightly, for example, to reduce the force provided by the pin on the actuation member (e.g., as shown in FIG. 31D). At 1328, the control circuit may deenergize both of the solenoids to cause both pins to fully retract (e.g., as shown in FIG. 31E), and the procedure 1300 may end.

When the command at 1320 is a command to turn the lighting load off, the control circuit may adjust the actuation member from the on position and the off position by energizing both of the solenoids as part of a second adjustment sequence (e.g., as shown in FIGS. 31A-32E). For example, the control circuit may energize the second solenoid at 1330 to cause the pin to extend behind the lower portion of the actuation member (e.g., as shown in FIG. 32B). At 1332, the control circuit may energize the first solenoid to cause the pin to extend behind the lower portion of the actuation member (e.g., as shown in FIG. 32C). For example, the control circuit may control the solenoids such that forces acting on the actuation member by the pins are approximately equal. At 1334, the control circuit may control the second solenoid to cause the pin to retract slightly, for example, to reduce the force provided by the pin on the actuation member (e.g., as shown in FIG. 32D). At 1336, the control circuit may deenergize both of the solenoids to cause both pins to fully retract (e.g., as shown in FIG. 32E), and the procedure 1300 may end.

What is claimed is:

1. A control device for controlling a lighting load, the control device comprising:

an analog intensity adjustment actuator that is configured to be manually operated to adjust an intensity level of light emitted by the lighting load, wherein the analog intensity adjustment actuator comprises a slider knob configured to move within an elongated slot;

a communication circuit configured to receive a message from a remote device, the message comprising a commanded intensity level for controlling the lighting load;

an actuator adjustment system configured to adjust a position of the analog intensity adjustment actuator; and a control circuit configured to control an amount of power delivered to the lighting load in response to manual operation of the analog intensity adjustment actuator, the control circuit further configured to control the actuator adjustment system to adjust the position of the analog intensity adjustment actuator in response to the message received from the remote device via the communication circuit, wherein the position of the analog intensity adjustment actuator is adjusted to indicate the commanded intensity level.

2. The control device of claim 1, wherein the control circuit is configured to control the actuator adjustment system to adjust the position of the slider knob within the elongated slot to indicate the commanded intensity level.

3. The control device of claim 2, wherein the slider knob is configured to move linearly within the elongated slot between a low-end position associated with a low-end intensity level and a high-end position associated with a high-end intensity level.

4. The control device of claim 2, wherein the actuator adjustment system comprises a motor and a gear assembly coupled to the motor.

5. The control device of claim 4, wherein the gear assembly is operatively coupled to the slider knob such that rotation of the motor is transferred to linear movement of the slider knob.

6. The control device of claim 5, wherein the gear assembly comprises a circular gear that engages a linear gear such that rotation of the circular gear is transferred to linear movement of the linear gear.

7. The control device of claim 6, further comprising a linear potentiometer having a shaft coupled to the slider knob.

8. The control device of claim 7, wherein the gear assembly is operatively coupled to the slider knob via the shaft of the linear potentiometer.

9. The control device of claim 8, wherein the linear gear comprises a coupling portion configured to receive the shaft of the potentiometer such that the linear potentiometer moves linearly with the linear gear.

10. The control device of claim 9, wherein the coupling portion defines an opening configured to surround the shaft of the linear potentiometer.

11. The control device of claim 9, wherein the slider knob moves in an upward direction when the motor rotates in a first angular direction and the slider knob moves in a downward direction when the motor rotates in a second angular direction.

12. The control device of claim 11, wherein the linear gear comprises a plurality of teeth arranged in a linear array on a rack plate.

13. The control device of claim 12, wherein the rack plate comprises a fin configured to maintain alignment between the circular gear and the linear gear.

14. The control device of claim 13, wherein the fin is configured to move along a channel in a cradle of the control device.

15. The control device of claim 14, wherein the cradle is configured to secure a printed circuit board of the control device to a yoke of the control device.

16. The control device of claim 15, wherein the cradle comprises a plurality of ribs that are configured to be received in a plurality of corresponding slots of the yoke.

17. The control device of claim 16, wherein the plurality of ribs and the corresponding plurality of slots are configured to provide mechanical support and allow for heat transfer in the yoke.

18. The control device of claim 2, further comprising a potentiometer that is configured to generate a direct-current (DC) voltage representative of the commanded intensity level.

19. The control device of claim 18, wherein the slider knob is mechanically coupled to the potentiometer.

20. The control device of claim 18, wherein the control circuit is configured to use a magnitude of the DC voltage generated by the potentiometer as feedback for closed loop control of the actuator adjustment system.

21. The control device of claim 20, wherein the feedback is used to determine if a user is actuating the analog intensity adjustment actuator while the actuator adjustment system is operating, and to stop controlling the actuator adjustment system in response to determining that the user is actuating the analog intensity adjustment actuator.

22. The control device of claim 1, further comprising:

an actuation member configured to pivot in response to an actuation of an upper portion of the actuation member or a lower portion of the actuation member;

wherein the control circuit is configured to turn the lighting load on in response to an actuation of the upper portion of the actuation member, and turn the lighting load off in response to an actuation of the lower portion of the actuation member.

23. The control device of claim 22, wherein the actuation member is configured to return to an idle position when the upper portion or lower portion of the actuation member is released.

24. The control device of claim 23, wherein the actuation member comprises one or more biasing arms configured to hold the actuation member in the idle position.

25. The control device of claim 1, wherein the control circuit is further configured to illuminate the elongated slot of the analog intensity adjustment actuator.

26. The control device of claim 1, wherein the analog intensity adjustment actuator is configured to control a potentiometer.

27. The control device of claim 1, further comprising:

a controllably conductive device adapted to be coupled in series electrical connection between an alternating current (AC) power source and the lighting load;

wherein the control circuit is configured to control the controllably conductive device to control the amount of power delivered to the lighting load in response to the manual operation of the analog intensity adjustment actuator.

28. The control device of claim 27, wherein the control circuit is configured to control the amount of power delivered to the lighting load in response to commanded intensity level included in the message received from the remote device.

29. The control device of claim 1, wherein the control circuit is configured to transmit a message including a command for controlling the lighting load in response to manual operation of the analog intensity adjustment actuator.

* * * * *